US012811142B2

(12) United States Patent
Momma et al.

(10) Patent No.: US 12,811,142 B2
(45) Date of Patent: Nov. 24, 2026

(54) SECONDARY BATTERY, PORTABLE INFORMATION TERMINAL, VEHICLE, AND MANUFACTURING METHOD OF POSITIVE ELECTRODE ACTIVE MATERIAL

(71) Applicant: SEMICONDUCTOR ENERGY LABORATORY CO., LTD., Atsugi (JP)

(72) Inventors: Yohei Momma, Isehara (JP); Hiroshi Kadoma, Sagamihara (JP); Yoshihiro Komatsu, Ebina (JP); Shiori Saga, Atsugi (JP); Shunpei Yamazaki, Setagaya (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 954 days.

(21) Appl. No.: 17/793,194

(22) PCT Filed: Jan. 21, 2021

(86) PCT No.: PCT/IB2021/050437
§ 371 (c)(1),
(2) Date: Jul. 15, 2022

(87) PCT Pub. No.: WO2021/152428
PCT Pub. Date: Aug. 5, 2021

(65) Prior Publication Data

US 2023/0055667 A1 Feb. 23, 2023

(30) Foreign Application Priority Data

Jan. 31, 2020 (JP) ................................ 2020-015581

(51) Int. Cl.
*H01M 4/525* (2010.01)
*C01G 53/42* (2025.01)
(Continued)

(52) U.S. Cl.
CPC ........... *H01M 4/525* (2013.01); *C01G 53/42* (2013.01); *C01G 53/66* (2013.01);
(Continued)

(58) Field of Classification Search
CPC .... H01M 4/525; H01M 4/131; H01M 4/1315; H01M 4/485
See application file for complete search history.

(56) References Cited

U.S. PATENT DOCUMENTS 4,302,518 A 11/1981 Goodenough et al.
4,668,595 A 5/1987 Yoshino et al.
(Continued)

FOREIGN PATENT DOCUMENTS

CN 103594692 A 2/2014
CN 104953096 A 9/2015
(Continued)

OTHER PUBLICATIONS

Exhibit 1032 of IPR2023-01016, portions of JP-2015-201432A and Full translation.
(Continued)

*Primary Examiner* — Allison Bourke
*Assistant Examiner* — Travis L. Martin
(74) *Attorney, Agent, or Firm* — Fish & Richardson P.C.

(57) ABSTRACT

A positive electrode active material with little deterioration is provided. Positive electrode active material particles with little deterioration are provided. A power storage device with little deterioration is provided. A novel power storage device is provided. In the secondary battery, the positive electrode includes a positive electrode active material; the positive electrode active material includes a crystal exhibiting a layered rock-salt crystal structure; the crystal is represented by the space group R-3m; the positive electrode active material is a particle containing lithium, cobalt, titanium,
(Continued)

magnesium, and oxygen; the concentration of the magnesium in a surface portion of the particle is higher than the concentration of the magnesium in an inner portion of the particle; and in the positive electrode active material, the concentration of the titanium in the surface portion of the particle is higher than the concentration of the titanium in the inner portion of the particle.

2 Claims, 35 Drawing Sheets

(51) Int. Cl.
*C01G 53/66* (2025.01)
*H01M 4/02* (2006.01)

(52) U.S. Cl.
CPC ...... *C01P 2002/50* (2013.01); *C01P 2002/77* (2013.01); *C01P 2002/85* (2013.01); *C01P 2004/03* (2013.01); *C01P 2006/40* (2013.01); *H01M 2004/028* (2013.01); *H01M 2220/30* (2013.01)

(56) References Cited

U.S. PATENT DOCUMENTS

| | | | |
|---|---|---|---|
| 5,783,333 | A | 7/1998 | Mayer |
| 5,871,866 | A | 2/1999 | Barker et al. |
| 6,085,015 | A | 7/2000 | Armand et al. |
| 6,680,143 | B2 | 1/2004 | Thackeray et al. |
| 6,846,592 | B2 | 1/2005 | Kweon et al. |
| 8,003,256 | B2 | 8/2011 | Ohishi |
| 9,227,850 | B2 | 1/2016 | Ooishi |
| 9,614,225 | B2 | 4/2017 | Park |
| 9,786,903 | B2 | 10/2017 | Ryu et al. |
| 10,741,834 | B2 | 8/2020 | Zhang et al. |
| 10,804,566 | B2 | 10/2020 | Xia et al. |
| 11,038,159 | B2 | 6/2021 | Jo et al. |
| 2001/0010807 | A1 | 8/2001 | Matsubara |
| 2002/0110736 | A1 | 8/2002 | Kweon et al. |
| 2002/0195591 | A1 | 12/2002 | Ravet et al. |
| 2003/0104279 | A1 | 6/2003 | Miyazaki et al. |
| 2004/0142241 | A1 | 7/2004 | Nagayama |
| 2006/0051671 | A1 | 3/2006 | Thackeray et al. |
| 2006/0263690 | A1 | 11/2006 | Suhara et al. |
| 2007/0026315 | A1 | 2/2007 | Lampe-Onnerud et al. |
| 2007/0117014 | A1 | 5/2007 | Saito et al. |
| 2007/0224506 | A1 | 9/2007 | Ooyama et al. |
| 2008/0131780 | A1 | 6/2008 | Kawasato et al. |
| 2008/0241693 | A1 | 10/2008 | Fukuchi et al. |
| 2009/0087362 | A1 | 4/2009 | Sun et al. |
| 2009/0104532 | A1 | 4/2009 | Hosoya |
| 2010/0086854 | A1 | 4/2010 | Kumar et al. |
| 2010/0247986 | A1 | 9/2010 | Toyama et al. |
| 2012/0034516 | A1 | 2/2012 | Koo et al. |
| 2013/0052534 | A1 | 2/2013 | Fujiki et al. |
| 2013/0323596 | A1 | 12/2013 | Morita et al. |
| 2014/0050993 | A1 | 2/2014 | Park |
| 2014/0212759 | A1 | 7/2014 | Blangero et al. |
| 2015/0008364 | A1 | 1/2015 | Endo |
| 2016/0006032 | A1 | 1/2016 | Paulsen et al. |
| 2016/0013478 | A1 | 1/2016 | Satow et al. |
| 2016/0156032 | A1 | 6/2016 | Lee et al. |
| 2016/0268601 | A1 | 9/2016 | Paulsen et al. |
| 2016/0276658 | A1 | 9/2016 | Choi et al. |
| 2016/0276659 | A1 | 9/2016 | Choi et al. |
| 2017/0309910 | A1 | 10/2017 | Jo et al. |
| 2018/0013130 | A1 | 1/2018 | Ochiai et al. |
| 2018/0102536 | A1 | 4/2018 | Kawakami et al. |
| 2018/0145317 | A1 | 5/2018 | Momma et al. |
| 2018/0145368 | A1 | 5/2018 | Ochiai et al. |
| 2018/0190976 | A1* | 7/2018 | Blangero ................ C01B 25/30 |
| 2018/0254477 | A1 | 9/2018 | Horikawa et al. |
| 2018/0254525 | A1 | 9/2018 | Xia et al. |
| 2019/0148711 | A1 | 5/2019 | Jo et al. |
| 2019/0245199 | A1 | 8/2019 | Zeng et al. |
| 2020/0176770 | A1 | 6/2020 | Takahashi et al. |
| 2020/0220173 | A1 | 7/2020 | Jo et al. |
| 2020/0335824 | A1 | 10/2020 | Xia et al. |
| 2021/0020935 | A1 | 1/2021 | Takahashi et al. |
| 2021/0028456 | A1 | 1/2021 | Takahashi et al. |
| 2021/0083281 | A1 | 3/2021 | Mikami et al. |
| 2021/0210756 | A1 | 7/2021 | Choi et al. |
| 2021/0313571 | A1 | 10/2021 | Momma et al. |
| 2022/0115637 | A1* | 4/2022 | Ochiai .................. H01M 4/134 |
| 2022/0131146 | A1 | 4/2022 | Saito et al. |
| 2022/0190313 | A1* | 6/2022 | Ochiai .............. H01M 4/13915 |
| 2022/0255076 | A1 | 8/2022 | Mikami et al. |
| 2022/0359870 | A1 | 11/2022 | Mikami et al. |
| 2023/0052499 | A1* | 2/2023 | Komatsu ................ C01G 53/82 |
| 2025/0105282 | A1 | 3/2025 | Liu et al. |

FOREIGN PATENT DOCUMENTS

| | | | |
|---|---|---|---|
| CN | 105449197 | A | 3/2016 |
| CN | 105655554 | A | 6/2016 |
| CN | 107949949 | A | 4/2018 |
| CN | 109314230 | A | 2/2019 |
| CN | 110337744 | A | 10/2019 |
| CN | 110574193 | A | 12/2019 |
| CN | 113140726 | A | 7/2021 |
| EP | 2698850 | A | 2/2014 |
| EP | 3350865 | A | 7/2018 |
| EP | 3439081 | A | 2/2019 |
| EP | 3625842 | A | 3/2020 |
| EP | 3646402 | A | 5/2020 |
| EP | 3783707 | A | 2/2021 |
| JP | 08-037007 | A | 2/1996 |
| JP | 2000-203842 | A | 7/2000 |
| JP | 2002-216760 | A | 8/2002 |
| JP | 2004-103566 | A | 4/2004 |
| JP | 2005-225734 | A | 8/2005 |
| JP | 2005-332629 | A | 12/2005 |
| JP | 2009-026640 | A | 2/2009 |
| JP | 2010-080407 | A | 4/2010 |
| JP | 2012-074366 | A | 4/2012 |
| JP | 2012-209077 | A | 10/2012 |
| JP | 2014-038828 | A | 2/2014 |
| JP | 2014-049239 | A | 3/2014 |
| JP | 2015-069958 | A | 4/2015 |
| JP | 2015-099722 | A | 5/2015 |
| JP | 2015-201432 | A | 11/2015 |
| JP | 2018-527718 | | 9/2018 |
| JP | 2018-195581 | A | 12/2018 |
| JP | 2019-021456 | A | 2/2019 |
| JP | 2019-509599 | | 4/2019 |
| JP | 2019-179758 | A | 10/2019 |
| KR | 2014-0022681 | A | 2/2014 |
| KR | 2015-0063956 | A | 6/2015 |
| KR | 2018-0043845 | A | 4/2018 |
| KR | 2018-0089043 | A | 8/2018 |
| KR | 2018-0089059 | A | 8/2018 |
| KR | 2019-0116584 | A | 10/2019 |
| KR | 2020-0009034 | A | 1/2020 |
| KR | 2020-0023409 | A | 3/2020 |
| WO | WO-2015/083900 | | 6/2015 |
| WO | WO-2017/046723 | | 3/2017 |
| WO | WO-2018/143612 | | 8/2018 |
| WO | WO-2018/211375 | | 11/2018 |
| WO | WO-2019/003025 | | 1/2019 |
| WO | WO-2021/152428 | | 8/2021 |

OTHER PUBLICATIONS

Exhibit 1028 of IPR2023-01349, Full translation of JP-2015-201432A.

International Search Report (Application No. PCT/IB2021/050437) Dated Apr. 27, 2021.

Yi.T et al., "Effect of treated temperature on structure and performance of LiCoO2 coated by Li4Ti5O12", Surface & Coatings Technology , Feb. 9, 2011, vol. 205, No. 13, pp. 3885-3889.

(56) References Cited

OTHER PUBLICATIONS

Shim.J et al., "Synergistic effects of coating and doping for lithium ion battery cathode materials: synthesis and characterization of lithium titanate-coated LiCoO2 with Mg doping", Electrochimica Acta, Dec. 20, 2015, vol. 186, pp. 201-208, Elesevier.

Counts. W et al., "Fluoride Model Systems: II, The Binary Systems CaF2—BeF2, MgF2—BeF2, and LiF—MgF2", J. Am. Ceram. Soc. (Journal of the American Ceramic Society), 1953, vol. 36, No. 1, pp. 12-17.

Gicquel.C et al., "Chimie Minerale.—Sur quelques composes oxygenes du titane et des alcalins (Li, Na); etude des binaires M2O—Ti02 dans les zones riches en oxyde alcalin.", Comptes rendus hebdomadaires des seances de l'Academie des sciences. Serie C, Sciences chimiques, Dec. 6, 1972, vol. 275, No. 23, pp. 1427-1430.

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.

Xia.H et al., "Phase Transitions and High-Voltage Electrochemical Behavior of LiCoO2 Thin Films Grown by Pulsed Laser Deposition", J. Electrochem. Soc. (Journal of the Electrochemical Society), Feb. 20, 2007, vol. 154, No. 4, pp. A337-A342.

Taguchi.N et al., "Characterization of MgO-coated-LiCoO2 particles by analytical transmission electron microscopy", Journal of Power Sources, 2016, vol. 328, pp. 161-166, Elsevier.

Shim.J et al., "Characterization of Spinel LixCo2O4-Coated LiCoO2 Prepared with Post-Thermal Treatment as a Cathode Material for Lithium Ion Batteries", Chem. Mater. (Chemistry of Materials), Apr. 10, 2015, vol. 27, No. 9, pp. 3273-3279.

Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), 2006, vol. 153, No. 11, pp. A2152-A2157.

Liu.L et al., "Electrochemical and In Situ Synchrotron XRD Studies on Al2O3-Coated LiCoO2 Cathode Material", J. Electrochem. Soc. (Journal of the Electrochemical Society), 2004, vol. 151, No. 9, pp. A1344-A1351.

Chen.Z et al., "Staging Phase Transitions in LixCoO2", J. Electrochem. Soc. (Journal of the Electrochemical Society), 2002, vol. 149, No. 12, pp. A1604-A1609.

Yano.A et al., "LiCoO2 Degradation Behavior in the High-Voltage Phase Transition Region and Improved Reversibility with Surface Coating", J. Electrochem. SOC. (Journal of the Electrochemical Society), 2017, vol. 164, No. 1, pp. A6116-A6122.

Wang.Z et al., "Structural and electrochemical characterizations of surface-modified LiCoO2 cathode materials for Li-ion batteries", Solid State lonics, Jun. 2, 2002, vol. 148, No. 3-4, pp. 335-342, Elsevier.

Mladenov.M et al., "Effect of Mg doping and MgO-surface modification on the cycling stability of LiCoO2 electrodes.", Electrochemistry Communications, Aug. 1, 2001, vol. 3, No. 8, pp. 410-416.

Wang.Z et al., "Improving the cycling stability of LiCoO2 at 4.5 V through co-modification by Mg doping and zirconium oxyfluoride coating", Ceramics Internationa, 2015, vol. 41, No. 1, pp. 469-474.

Wang.Z et al., "Mg doping and zirconium oxyfluoride coating co-modification to enhance the high-voltage performance of LiCoO2 for lithium ion battery", Journal of Alloys and Compounds, Feb. 5, 2015, vol. 621, pp. 212-219.

Zou.M et al., "Synthesis and Electrochemical Performance of High Voltage Cycling LiM0.05Co0.95O2 as Cathode Material for Lithium Rechargeable Cells", Electrochemical and Solid-State Letters, 2004, vol. 7, No. 7, pp. A176-A179.

Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.

Orikasa.Y et al., "Origin of Surface Coating Effect for MgO on LiCoO2 to Improve the Interfacial Reaction between Electrode and Electrolyte", Adv. Mater. Interfaces (Advanced Materials Interfaces), Aug. 28, 2014, vol. 1, No. 9, pp. 1400195-1-1400195-8.

Gabrisch.H et al., "Hexagonal to Cubic Spinel Transformation in Lithiated Cobalt Oxide TEM Investigation", J. Electrochem. Soc. (Journal of the Electrochemical Society), 2004, vol. 151, No. 6, pp. A891-A897.

Iwaya.K et al., "Impact of Lithium-Ion Ordering on Surface Electronic States of LixCoO2", Phys. Rev. Lett. (Physical Review Letters), Sep. 20, 2013, vol. 111, No. 12, pp. 126104-1-126104-5.

Bensalah.N et al., "Review on Synthesis, Characterizations, and Electrochemical Properties of Cathode Materials for Lithium Ion Batteries", Journal of Material Science & Engineering, 2016, vol. 5, No. 4, pp. 1000258-1-1000258-21.

Jo.C et al., "An effective method to reduce residual lithium compounds on Ni-rich Li[Ni0.6Co0.2Mn0.2]O2 active material using a phosphoric acid derived Li3PO4 nanolayer", Nano Research, Dec. 4, 2014, vol. 8, No. 5, pp. 1464-1479, Springer.

Hong.W et al., "Modification of LiCoO2 by Surface Coating with MgO/TiO2/SiO2 for High-Performance Lithium-Ion Battery", Electrochemical and Solid-State Letters, Dec. 20, 2005, vol. 9, No. 2, pp. A82-A85.

Kim.Y et al., "Suppression of Cobalt Dissolution from the LiCoO2 Cathodes with Various Metal-Oxide Coatings", J. Electrochem. Soc. (Journal of the Electrochemical Society), 2003, vol. 150, No. 12, pp. A1723-A1725.

Jung.H et al., "Improved electrochemical performances of LiM0.05Co0.95O1.95F0.05(M=Mg, Al, Zr) at high voltage", Electrochimica Acta, Feb. 24, 2012, vol. 68, pp. 153-157, Elesevier.

Lin.F et al., "Surface reconstruction and chemical evolution of stoichiometric layered cathode materials for lithium-ion batteries", Nature Communications, Mar. 27, 2014, vol. 5, pp. 3529-1-3529-9.

Tan.H et al., "Microscopy Study of Structural Evolution in Epitaxial LiCoO2 Positive Electrode Films during Electrochemical Cycling", ACS Applied Materials & Interfaces, Feb. 25, 2016, vol. 8, No. 10, pp. 6727-6735.

Thackeray.M et al., "Li2MnO3-stabilized LiMO2(M=Mn, Ni, Co) electrodes for lithium-ion batteries", J. Mater. Chem. (Journal of Materials Chemistry), 2007, vol. 17, pp. 3112-3125.

Appendix C of EPR 90/019,535, portions of JP-2015-201432A and Full translation.

Exhibit 1041 of EPR 90/019,535, JP-2015-201432A and Full translation.

Appendix LL of EPR 90/019,447, JP-2012-074366A and Full translation.

Zhang.J et al., "Trace doping of multiple elements enables stable battery cycling of LiCoO2 at 4.6 V", Nature Energy, Jun. 17, 2019, vol. 4, pp. 594-603.

Hirooka.M et al., "Improvement of float charge durability for LiCoO2 electrodes under high voltage and storage temperature by suppressing O1-Phase transition", Journal of Power Sources, Jul. 1, 2020, vol. 463, pp. 228127-1-228127-8, Elsevier.

Wang.L et al., "A Novel Bifunctional Self-Stabilized Strategy Enabling 4.6 V LiCoO2 with Excellent Long-Term Cyclability and High-Rate Capability", Adv. Sci. (Advanced Science), Apr. 24, 2019, vol. 6, No. 12, pp. 1900355-1-1900355-11.

Okumura.T et al., "Correlation of lithium ion distribution and X-ray absorption near-edge structure in O3- and O2-lithium cobalt oxides from first-principle calculation", J. Mater. Chem. (Journal of Materials Chemistry), 2012, vol. 22, pp. 17340-17348.

Wang.Z et al., "EELS analysis of cation valence states and oxygen vacancies in magnetic oxides", Micron, Oct. 1, 2000, vol. 31, No. 5, pp. 571-580, Elsevier.

Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.

Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.

(56) References Cited

OTHER PUBLICATIONS

Yin.R et al., "In Situ XRD Investigation and Thermal Properties of Mg Doped LiCoO2 for Lithium Ion Batteries", J. Electrochem. Soc. (Journal of the Electrochemical Society), Jan. 3, 2012, vol. 159, No. 3, pp. A253-A258.

Shao-horn.Y et al., "Probing Lithium and Vacancy Ordering in O3 Layered Lix CoO2 (x=0.5) : An Electron Diffraction Study", J. Electrochem. Soc. (Journal of the Electrochemical Society), Feb. 6, 2003, vol. 150, No. 3, pp. A366-A373.

Kalluri.S et al., "Surface Engineering Strategies of Layered LiCoO2 Cathode Material to Realize High-Energy and High-Voltage Li-Ion Cells", Advanced Energy Materials, Oct. 12, 2016, vol. 7, No. 1, pp. 1601507-1-1601507-21.

* cited by examiner

SECONDARY BATTERY, PORTABLE INFORMATION TERMINAL, VEHICLE, AND MANUFACTURING METHOD OF POSITIVE ELECTRODE ACTIVE MATERIAL

CROSS REFERENCE TO RELATED APPLICATIONS

This application is a U.S. National Phase Application under 35 U.S.C. § 371 of International Application PCT/IB2021/050437, filed on Jan. 21, 2021, which is incorporated by reference and claims the benefit of a foreign priority application filed in Japan on Jan. 31, 2020, as Application No. 2020-015581.

TECHNICAL FIELD

Embodiments of the present invention relate to a secondary battery including a positive electrode active material and a manufacturing method thereof. Other embodiments of the present invention relate to a portable information terminal, a vehicle, and the like each including a secondary battery.

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof.

Note that electronic devices in this specification mean all devices including power storage devices, and electro-optical devices including power storage devices, information terminal devices including power storage devices, and the like are all electronic devices.

Note that in this specification, a power storage device refers to every element and device having a function of storing power. For example, a power storage device (also referred to as a secondary battery) such as a lithium-ion secondary battery, a lithium-ion capacitor, and an electric double layer capacitor are included.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, and laptop computers, portable music players, digital cameras, medical equipment, next-generation clean energy vehicles such as hybrid electric vehicles (HVs), electric vehicles (EVs), and plug-in hybrid electric vehicles (PHVs), and the like, and the lithium-ion secondary batteries are essential as rechargeable energy supply sources for today's information society.

Thus, improvement of a positive electrode active material has been studied to increase the cycle performance and the capacity of the lithium-ion secondary battery (Patent Document 1).

The performances required for power storage devices are safe operation and longer-term reliability under various environments, for example.

Fluorides such as fluorite (calcium fluoride) have been used as flux in iron making and the like for a long time and the physical properties thereof have been studied (Non-Patent Document 1).

Compounds containing titanium are used for various purposes and their physical properties have been studied (Non-Patent Document 2).

REFERENCE

Patent Document

[Patent Document 1] Japanese Published Patent Application No. 2019-21456

Non-Patent Document

[Non-Patent Document 1]W. E. Counts, R. Roy, and E. F. Osborn, "Fluoride Model Systems: II, The Binary Systems CaF2-BeF2, MgF2-BeF2, and LiF—MgF2", Journal of the American Ceramic Society, 36[1] 12-17 (1953).

[Non-Patent Document 2] C. Gicquel, M. Mayer, and R. Bouaziz, "Sue quelues composes oxygenes du titane et des alcalins(Li,Na); etude des binaries M2O—TiO2 dans les zones riches en oxyde alcalin", Acad. Sci., Ser. C, 275[23] 1427-1430 (1972).

SUMMARY OF THE INVENTION

Problems to be Solved by the Invention

An object of one embodiment of the present invention is to provide a method for manufacturing a positive electrode active material with little deterioration. Another object of one embodiment of the present invention is to provide a novel method for manufacturing a positive electrode active material.

Another object of one embodiment of the present invention is to provide positive electrode active material particles with little deterioration. Another object of one embodiment of the present invention is to provide novel positive electrode active material particles. Another object of one embodiment of the present invention is to provide a power storage device with little deterioration. Another object of one embodiment of the present invention is to provide a highly safe power storage device. Another object of one embodiment of the present invention is to provide a novel power storage device.

Another object of one embodiment of the present invention is to provide a novel material, novel active material particles, a novel power storage device, or a manufacturing method thereof.

Note that the description of these objects does not preclude the existence of other objects. One embodiment of the present invention does not have to achieve all these objects. Other objects can be derived from the description of the specification, the drawings, and the claims.

Means for Solving the Problems

One embodiment of the present invention is a secondary battery including a positive electrode and a negative electrode, in which the positive electrode includes a positive electrode active material; the positive electrode active material includes a crystal exhibiting a layered rock-salt crystal structure; the crystal is represented by the space group R-3m; the positive electrode active material is a particle containing lithium, cobalt, titanium, magnesium, and oxygen; a concentration of the magnesium in a surface portion of the particle is higher than a concentration of the magnesium in an inner portion of the particle; and in the positive electrode active material, a concentration of the titanium in the surface portion of the particle is higher than a concentration of the titanium in the inner portion of the particle.

In the above embodiment, the positive electrode active material preferably contains fluorine.

Another embodiment of the present invention is a vehicle including the secondary battery described above, an electric motor, and a control device, in which the control device has a function of supplying electric power from the secondary battery to the electric motor.

Another embodiment of the present invention is a portable information terminal including the secondary battery described above, a sensor, and an antenna, in which the portable information terminal has a function of wireless communication using the antenna; and the sensor has a function of measuring displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays.

Another embodiment of the present invention is a method for manufacturing a positive electrode active material, which includes the following steps: a first step of mixing a titanium compound, a lithium compound, and a cobalt-containing material to form a first mixture; and a second step of heating the first mixture. In the method, the cobalt-containing material contains magnesium and oxygen, and a heating temperature in the second step is higher than or equal to 780° C. and lower than or equal to 1150° C.

In the above embodiment, the cobalt-containing material preferably contains fluorine.

In the above embodiment, the titanium compound preferably contains oxygen and the lithium compound preferably contains oxygen.

In the above embodiment, the titanium compound and the lithium compound preferably have an eutectic point at higher than or equal to 780° C. and lower than or equal to 1150° C.

Another embodiment of the present invention is a method for manufacturing a positive electrode active material, which includes the following steps: a first step of mixing lithium cobalt oxide, a magnesium compound, and a fluoride to form a first mixture; a second step of heating the first mixture to form a cobalt-containing material; a third step of mixing the cobalt-containing material, a titanium compound, and a lithium compound to form a second mixture; and a fourth step of heating the second mixture. In the method, a heating temperature in the fourth step is higher than or equal to 780° C. and lower than or equal to 1150° C.

In the above embodiment, it is preferable that the titanium compound contain oxygen and the lithium compound contain oxygen.

In the above embodiment, it is preferable that the magnesium compound be magnesium fluoride and the fluoride be lithium fluoride.

In the above embodiment, the titanium compound and the lithium compound preferably have an eutectic point at higher than or equal to 780° C. and lower than or equal to 1150° C.

Another embodiment of the present invention is a method for manufacturing a positive electrode active material, which includes the following steps: a first step of mixing a composite oxide, a magnesium compound, and a fluoride to form a first mixture; a second step of heating the first mixture to form a cobalt-containing material; a third step of mixing the cobalt-containing material, a titanium compound, and a lithium compound to form a second mixture; and a fourth step of heating the second mixture. In the method, the composite oxide has a layered rock-salt crystal structure; the composite oxide contains cobalt; the composite oxide contains one or more selected from nickel, manganese, and aluminum; and a heating temperature in the fourth step is higher than or equal to 780° C. and lower than or equal to 1150° C.

In the above embodiment, it is preferable that the titanium compound contain oxygen and the lithium compound contain oxygen.

In the above embodiment, it is preferable that the magnesium compound be magnesium fluoride and the fluoride be lithium fluoride.

In the above embodiment, the titanium compound and the lithium compound preferably have an eutectic point at higher than or equal to 780° C. and lower than or equal to 1150° C.

Effect of the Invention

According to one embodiment of the present invention, a method for manufacturing a positive electrode active material with little deterioration can be provided. According to another embodiment of the present invention, a novel method for manufacturing a positive electrode active material can be provided.

According to another embodiment of the present invention, provide positive electrode active material particles with little deterioration can be provided. According to another embodiment of the present invention, a method for manufacturing a positive electrode active material can be provided. According to another embodiment of the present invention, novel positive electrode active material particles can be provided. According to another embodiment of the present invention, a novel power storage device can be provided.

According to another embodiment of the present invention, a novel material, novel active material particles, a novel power storage device, or a manufacturing method thereof can be provided.

Note that the description of these effects does not preclude the existence of other effects. One embodiment of the present invention does not have to have all of these effects. Other effects will be apparent from and can be derived from the description of the specification, the drawings, the claims, and the like.

MODE FOR CARRYING OUT THE INVENTION

Figure 1:
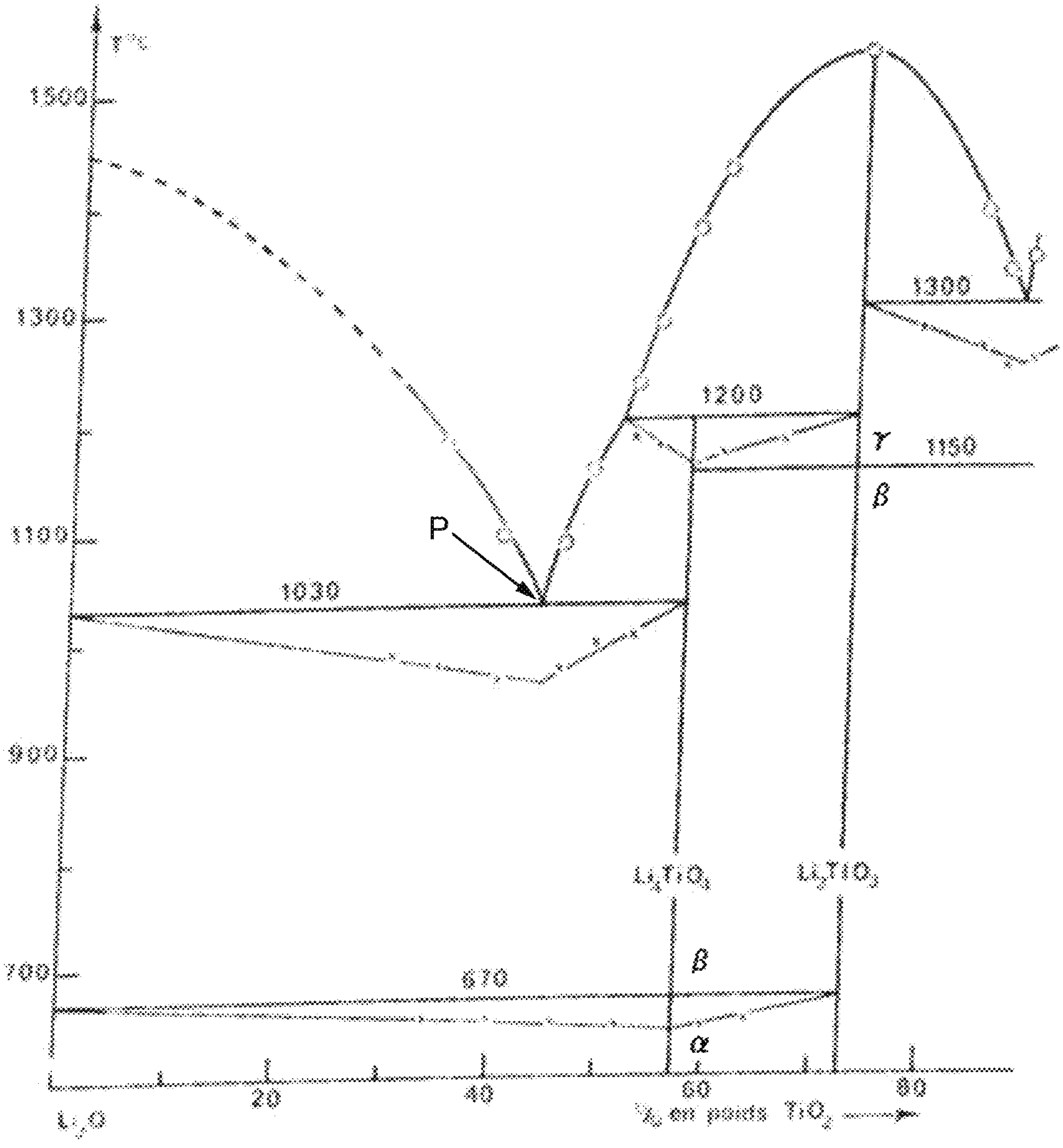
FIG. 1 is a phase diagram showing a relation between the proportions of Li2O and TiO2 and temperature.

Embodiments of the present invention are described in detail below with reference to the drawings. Note that the present invention is not limited to the following descriptions, and it is readily understood by those skilled in the art that modes and details of the present invention can be modified in various ways. In addition, the present invention should not be construed as being limited to the descriptions of the embodiments below.

In addition, in this specification and the like, crystal planes and orientations are indicated by the Miller index. In the crystallography, a bar is placed over a number in the expression of crystal planes and orientations; however, in this specification and the like, crystal planes and orientations are in some cases expressed by placing − (a minus sign) before a number instead of placing the bar over the number due to expression limitations. Furthermore, an individual direction which shows an orientation in a crystal is denoted with "[ ]", a set direction which shows all of the equivalent orientations is denoted with "< >", an individual plane which shows a crystal plane is denoted with "( )", and a set plane having equivalent symmetry is denoted with "{ }".

In this specification and the like, segregation refers to a phenomenon in which in a solid made of a plurality of elements (e.g., A, B, and C), a certain element (e.g., B) is spatially non-uniformly distributed.

In this specification and the like, a surface portion of a particle of an active material or the like is preferably a region that is less than or equal to 50 nm, preferably less than or equal to 35 nm, further preferably less than or equal to 20 nm from the surface, for example. A plane generated by a crack may also be referred to as the surface. In addition, a region in a deeper position than a surface portion is referred to as an inner portion.

In this specification and the like, a layered rock-salt crystal structure of a composite oxide including lithium and a transition metal refers to a crystal structure in which a rock-salt ion arrangement where cations and anions are alternately arranged is included and the transition metal and lithium are regularly arranged to form a two-dimensional plane, so that lithium can be two-dimensionally diffused. Note that a defect such as a cation or anion vacancy may exist. Moreover, in the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In this specification and the like, an O3' type crystal structure of a composite oxide including lithium and a transition metal belongs to the space group R-3m, and is not a spinel crystal structure but a crystal structure in which an ion of cobalt, magnesium, or the like is coordinated to six oxygen atoms and the cation arrangement has symmetry similar to that of the spinel crystal structure. Note that in the O3' type crystal structure, a light element such as lithium is sometimes coordinated to four oxygen atoms. Also in that case, the ion arrangement has symmetry similar to that of the spinel crystal structure.

The O3' type crystal structure can also be regarded as a crystal structure that includes Li between layers at random but is similar to a CdCl2 type crystal structure. The crystal structure similar to the CdCl2 type crystal structure is close to a crystal structure of lithium nickel oxide when charged up to a depth of charge of 0.94 (Li0.06NiO2); however, simple and pure lithium cobalt oxide or a layered rock-salt positive electrode active material including a large amount of cobalt is known not to have this crystal structure generally.

Anions of a layered rock-salt crystal and anions of a rock-salt crystal have cubic closest packed structures (face-centered cubic lattice structures). Anions of an O3' type crystal are also presumed to have cubic closest packed structures. When the O3' type crystal is in contact with the layered rock-salt crystal and the rock-salt crystal, there is a crystal plane at which orientations of cubic closest packed structures composed of anions are aligned. Note that a space group of the layered rock-salt crystal and the O3' type crystal is R-3m, which is different from the space group Fm-3m of a rock-salt crystal (a space group of a general rock-salt crystal) and the space group Fd-3m of a rock-salt crystal (a space group of a rock-salt crystal having the simplest symmetry); thus, the Miller index of the crystal plane satisfying the above conditions in the layered rock-salt crystal and the O3' type crystal is different from that in the rock-salt crystal. In this specification, a state where the orientations of the cubic closest packed structures composed of anions in the layered rock-salt crystal, the O3' type crystal, and the rock-salt crystal are aligned is referred to as a state where crystal orientations are substantially aligned in some cases.

Substantial alignment of the crystal orientations in two regions can be judged from a TEM (transmission electron microscopy) image, a STEM (scanning transmission electron microscopy) image, a HAADF-STEM (high-angle annular dark-field scanning transmission electron microscopy) image, an ABF-STEM (annular bright-field scanning transmission electron microscopy) image, or the like. X-ray diffraction (XRD), electron diffraction, neutron diffraction, and the like can also be used for judging. In the TEM image and the like, alignment of cations and anions can be observed as repetition of bright lines and dark lines. When the orientations of cubic closest packed structures in the layered rock-salt crystal and the rock-salt crystal are aligned, a state where an angle made by the repetition of bright lines and dark lines in the layered rock-salt crystal and the rock-salt crystal is less than or equal to 5°, further preferably less than or equal to 2.5° can be observed. Note that in the TEM image and the like, a light element such as oxygen or fluorine cannot be clearly observed in some cases; however, in such a case, alignment of orientations can be judged by arrangement of metal elements.

In this specification and the like, the theoretical capacity of a positive electrode active material refers to the amount of electricity for the case where all the lithium that can be inserted and extracted in the positive electrode active material is extracted. For example, the theoretical capacity of $LiCoO2$ is 274 mAh/g, the theoretical capacity of $LiNiO2$ is 274 mAh/g, and the theoretical capacity of $LiMn2O4$ is 148 mAh/g.

In this specification and the like, the depth of charge obtained when all the lithium that can be inserted and extracted is inserted is 0, and the depth of charge obtained when all the lithium that can be inserted and extracted in a positive electrode active material is extracted is 1.

In addition, in this specification and the like, charging refers to transfer of lithium ions from a positive electrode to a negative electrode in a battery and transfer of electrons from a positive electrode to a negative electrode in an external circuit. For a positive electrode active material, extraction of lithium ions is called charging. A positive electrode active material with a depth of charge of greater than or equal to 0.7 and less than or equal to 0.9 may be referred to as a positive electrode active material charged with a high voltage.

Similarly, discharging refers to transfer of lithium ions from a negative electrode to a positive electrode in a battery and transfer of electrons from a negative electrode to a positive electrode in an external circuit. Discharging of a positive electrode active material refers to insertion of lithium ions. Furthermore, a positive electrode active material with a depth of charge of less than or equal to 0.06 or a positive electrode active material from which more than or equal to 90% of the charge capacity is discharged from a state where the positive electrode active material is charged with high voltage is referred to as a sufficiently discharged positive electrode active material.

In this specification and the like, an unbalanced phase change refers to a phenomenon that causes a nonlinear change in physical quantity. For example, an unbalanced phase change might occur before and after peaks in a dQ/dV curve obtained by differentiating capacitance (Q) with voltage (V) (dQ/dV), which can largely change the crystal structure.

A secondary battery includes a positive electrode and a negative electrode, for example. A positive electrode active material is a material included in the positive electrode. The positive electrode active material is a material that performs a reaction contributing to the charge and discharge capacity, for example. Note that the positive electrode active material may partly include a material that does not contribute to the charge and discharge capacity.

In this specification and the like, the positive electrode active material of one embodiment of the present invention is expressed as a positive electrode material, a secondary battery positive electrode material, or the like in some cases. In this specification and the like, the positive electrode active material of one embodiment of the present invention preferably includes a compound. In this specification and the like, the positive electrode active material of one embodiment of the present invention preferably includes a composition. In this specification and the like, the positive electrode active material of one embodiment of the present invention preferably includes a composite.

The discharge rate refers to the relative ratio of a current at the time of discharging to battery capacity and is expressed in a unit C. A current corresponding to 1 C in a battery with a rated capacity X (Ah) is X (A). The case where discharging is performed with a current of 2X (A) is rephrased as to perform discharging at 2 C, and the case where discharging is performed with a current of X/5 (A) is rephrased as to perform discharging at 0.2 C. The same applies to the charge rate; the case where charging is performed with a current of 2X (A) is rephrased as to perform charging at 2 C, and the case where charging is performed with a current of X/5 (A) is rephrased as to perform charging at 0.2 C.

Constant current charging refers to a charging method with a fixed charge rate, for example. Constant voltage charging refers to a charging method in which voltage is fixed when reaching the upper voltage limit, for example. Constant current discharging refers to a discharging method with a fixed discharge rate, for example.

Embodiment 1

A positive electrode active material of one embodiment of the present invention and examples of a manufacturing method thereof are described below.

The positive electrode active material of one embodiment of the present invention contains lithium, a metal Me1, a metal X, titanium, and oxygen.

The metal Me1 is one or more kinds of metals including cobalt.

The metal X is a metal other than cobalt, and for example, a metal such as magnesium, calcium, zirconium, lanthanum, barium, copper, potassium, sodium, or zinc can be used as the metal X In particular, magnesium is preferably used as the metal X.

The positive electrode active material of one embodiment of the present invention preferably contains fluorine.

The positive electrode active material of one embodiment of the present invention may contain, as the metal Me1, one or more kinds of metals (represented by a metal Me1_2) selected from nickel, manganese, aluminum, iron, vanadium, chromium, and niobium, in addition to cobalt.

When the metal Me1_2 as well as cobalt is contained as the metal Me1, the bond distance between the metal Me1 and oxygen can be controlled in a crystal structure of the positive electrode active material. By controlling the bond distance between the metal Me1 and oxygen, a secondary battery including the positive electrode active material of one embodiment of the present invention can have excellent characteristics, for example. Here, it is particularly preferable to use nickel as well as cobalt, as the metal Me1.

For example, in the positive electrode active material of one embodiment of the present invention, the molar ratio of lithium:cobalt:the metal Me1_2 is expressed by lithium: cobalt:the metal Me1_2=1.03:1−x:x, and x preferably satisfies $0<x<1$, further preferably $0.3<x<0.75$, still further preferably 0.4×0.6.

For example, in the positive electrode active material of one embodiment of the present invention, the metal Me1 is cobalt and nickel. The molar ratio of lithium:cobalt:nickel is expressed by lithium:cobalt:nickel=1.03:1−x:x, and x preferably satisfies $0<x<1$, further preferably $0.3<x<0.75$, still further preferably $0.4\leq x\leq 0.6$.

<Example of Manufacturing Method for Positive Electrode Active Material>

An example of a manufacturing method for the positive electrode active material of one embodiment of the present invention is described with reference to a flowchart shown in FIG. 3.

First, in Step S21, a titanium compound 806 is prepared. It is preferable that the titanium compound 806 have an eutectic point with a lithium compound 807 described later.

As the titanium compound 806, a compound containing titanium and oxygen can be used. For example, an oxide containing titanium is used. Specifically, it is possible to use titanium oxide (TiOx, x preferably satisfies $0<x<3$, further preferably $1.5<x<2.5$, still further preferably 2 or a value in the neighborhood thereof), for example.

In the case of employing a sol-gel method, titanium oxide, titanium hydroxide, or titanium alkoxide can be used as the titanium compound 806, for example. By performing a sol-gel method using such a compound, titanium oxide can be generated, for example. As titanium alkoxide, titanium tetraethoxide, titanium tetraisopropoxide, or titanium tetrabutoxide, can be used, for example.

In Step S22, the lithium compound 807 is prepared. The lithium compound 807 preferably has an eutectic point with the titanium compound 806.

A compound containing oxygen can be used as the lithium compound 807. As the lithium compound, it is possible to use lithium oxide (LixO, x preferably satisfies $0<x<3$, further preferably $1.5<x<2.5$, still further preferably 2 or a value in the neighborhood thereof), lithium carbonate (Li2Co3), or lithium hydroxide (LiOH), for example.

The case where the titanium compound 806 is titanium oxide or a precursor of titanium oxide is considered. In such a case, lithium oxide has an eutectic point with titanium oxide and thus is preferred as the lithium compound 807. In the case where lithium carbonate is used as the lithium compound 807, it is decomposed in a heating step in later Step S51, whereby lithium oxide can be generated. In the case where lithium hydroxide is used as the lithium compound 807, lithium oxide is generated in the heating step in later Step S51 in some cases. For this reason, lithium carbonate or lithium hydroxide is preferably used as the lithium compound 807.

Lithium carbonate has an advantage of being stable at room temperature in an air atmosphere and thus is easily handled.

In the case where lithium oxide is used as the lithium compound 807, its reaction with a solvent or its reaction with water vapor or a gas such as carbon dioxide in an atmosphere might change at least part of lithium oxide into a compound such as lithium carbonate or lithium hydroxide in the process of the manufacturing method for a positive electrode active material of one embodiment of the present invention.

Here, for example, titanium oxide is used as the titanium compound 806, and lithium oxide is used as the lithium compound 807.

Next, in Step S23, the materials prepared in Step S21 and Step S22 are mixed. Furthermore, grinding is preferably performed in Step S23.

Although the mixing can be performed by a dry method or a wet method, the wet method is preferable because the materials can be ground to a smaller size. Grinding the materials to be mixed to a smaller size may promote a reaction thereof. When the mixing is performed by a wet method, a solvent is prepared. As the solvent, ketone such as acetone, alcohol such as ethanol or isopropanol, ether, dioxane, acetonitrile, N-methyl-2-pyrrolidone (NMP), or the like can be used. An aprotic solvent that hardly reacts with lithium is further preferably used.

Here, the grinding is performed using a ball mill using acetone prepared as a solvent, for example.

For example, a ball mill, a bead mill, or the like can be used for the mixing and grinding. When a ball mill is used, zirconia balls are preferably used as media, for example. The mixing and grinding steps are preferably performed sufficiently to pulverize a mixture 809.

When a sol-gel method is employed, for example, alcohol is used as a solvent and stirring is performed using a magnetic stirrer or the like for the mixing. The stirring can proceed a sol-gel reaction.

Here, the number of moles of titanium contained in the titanium compound 806 with respect to the sum of the number of moles of cobalt, nickel, manganese, and aluminum in metals contained in a cobalt-containing material to be prepared in S26 described later is, for example, greater than or equal to 0.05% and less than or equal to 5% or greater than or equal to 0.1% and less than or equal to 2%, and is, for example, 0.5% (0.005 times).

The number of moles of lithium in the lithium compound 807 is greater than or equal to 1.0 times and less than or equal to 10 times or greater than or equal to 1.5 times and less than or equal to 5 times, for example, 3.4 times the number of moles of the titanium compound 806, for example.

The mixture 809 preferably has, for example, a smaller average particle diameter (D50) than a cobalt-containing material 808 described later. The D50 of the mixture 809 is greater than or equal to 0.005 μm and less than or equal to 20 μm or greater than or equal to 0.005 μm and less than or equal to 5 μm, for example.

In Step S24, the materials mixed and ground in the above manner are collected, whereby the mixture 809 is obtained in Step 25. When the materials in the solvent are collected, filtration, centrifugation, evaporation to dryness, or the like can be employed to separate the materials from the solvent.

Separation from the solvent is not necessarily performed in this step and may be performed in Step S28 described later.

Next, in Step S26, a composite oxide containing lithium, the metal Me1, the metal X, and oxygen is used as the cobalt-containing material 808. A material manufactured in advance as the cobalt-containing material 808 may be used or the cobalt-containing material 808 may be manufactured. In manufacturing the cobalt-containing material 808, one or more selected from various methods such as a solid phase method and a liquid-phase method can be employed. As a liquid-phase method, a coprecipitation method can be employed, for example. In the case where the cobalt-containing material contains a plurality of transition metals, the use of a coprecipitation method may facilitate uniform distribution of the transition metals. When the transition metals are uniformly distributed, the cobalt-containing material may have few grain boundaries, for example. Alternatively, one or more selected from liquid phase methods such as a spray pyrolysis method, a double decomposition method, a method employing precursor pyrolysis, a reverse micelle method, a method in which any of these methods is combined with high-temperature baking, and a freeze-drying method can be employed. An example of a manufacturing method for the cobalt-containing material 808 is described later.

Next, the mixture 809 obtained in Step S25 and the cobalt-containing material 808 prepared in Step S26 are mixed and ground in Step S27. At this time, the grinding is performed more moderately than that in Step S23, whereby cleavage of the cobalt-containing material 808, generation of cracks, generation of crystal defects, and the like can be inhibited. For example, the grinding in Step S23 is performed by a wet method, and the grinding in Step S27 is performed by a dry method. Here, for example, the grinding is performed by a dry method using a ball mill.

Next, in Step S28, the materials mixed and ground in the above manner are collected, whereby a mixture 810 is obtained in Step S29.

Then, the mixture 810 is heated in Step S51. This step is referred to as annealing in some cases. The positive electrode active material of one embodiment of the present invention is produced by the annealing. The meaning of annealing in this specification includes the case where the mixture 810 is heated and the case where a heating furnace in which at least the mixture 810 is placed is heated. The heating furnace may be provided with a pump having a function of reducing and/or increasing pressure in the heating furnace. For example, pressure may be applied during the annealing in Step S51.

The annealing temperature in S51 is preferably higher than or equal to the temperature at which a reaction between the titanium compound 806 and the lithium compound 807 can progress. The temperature at which a reaction can progress can be a temperature at which mutual diffusion of elements contained in the titanium compound 806 and the lithium compound 807 can occur. Thus, the temperature at which a reaction can progress may refer to a temperature lower than the melting temperatures of these materials. For example, in an oxide, solid phase diffusion occurs at a temperature of 0.757 times the melting temperature Tm (Tamman temperature Td).

Note that the annealing temperature is preferably higher than or equal to the temperature at which at least part of the mixture 810 is melted, in which case the reaction can more easily progress. Therefore, the annealing temperature is preferably higher than or equal to the eutectic point of the titanium compound 806 and the lithium compound 807. In the case where the titanium compound 806 contains TiO2 and the lithium compound 807 contains Li2O, the eutectic point P of TiO2 and Li2O is near 1030° C. as shown in FIG. 1 (which is cited from FIG. 1 of Non-Patent Document 2 and retouched) and thus the annealing temperature in S51 is preferably higher than or equal to 780° C.

According to FIG. 1, the weight of TiO2 at the eutectic point P is 44% of the sum of the weight of TiO2 and Li2O, and the molar ratio of TiO2 to Li2O is approximately TiO2:Li2O=1:3.4.

Covering part of a surface of the cobalt-containing material 808 with an eutectic mixture of TiO2 and Li2O or a molten substance from one of them may smooth a surface of a positive electrode active material 811. A reaction of an eutectic mixture of TiO2 and Li2O or a molten substance from one of them with the cobalt-containing material 808 may smooth a surface of the positive electrode active material 811.

When the surface of the positive electrode active material is smooth, the concentration of stress is relieved; therefore, the positive electrode active material is less likely to be broken in steps of pressure application and charge and discharge. Here, the positive electrode active material has a form of particles, for example.

Surface smoothness can be quantitively determined by analysis of microscope images of positive electrode active material particles. As a microscope, a surface SEM, a cross-sectional SEM, or a cross-sectional TEM can be used, for example. Smoothness may be determined by the ratio of a projected region to a depressed region on extracted outlines of the particles.

In addition, when the titanium compound 806 and the cobalt-containing material 808 are mixed and heating is performed, an interaction or reaction between the metal X contained in the cobalt-containing material and titanium may cause movement of at least part of the metal X to the surface of the cobalt-containing material, forming a compound containing the metal X and titanium or a mixture containing the metal X and titanium on the surface of the positive electrode active material in the form of particles. In such a case, projections are sometimes formed on the surface of the positive electrode active material.

In the case where a material that forms an eutectic mixture with the titanium compound 806 is used as the lithium compound 807, the titanium compound 806, the cobalt-containing material 808, and the lithium compound 807 are mixed and heated, whereby an interaction or reaction between the titanium compound 806 and the cobalt-containing material 808 is inhibited. Thus, movement of the metal X to the surface of the cobalt-containing material can be inhibited.

When the eutectic mixture of TiO2 and Li2O is difficult to form, for example, when the ratio of TiO2 to Li2O is significantly away from the condition for forming the eutectic point, in some cases, TiO2 cannot spread in a large area of the surface of the cobalt-containing material 808, forming many projections and depressions on the surface of the positive electrode active material. When the surface of the positive electrode active material has many projections and depressions, stress concentrates on a certain portion, so that the positive electrode active material might be likely to be broken or cracked. When the positive electrode active material is broken or cracked, dissolution of a transition metal, an excessive side reaction, or the like is likely to occur. Such a phenomenon is not preferable in terms of cycle performance, reliability, safety, and the like.

Figure 2:
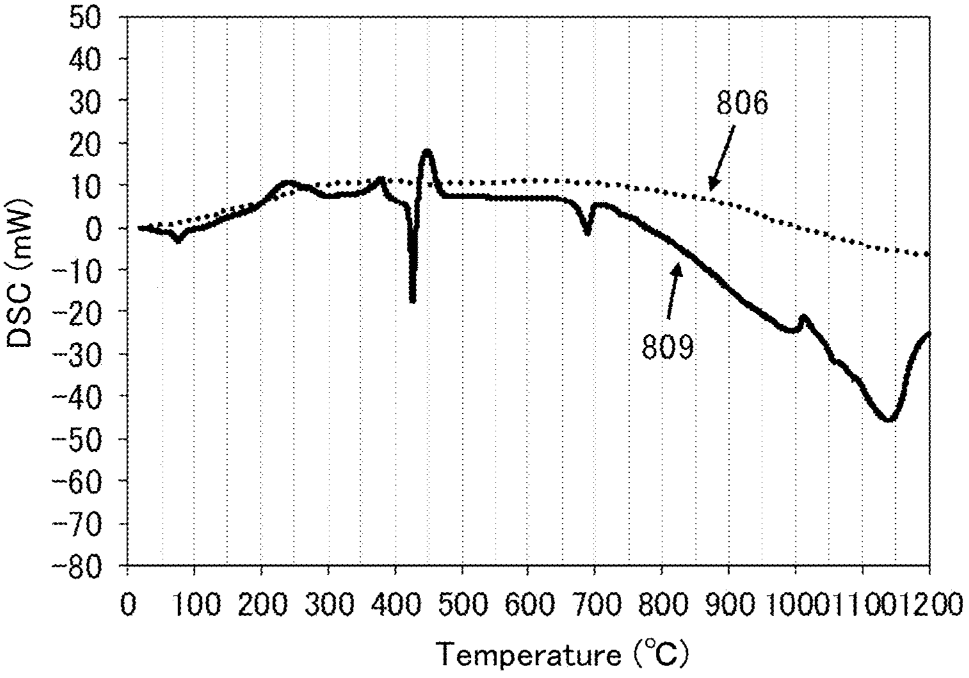
FIG. 2 shows results of DSC.

Here, the differential scanning calorimetry measurement (DSC measurement) of the mixture 809 is described with reference to FIG. 2. In FIG. 2, a result indicated with "809" is a measurement result of the mixture 809; TiO2 was used as the titanium compound and Li2O was used as the lithium compound. Mixing was performed such that TiO2:Li2O=1:3.4 (molar ratio). In FIG. 2, a result indicated with "806" is a measurement result of the titanium compound 806; TiO2 was used as the titanium compound.

As shown in FIG. 2, endothermic peaks are observed at around 427° C., around 689° C., and around 1139° C. for the mixture 809. A significant peak is not observed for the titanium compound 806.

The endothermic peaks at 427° C. and 689° C. may be attributed to a decomposition product of the lithium compound or the titanium compound. When the melting point of the decomposition product is taken into consideration, the endothermic peak at around 427° C. may be attributed to a peak of LiOH (its melting point is approximately 450° C.), and the endothermic peak at around 689° C. may be attributed to a peak of Li2CO3 (its melting point is approximately 700° C.).

The eutectic point of the mixture 809 is presumably the endothermic peak at around 1139° C., which suggests that the mixture 809 has a lower melting point than the titanium compound 806.

The annealing temperature in Step S51 is preferably higher than or equal to 780° C. and lower than or equal to 1150° C., further preferably higher than or equal to 860° C. and lower than or equal to 1140° C., still further preferably higher than or equal to 950° C. and lower than or equal to 1100° C., and for example, is preferably 1050° C.

Next, in Step S52, the materials annealed in the above manner are collected, whereby the positive electrode active material 811 is obtained in Step S53.

Example 2 of Manufacturing Method for Positive Electrode Active Material

Figure 3:
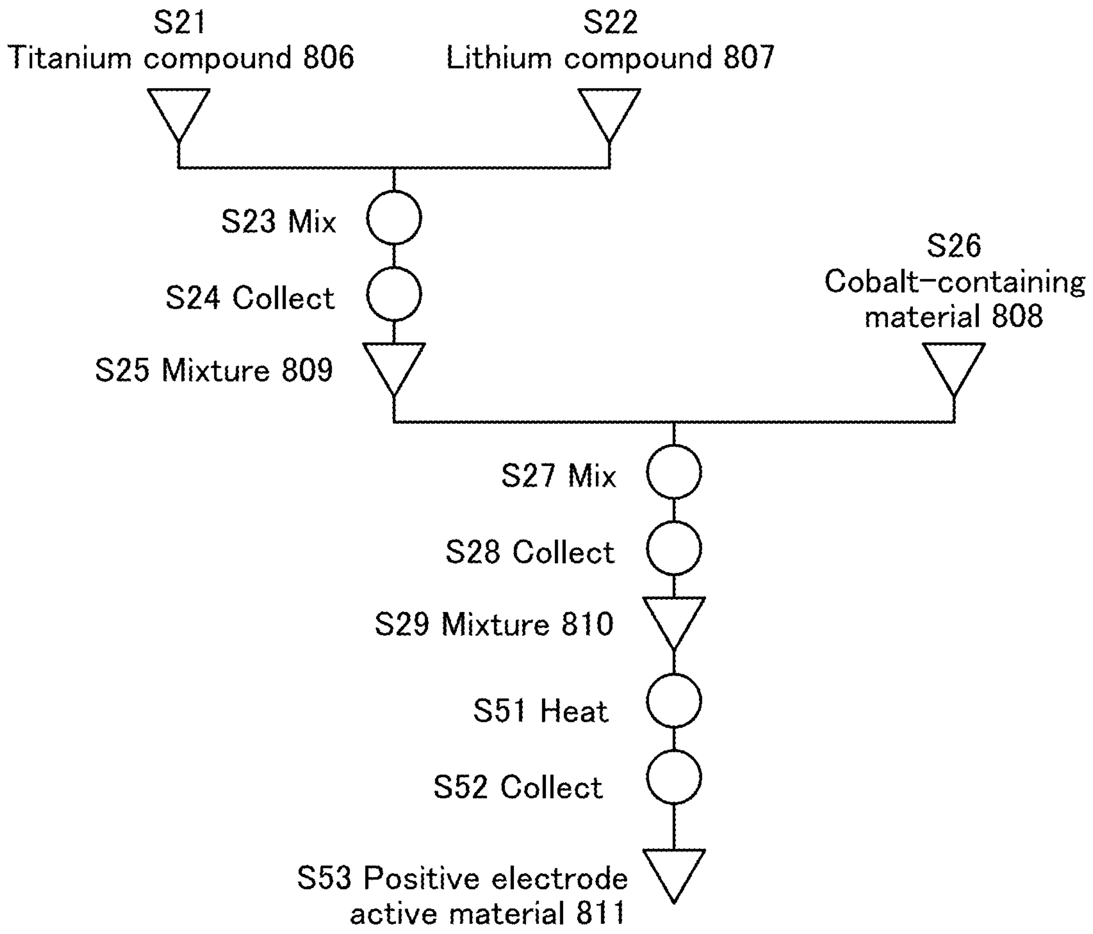
FIG. 3 is a diagram showing a method for manufacturing a positive electrode active material.
Figure 4:
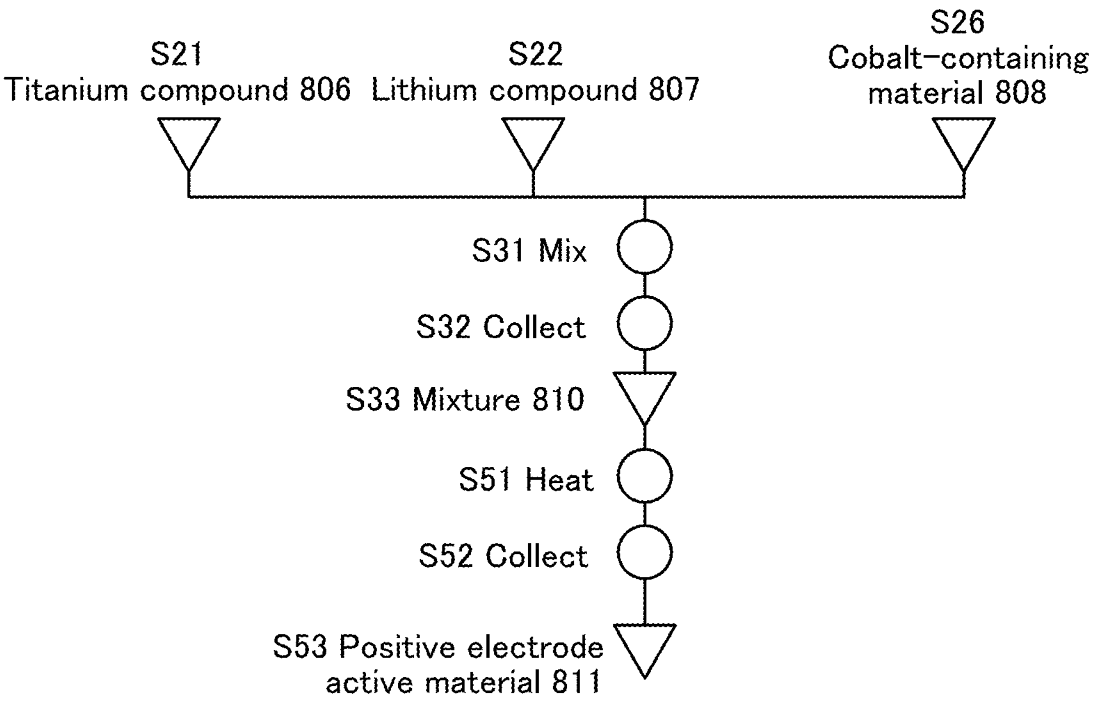
FIG. 4 is a diagram showing a method for manufacturing a positive electrode active material.

As shown in FIG. 4, the titanium compound 806, the lithium compound 807, and the cobalt-containing material 808 may be mixed in Step S31, and the Steps S23 and S24 and Step S25 in FIG. 3 may be omitted.

In Step S31 in FIG. 4, the materials prepared in Step S21, Step S22, and Step S26 are mixed and ground. The mixing can be performed by a dry method or a wet method.

In Step S32, the materials mixed in the above manner are collected, whereby the mixture 810 is obtained in Step S33.

In FIG. 4, FIG. 3 can be referred to for Step S51 and subsequent steps.

<Example of Manufacturing Method for Cobalt-Containing Material>

Next, an example of a manufacturing method for LiMO2 of one embodiment of a material that can be used as the cobalt-containing material 808 is described with reference to FIG. 5. The metal M contains the metal Me1 given above. The metal M can contain the metal X given above in addition to the metal Me1 given above. A cobalt-containing material in which the metal M contains the metal X which is Mg is described as an example below. Note that the positive electrode active material of one embodiment of the present invention has a crystal structure of a lithium composite oxide represented by LiMO2, but the composition is not limited to Li:M:O=1:1:2.

First, in Step S11, a composite oxide containing lithium, a transition metal, and oxygen is used as a composite oxide 801. Here, one or more transition metals including cobalt are preferably used.

The composite oxide containing lithium, a transition metal, and oxygen can be synthesized by heating a lithium source and a transition metal source in an oxygen atmosphere. As the transition metal source, a metal that can form, together with lithium, a layered rock-salt composite oxide belonging to the space group R-3m is preferably used. For example, at least one of manganese, cobalt, and nickel can be used as the transition metal. Aluminum may be used in addition to these transition metals. That is, as the transition metal source, only a cobalt source may be used; only a nickel source may be used; two types of cobalt and manganese sources or two types of cobalt and nickel sources may be used; or three types of cobalt, manganese, and nickel sources may be used. Furthermore, an aluminum source may be used in addition to these metal sources. The heating temperature at this time is preferably higher than the temperature in Step S17 described later. For example, the heating can be performed at 1000° C. This heating step is referred to as baking in some cases.

In the case where a composite oxide containing lithium, a transition metal, and oxygen that is synthesized in advance is used, a composite oxide with few impurities is preferably used. In this specification and the like, lithium, cobalt, nickel, manganese, aluminum, and oxygen are the main components of the composite oxide containing lithium, a transition metal, and oxygen, the cobalt-containing material, and the positive electrode active material, and elements other than the main components are regarded as impurities. For example, when analyzed with a glow discharge mass spectroscopy method, the total impurity concentration is preferably less than or equal to 10,000 ppmw (parts per million weight), further preferably less than or equal to 5000 ppmw. For example, the total impurity concentration of transition metals and arsenic is less than or equal to 3000 ppmw or less than or equal to 1500 ppmw. For example, the total impurity concentration of transition metals such as titanium and arsenic is less than or equal to 3000 ppmw or less than or equal to 1500 ppmw.

For example, as the lithium cobalt oxide synthesized in advance, lithium cobalt oxide particles (product name: CELLSEED C-10N) formed by NIPPON CHEMICAL INDUSTRIAL CO., LTD. can be used. This is lithium cobalt oxide in which the average particle diameter (D50) is approximately 12 μm, and in the impurity analysis by a glow discharge mass spectroscopy method (GD-MS), the magnesium concentration and the fluorine concentration are less than or equal to 50 ppmw, the calcium concentration, the aluminum concentration, and the silicon concentration are less than or equal to 100 ppmw, the nickel concentration is less than or equal to 150 ppmw, the sulfur concentration is less than or equal to 500 ppmw, the arsenic concentration is less than or equal to 1100 ppmw, and the concentrations of elements other than lithium, cobalt, and oxygen are less than or equal to 150 ppmw.

The composite oxide 801 in Step S1*l* preferably has a layered rock-salt crystal structure with few defects and distortions. Therefore, the composite oxide is preferably a composite oxide with few impurities. In the case where the composite oxide containing lithium, the transition metal, and oxygen includes a large number of impurities, the crystal structure is highly likely to have a large number of defects or distortions.

Furthermore, a fluoride 802 is prepared in Step S12. As the fluoride, for example, lithium fluoride (LiF), magnesium fluoride (MgF2), aluminum fluoride (AlF3), titanium fluoride (TiF4), cobalt fluoride (CoF2 and CoF3), nickel fluoride (NiF2), zirconium fluoride (ZrF4), vanadium fluoride (VF5), manganese fluoride, iron fluoride, chromium fluoride, niobium fluoride, zinc fluoride (ZnF2), calcium fluoride (CaF2), sodium fluoride (NaF), potassium fluoride (KF), barium fluoride (BaF2), cerium fluoride (CeF2), lanthanum fluoride (LaF3), or sodium aluminum hexafluoride (Na3AlF6) can be used. As the fluoride 802, any material that functions as a fluorine source can be used. Thus, in place of the fluoride 802 or as part thereof, fluorine (F2), carbon fluoride, sulfur fluoride, oxygen fluoride (OF2, O2F2, O3F2, O4F2, or O2F), or the like may be used and mixed in an atmosphere.

In the case where a compound containing the metal X is used as the fluoride 802, a compound 803 (a compound containing the metal X) described later can also serve as the fluoride 802.

In this embodiment, lithium fluoride (LiF) is prepared as the fluoride 802. LiF is preferable because it has a cation common with LiCoO2. LiF, which has a relatively low melting point of 848° C., is preferable because it is easily melted in an annealing process described later.

In the case where LiF is used as the fluoride 802, the compound 803 (the compound containing the metal X) is preferably prepared in addition to the fluoride 802 in Step S13. The compound 803 is the compound containing the metal X.

In Step S13, the compound 803 is prepared. As the compound 803, a fluoride, an oxide, a hydroxide, or the like of the metal X can be used, and in particular, a fluoride is preferably used.

In the case where magnesium is used as the metal X, a magnesium compound can be used as the compound 803. Here, as the compound 803, MgF2 can be used, for example. Magnesium can be distributed at a high concentration in the vicinity of the surface of the cobalt-containing material.

A material containing a metal that is neither cobalt nor the metal X in addition to the fluoride 802 and the compound 803 may be mixed. As the material containing a metal that is neither cobalt nor the metal X, a nickel source, a manganese source, an aluminum source, an iron source, a vanadium source, a chromium source, a niobium source, a titanium source, or the like can be mixed, for example. For example, a hydroxide, a fluoride, an oxide, or the like of each metal is preferably pulverized and mixed. The pulverization can be performed by wet method, for example.

The sequence of Step S11, Step S12, and Step S13 may be freely determined.

Next, in Step S14, the materials prepared in Step S11, Step S12, and Step S13 are mixed and ground. Although the mixing can be performed by a dry method or a wet method, a wet method is preferable because the materials can be ground to a smaller size. When the mixing is performed by a wet method, a solvent is prepared. As the solvent, ketone such as acetone, alcohol such as ethanol or isopropanol, ether, dioxane, acetonitrile, N-methyl-2-pyrrolidone (NMP), or the like can be used. An aprotic solvent that hardly reacts with lithium is further preferably used. In this embodiment, acetone is used.

For example, a ball mill, a bead mill, or the like can be used for the mixing. When a ball mill is used, zirconia balls can be used as media, for example. The mixing and grinding steps are preferably performed sufficiently to pulverize a mixture 804.

The materials mixed and ground in the above manner are collected in Step S15, whereby the mixture 804 is obtained in Step S16.

For example, the D50 of the mixture 804 is preferably greater than or equal to 600 nm and less than or equal to 20 μm, further preferably greater than or equal to 1 μm and less than or equal to 10 μm.

Next, heating is performed in Step S17. This step is referred to as annealing in some cases. The heating temperature is further preferably higher than or equal to the temperature at which the mixture 804 melts. The annealing temperature is preferably lower than or equal to a decomposition temperature of LiCoO2 (1130° C.).

LiF is used as the fluoride 802 and the annealing in S17 is conducted with the lid put on, whereby the cobalt-containing material 808 with favorable cycle performance and the like can be manufactured. It is considered that when LiF and MgF2 are used as the fluoride 802, the reaction with LiCoO2 is promoted with the annealing temperature in Step S17 set to higher than or equal to 742° C. to generate LiMO2 because the eutectic point of LiF and MgF2 is around 742° C.

Furthermore, an endothermic peak of LiF, MgF2, and LiCoO2 is observed at around 820° C. by differential scanning calorimetry (DSC measurement). Thus, the annealing temperature is preferably higher than or equal to 742° C., further preferably higher than or equal to 820° C.

Accordingly, the annealing temperature in Step S17 is preferably higher than or equal to 742° C. and lower than or equal to 1130° C., further preferably higher than or equal to 742° C. and lower than or equal to 1000° C., preferably higher than or equal to 820° C. and lower than or equal to 1130° C., further preferably higher than or equal to 820° C. and lower than or equal to 1000° C.

In this embodiment, LiF, which is a fluoride, is considered to function as flux. Accordingly, since the capacity of the heating furnace is larger than the capacity of the container and LiF is lighter than oxygen, it is expected that LiF is volatilized and the reduction of LiF in the mixture 804 inhibits production of LiMO2. Therefore, heating needs to be performed while volatilization of LiF is inhibited.

Thus, when the mixture 804 is heated in an atmosphere including LiF, that is, the mixture 804 is heated in a state where the partial pressure of LiF in the heating furnace is high, volatilization of LiF in the mixture 804 is inhibited. By performing annealing using the fluoride (LiF or MgF) to form an eutectic mixture with the lid put on, the annealing temperature can be lowered to the decomposition temperature of the LiCoO2 (1130° C.) or lower, specifically, a temperature higher than or equal to 742° C. and lower than or equal to 1000° C., thereby enabling the production of LiMO2 to progress efficiently. Accordingly, a positive electrode active material having favorable characteristics can be formed, and the annealing time can be reduced.

Figure 7:
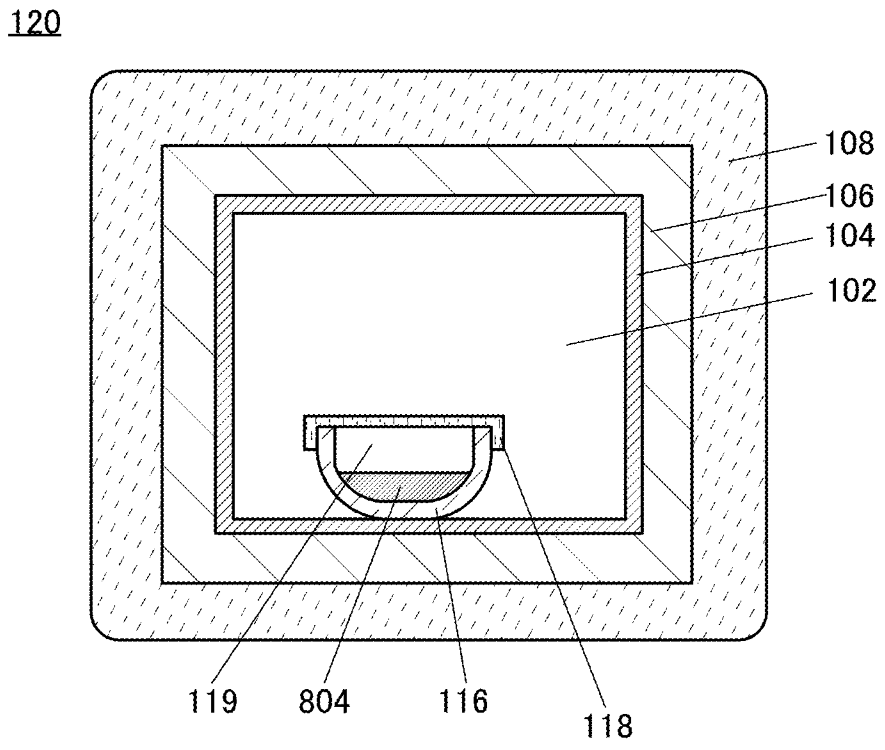
FIG. 7 is an example of a process cross-sectional view illustrating one embodiment of the present invention.

FIG. 7 illustrates an example of the annealing method in S17.

A heating furnace 120 illustrated in FIG. 7 includes a space 102 in the heating furnace, a hot plate 104, a heater unit 106, and a heat insulator 108. It is further preferable to put a lid 118 on a container 116 in annealing. With this structure, an atmosphere including a fluoride can be obtained in a space 119 enclosed by the container 116 and the lid 118. In the annealing, the state of the space 119 is maintained with the lid put on so that the concentration of the gasified fluoride inside the space 119 can be constant or cannot be reduced, in which case fluorine or magnesium can be contained in the vicinity of the particle surface. The atmosphere including a fluoride can be provided in the space 119, which is smaller in capacity than the space 102 in the heating furnace, by volatilization of a smaller amount of a fluoride. This means that an atmosphere including a fluoride can be provided in the reaction system without a significant reduction in the amount of a fluoride included in the mixture 804. Accordingly, LiMO2 can be produced efficiently. In addition, the use of the lid 118 allows the annealing of the mixture 804 in an atmosphere including a fluoride to be simply and inexpensively performed.

Here, the valence number of Co (cobalt) in LiMO2 formed according to one embodiment of the present invention is preferably approximately 3. The valence number of cobalt can be 2 or 3. Thus, to inhibit reduction of cobalt, it is preferable that the atmosphere in the space 102 in the heating furnace include oxygen, the ratio of oxygen to nitrogen in the atmosphere in the space 102 in the heating furnace be higher than or equal to that in the air atmosphere, and the oxygen concentration in the atmosphere in the space 102 in the heating furnace be higher than or equal to that in the air atmosphere. Thus, an atmosphere including oxygen needs to be introduced into the space in the heating furnace. Note that since bivalent cobalt atoms existing near magnesium atoms are likely to be stable, not all the cobalt atoms may be trivalent.

Thus, in one embodiment of the present invention, before heating is performed, a step of providing an atmosphere including oxygen in the space 102 in the heating furnace and a step of placing the container 116 in which the mixture 804 is placed in the space 102 in the heating furnace are performed. The steps in this order enable the mixture 804 to be annealed in an atmosphere including oxygen and a fluoride. During the annealing, the space 102 in the heating furnace is preferably sealed to prevent any gas from being discharged to the outside. For example, it is preferable that no gas flows during the annealing.

Although there is no particular limitation on the method of providing an atmosphere including oxygen in the space 102 in the heating furnace, examples are a method of introducing an oxygen gas or a gas containing oxygen such as dry air after exhausting air from the space 102 in the heating furnace and a method of flowing an oxygen gas or a gas containing oxygen such as dry air into the space 102 in the heating furnace for a certain period of time. In particular, introducing an oxygen gas after exhausting air from the space 102 in the heating furnace (oxygen displacement) is preferably performed. Note that the atmosphere of the space 102 in the heating furnace may be regarded as an atmosphere including oxygen.

When the lid 118 is put on the container 116, an atmosphere containing oxygen is provided, and then heating is performed, an appropriate amount of oxygen enters the container 116 through a gap of the lid 118 put on the container 116 and an appropriate amount of fluoride can be kept within the container 116.

Furthermore, the fluoride or the like attached to inner walls of the container 116 and the lid 118 is likely to be fluttered again by the heating and attached to the mixture 804.

The annealing in Step S17 is preferably performed at an appropriate temperature for an appropriate time. The appropriate temperature and time change depending on the conditions such as the particle size and the composition of the particle of the composite oxide 801 in Step S11. In the case where the particle size is small, the annealing is preferably performed at a lower temperature or for a shorter time than annealing in the case where the particle size is large, in some cases. After the annealing in S17, a step of removing the lid is performed.

For example, in the case where the average particle diameter (D50) of particles in Step S11 is approximately 12 μm, the annealing time is preferably 3 hours or longer, further preferably 10 hours or longer.

By contrast, in the case where the average particle diameter (D50) of particles in Step S11 is approximately 5 μm, the annealing time is preferably longer than or equal to 1 hour and shorter than or equal to 10 hours, further preferably approximately 2 hours, for example.

The temperature decreasing time after the annealing is, for example, preferably longer than or equal to 10 hours and shorter than or equal to 50 hours.

Then, the materials annealed in the above manner are collected in Step S18, whereby the cobalt-containing material 808 is obtained in Step S19.

Example 3 of Manufacturing Method for Positive Electrode Active Material

Figure 6:
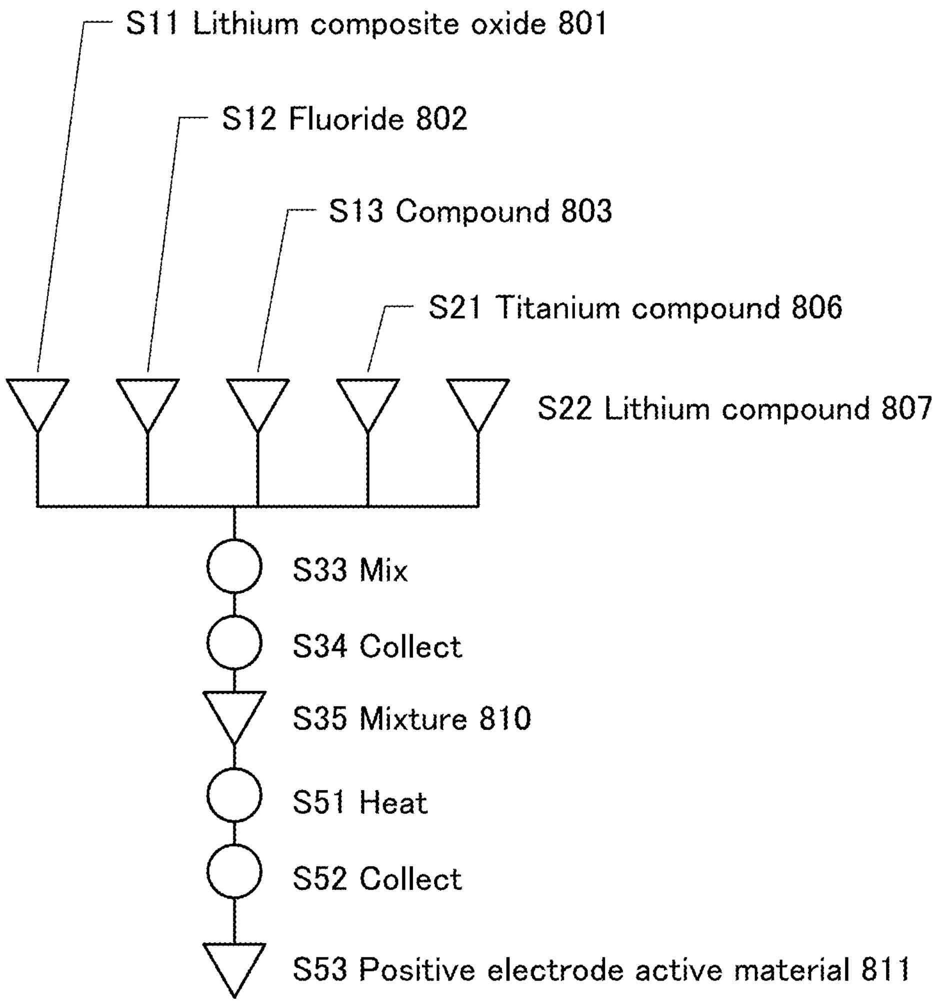
FIG. 6 is a diagram showing a method for manufacturing a positive electrode active material.

In a flowchart shown in FIG. 6, a manufacturing method can be simplified compared to the above processes in FIG. 3 and FIG. 4.

In Step S33 in FIG. 6, the materials in Steps S11, S12, S13, S21, and S22 are prepared and mixed. Furthermore, grinding is preferably performed in Step S33.

Next, in Step S34, the materials obtained through Step S33 are collected, whereby the mixture 810 is obtained in Step S35.

FIG. 3 can be referred to for Step S51 and subsequent steps.

The use of the flowchart shown in FIG. 6 allows simplification of a process.

This embodiment can be used in appropriate combination with the other embodiments.

Embodiment 2

In this embodiment, an example of a structure of a positive electrode active material manufactured by a manufacturing method of one embodiment of the present invention is described.

[Structure of Positive Electrode Active Material]

A material with a layered rock-salt crystal structure, such as lithium cobalt oxide (LiCoO2), is known to have a high discharge capacity and excel as a positive electrode active material of a secondary battery. As an example of the material with a layered rock-salt crystal structure, a composite oxide represented by LiMO2 is given. The metal M contains the metal Me1 given above. The metal M can further contain the metal X given above in addition to the metal Me1 given above.

It is known that the Jahn-Teller effect in a transition metal compound varies in degree according to the number of electrons in the d orbital of the transition metal.

In a compound containing nickel, distortion is likely to be caused because of the Jahn-Teller effect in some cases. Accordingly, when high-voltage charge and discharge are performed on LiNiO2, the crystal structure might be broken because of the distortion. The influence of the Jahn-Teller effect is suggested to be small in LiCoO2; hence, LiCoO2 is preferable because the resistance to high-voltage charge and discharge is higher in some cases.

The positive electrode active material is described with reference to FIG. 8 and FIG. 9.

In the positive electrode active material formed according to one embodiment of the present invention, the difference in the positions of $CoO_2$ layers can be small in repeated charge and discharge at high voltage. Furthermore, the change in volume can be small. Thus, the compound can have excellent cycle performance. In addition, the compound can have a stable crystal structure in a high-voltage charged state. Thus, in the compound, sometimes a short circuit is less likely to occur while the high-voltage charged state is maintained. This is preferable because the safety is further improved.

The compound has a small change in the crystal structure and a small difference in volume per the same number of transition metal atoms between a sufficiently discharged state and a high-voltage charged state.

The positive electrode active material 811 contains lithium, the metal M oxygen, and titanium. The positive electrode active material 811 contains the metal Me1 given above for the metal M. The metal M preferably includes the metal X given above in addition to the metal Me1 given above. Furthermore, halogen such as fluorine or chlorine is preferably contained.

The positive electrode active material 811 preferably has a form of particles. In the case where the positive electrode active material 811 has a form of particles, the titanium concentration in a surface portion of a particle is higher than the titanium concentration in an inner portion thereof. The magnesium concentration in the surface portion is higher than the magnesium concentration in the inner portion. The surface portion of the positive electrode active material 811 is located less than or equal to 10 nm, less than or equal to 5 nm, or less than or equal to 3 nm from the surface toward the inner portion, and may include a first region where the magnesium concentration is particularly high. In addition, for example, the ratio of the magnesium concentration to the titanium concentration (Mg/Ti) in the first region is higher than the ratio of the magnesium concentration to the titanium concentration (Mg/Ti) in a region of the surface portion that is located inward from the first region, in some cases.

For example, the concentrations of elements such as the metal M and titanium each have a gradient in each of the regions such as the surface portion, the inner portion, and the first region of the surface portion. That is, for example, the concentration of each element does not change sharply but changes with a gradient in the boundary between the regions. Here, for the metal M, aluminum, nickel, or the like can be used in addition to cobalt and magnesium, for example. In such a case, aluminum and nickel each have, for example, a concentration gradient in each of the regions such as the surface portion, the inner portion, and the first region of the surface portion.

The positive electrode active material 811 includes the first region. In the case where the positive electrode active material 811 has a form of particles, the first region preferably includes a region located inward from the surface portion. At least part of the surface portion may be included in the first region. The first region preferably exhibits a layered rock-salt crystal structure, and the region is represented by the space R-3m. The first region is a region containing lithium, the metal Me1, oxygen, and the metal X FIG. 8 shows examples of crystal structures of the first region before and after charge and discharge. The surface portion of the positive electrode active material 811 may include a crystal containing titanium, magnesium, and oxygen and exhibiting a structure different from a layered rock-salt crystal structure in addition to or instead of the region exhibiting a layered rock-salt crystal structure described below with reference to FIG. 8 and the like. For example, the surface portion of the positive electrode active material 811 may include a crystal containing titanium, magnesium, and oxygen and exhibiting a spinel structure.

Figure 8:
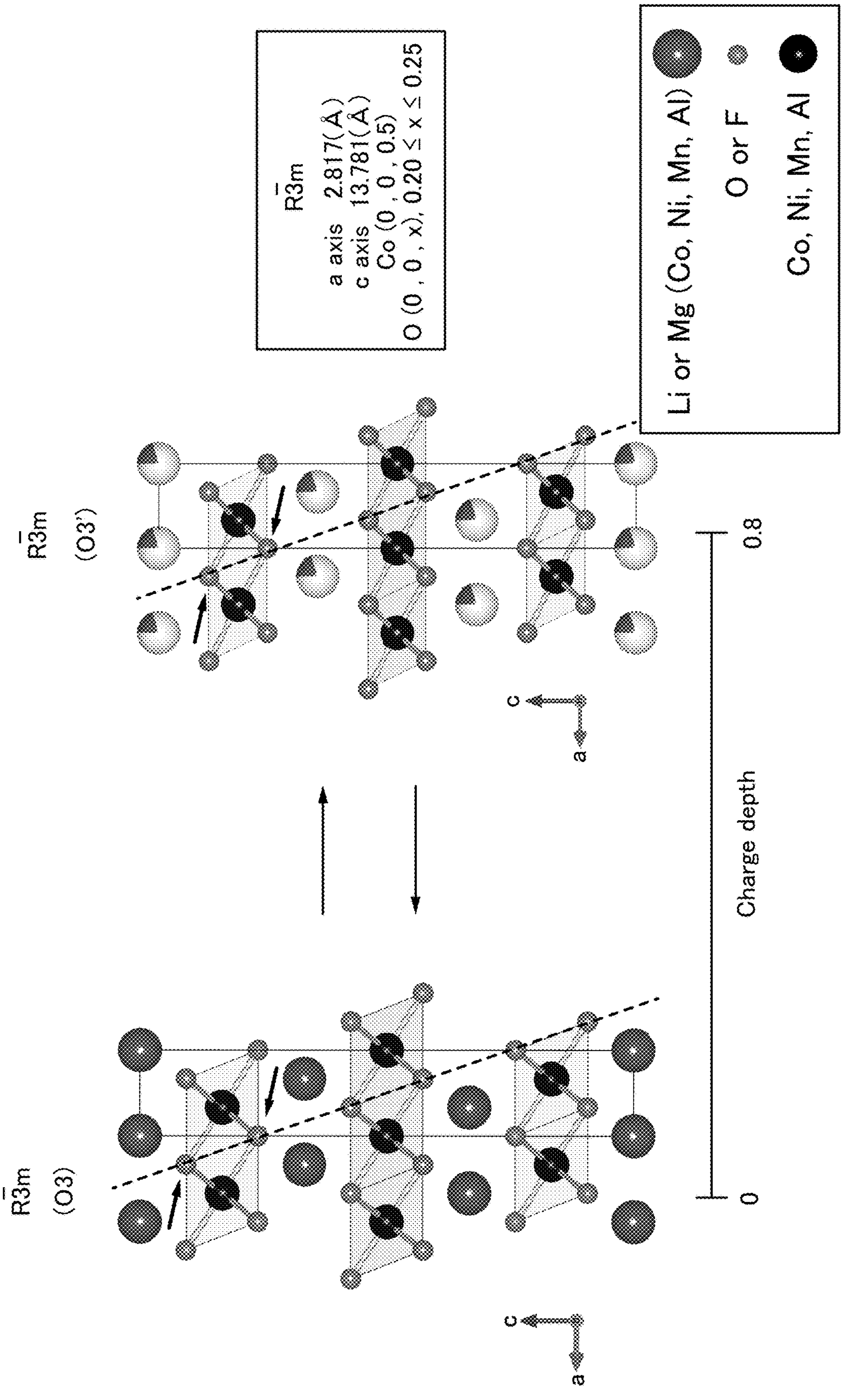
FIG. 8 is a diagram showing crystal structures of a positive electrode active material.
Figure 9:
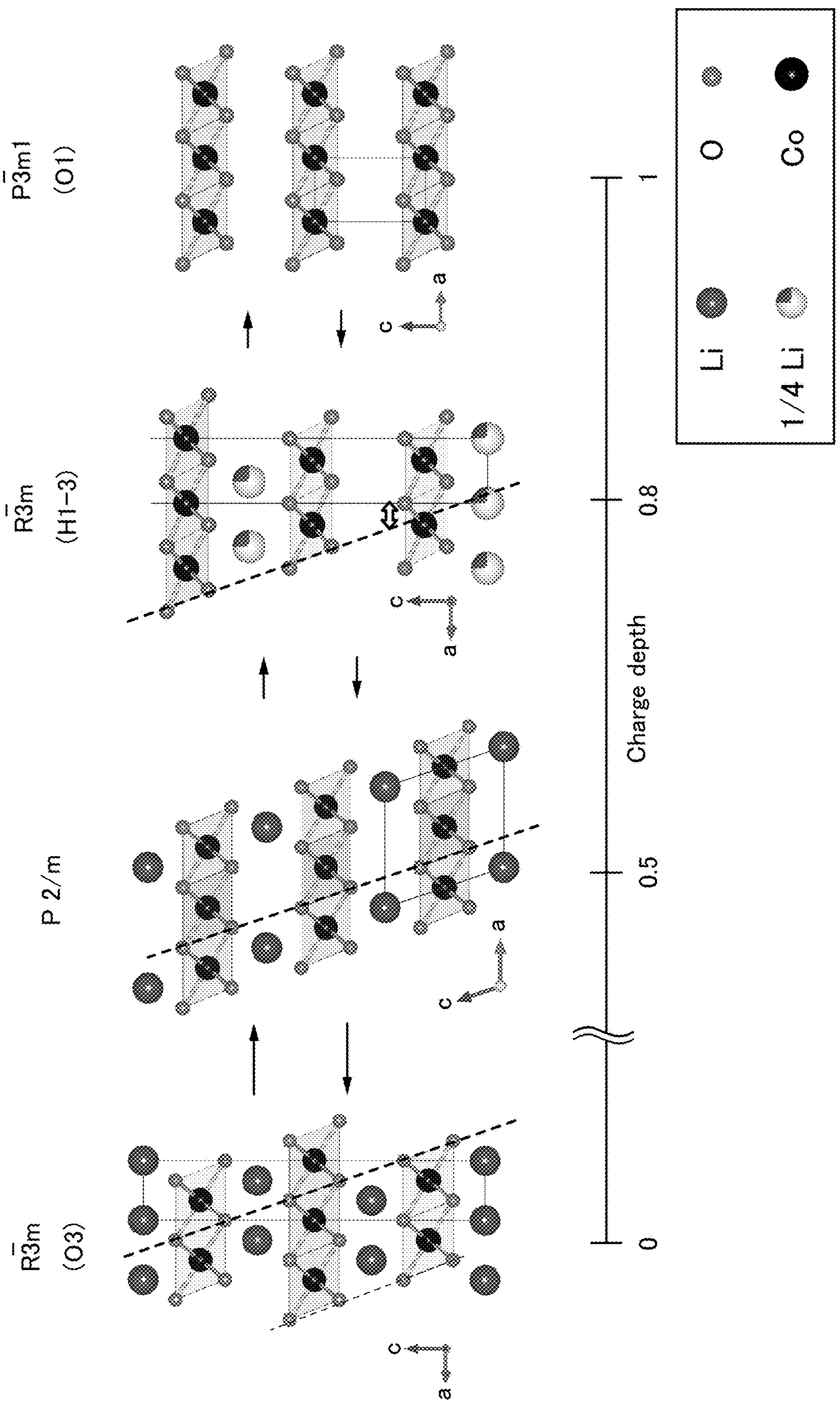
FIG. 9 is a diagram showing crystal structures of a positive electrode active material.

The crystal structure with a charge depth of 0 (in the discharged state) in FIG. 8 is R-3m (O3) as in FIG. 9. Meanwhile, the first region with a charge depth in a sufficiently charged state includes a crystal whose structure is different from the H1-3 type structure (the space group R-3m) illustrated in FIG. 9. This structure belongs to the space group R-3m, and is not a spinel crystal structure but a structure in which oxygen is hexacoordinated to ions of cobalt, magnesium, or the like and the cation arrangement has symmetry similar to that of the spinel crystal structure. Furthermore, the symmetry of $CoO_2$ layers of this structure is the same as that in the O3 type structure. This structure is referred to as an O3' type crystal structure or a pseudo-spinel crystal structure in this specification and the like. Although lithium exists in any of lithium sites at an approximately 20% probability in the diagram of the O3' type crystal structure illustrated in FIG. 8, the structure is not limited thereto. Lithium may exist in only some certain lithium sites. In addition, in both the O3 type crystal structure and the O3' type crystal structure, a slight amount of magnesium preferably exists between the $CoO_2$ layers, i.e., in lithium sites. In addition, a slight amount of halogen such as fluorine preferably exists in oxygen sites at random.

Note that in the O3' type crystal structure, oxygen is tetracoordinated to a light element such as lithium in some cases; also in that case, the ion arrangement has symmetry similar to that of the spinel structure.

The O3' type crystal structure can also be regarded as a crystal structure that includes Li between layers at random but is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, pure lithium cobalt oxide or a layered rock-salt positive electrode active material containing a large amount of cobalt is known not to have this crystal structure in general.

Anions of a layered rock-salt crystal and anions of a rock-salt crystal have a cubic close-packed structure (face-centered cubic lattice structure). Anions of an O3' type crystal are also presumed to have a cubic close-packed structure. When the O3' type crystal is in contact with the layered rock-salt crystal and the rock-salt crystal, there is a crystal plane at which orientations of cubic close-packed structures composed of anions are aligned. Note that a space group of the layered rock-salt crystal and the O3' type crystal is R-3m, which is different from the space group Fm-3m of a rock-salt crystal (a space group of a general rock-salt crystal) and the space group Fd-3m of a rock-salt crystal (a space group of a rock-salt crystal having the simplest symmetry); thus, the Miller index of the crystal plane satisfying the above conditions in the layered rock-salt crystal and the O3' type crystal is different from that in the rock-salt crystal. In this specification, a state where the orientations of the cubic close-packed structures composed of anions in the layered rock-salt crystal, the O3' type crystal, and the rock-salt crystal are aligned is sometimes referred to as a state where crystal orientations are substantially aligned.

In the first region, a change in the crystal structure when charging is performed at high voltage and a large amount of lithium is extracted is inhibited as compared with a comparative example described later. As shown by dotted lines in FIG. 8, for example, CoO2 layers hardly deviate in the crystal structures.

More specifically, the structure of the first region is highly stable even when a charge voltage is high. For example, an H1-3 type crystal structure is formed at a voltage of approximately 4.6 V with the potential of a lithium metal as the reference in the comparative example; however, the positive electrode active material of one embodiment of the present invention can maintain the crystal structure of R-3m (O3) even at the charge voltage of 4.6 V. Even at higher charge voltages, e.g., a voltage of approximately 4.65 V to 4.7 V with the potential of a lithium metal as the reference, the positive electrode active material of one embodiment of the present invention can have the O3' type crystal structure. At a charge voltage increased to be higher than 4.7 V, an H1-3 type crystal may be finally observed in the positive electrode active material of one embodiment of the present invention. In addition, the positive electrode active material of one embodiment of the present invention might have the O3' type crystal structure even at a lower charge voltage (e.g., a charge voltage of greater than or equal to 4.5 V and less than 4.6 V with the potential of a lithium metal as the reference). Note that in the case where graphite is used as a negative electrode active material in a secondary battery, for example, the voltage of the secondary battery is lower than the above-mentioned voltages by the potential of graphite. The potential of graphite is approximately 0.05 V to 0.2 V with the potential of a lithium metal as the reference. Thus, even in a secondary battery that includes graphite as a negative electrode active material and has a voltage of greater than or equal to 4.3 V and less than or equal to 4.5 V, for example, the positive electrode active material of one embodiment of the present invention can maintain the crystal structure of R-3m (O3) and moreover, includes a region that can have the O3' type crystal structure at higher voltages, e.g., a voltage of the secondary battery exceeding 4.5 V specifically, greater than or equal to 4.6 V and less than or equal to 4.55 V. In addition, the positive electrode active material of one embodiment of the present invention can have the O3' structure at lower charge voltages, e.g., at a voltage of the secondary battery of greater than or equal to 4.2 V and less than 4.3 V, in some cases.

Thus, in the first region, the crystal structure is less likely to be broken even when charge and discharge are repeated at high voltage.

In the positive electrode active material 904, a difference in the volume per unit cell between the O3 type crystal structure with a charge depth of 0 and the O3' type crystal structure with a charge depth of 0.8 is less than or equal to 2.5%, more specifically, less than or equal to 2.2%. In the unit cell of the O3' type crystal structure, the coordinates of cobalt and oxygen can be represented by Co (0, 0, 0.5) and O (0, 0, x) within the range of $0.20 \leq x \leq 0.25$.

A slight amount of magnesium existing between the CoO2 layers, i.e., in lithium sites at random, has an effect of inhibiting a deviation in the CoO2 layers in high-voltage charging. Thus, when magnesium exists between the CoO2 layers, the O3' type crystal structure is likely to be formed.

However, cation mixing occurs when the heat treatment temperature is excessively high, so that magnesium is highly likely to enter the cobalt sites. Magnesium in the cobalt sites is less effective in maintaining the R-3m structure in high-voltage charging in some cases. Furthermore, when the heat treatment temperature is excessively high, adverse effects such as reduction of cobalt to have a valence of two and transpiration of lithium are concerned.

In view of the above, a halogen compound such as a fluorine compound is preferably added to lithium cobalt oxide before the heat treatment for distributing magnesium over whole particles. The addition of the halogen compound depresses the melting point of lithium cobalt oxide. The depression of the melting point makes it easier to distribute magnesium over whole particles at a temperature at which the cation mixing is unlikely to occur. Furthermore, it is expected that the existence of the fluorine compound can improve corrosion resistance to hydrofluoric acid generated by decomposition of an electrolyte solution.

When the magnesium concentration is higher than a predetermined value, the effect of stabilizing a crystal structure becomes small in some cases. This is probably because magnesium enters the cobalt sites in addition to the lithium sites. The number of magnesium atoms in the positive electrode active material formed according to one embodiment of the present invention is preferably 0.001 times or more and 0.1 times or less, further preferably more than 0.01 times and less than 0.04 times, still further preferably approximately 0.02 times as large as the number of cobalt atoms. The magnesium concentration described here may be a value obtained by element analysis on the entire particles of the positive electrode active material using ICP-MS or the like, or may be a value based on the ratio of the raw materials mixed in the forming process of the positive electrode active material, for example.

The number of nickel atoms in the positive electrode active material 811 is preferably 7.5% or lower, preferably 0.05% or higher and 4% or lower, further preferably 0.1% or higher and 2% or lower of the number of cobalt atoms. The nickel concentration described here may be a value obtained by element analysis on the entire particle of the positive electrode active material using ICP-MS or the like, or may be a value based on the ratio of the raw materials mixed in the forming process of the positive electrode active material, for example.

<Particle Size>

A too large particle size of the positive electrode active material 811 causes problems such as difficulty in lithium diffusion and too much surface roughness of an active material layer in coating to a current collector. By contrast, a too small particle size causes problems such as difficulty in carrying the active material layer in coating to the current collector and overreaction with an electrolyte solution. Therefore, an average particle diameter (D50, also referred to as median diameter) is preferably more than or equal to 1 μm and less than or equal to 100 μm, further preferably more than or equal to 2 μm and less than or equal to 40 μm, still further preferably more than or equal to 5 μm and less than or equal to 30 μm.

<Analysis Method>

Whether or not a positive electrode active material has the O3' type crystal structure when charged with high voltage can be determined by analyzing a high-voltage charged positive electrode using XRD, electron diffraction, neutron diffraction, electron spin resonance (ESR), nuclear magnetic resonance (NMR), or the like. The XRD is particularly preferable because the symmetry of a transition metal such as cobalt contained in the positive electrode active material can be analyzed with high resolution, the degrees of crystallinity and the crystal orientations can be compared, the distortion of lattice periodicity and the crystallite size can be analyzed, and a positive electrode obtained by disassembling a secondary battery can be measured without any change with sufficient accuracy, for example.

As described so far, the positive electrode active material 811 has a feature of a small change in the crystal structure between the high-voltage charged state and the discharged state. A material where 50 wt % or more of the crystal structure largely changes between the high-voltage charged state and the discharged state is not preferable because the material cannot withstand the high-voltage charge and discharge. In addition, it should be noted that an objective crystal structure is not obtained in some cases only by addition of impurity elements. For example, although the positive electrode active material that is lithium cobalt oxide containing magnesium and fluorine is a commonality, the positive electrode active material has 60 wt % or more of the O3' type crystal structure in some cases, and has 50 wt % or more of the H1-3 type crystal structure in other cases, when charged with a high voltage. Furthermore, at a predetermined voltage, the positive electrode active material has almost 100 wt % of the O3' type crystal structure, and with an increase in the predetermined voltage, the H1-3 type crystal structure is generated in some cases. Thus, the crystal structure of the positive electrode active material 811 is preferably analyzed by XRD or the like. The combination of the analysis methods and measurement such as XRD enables more detailed analysis.

Note that a positive electrode active material in the high-voltage charged state or the discharged state sometimes causes a change in the crystal structure when exposed to air. For example, the O3' type crystal structure changes into the H1-3 type crystal structure in some cases. Thus, all samples are preferably handled in an inert atmosphere such as an atmosphere including argon.

Comparative Example

A positive electrode active material illustrated in FIG. 9 is lithium cobalt oxide ($LiCoO_2$) to which the metal X is not added. The crystal structure of the lithium cobalt oxide illustrated in FIG. 9 is changed depending on a charge depth.

As illustrated in FIG. 9, lithium cobalt oxide with a charge depth of 0 (discharged state) includes a region having a crystal structure of the space group R-3m, and includes three $CoO_2$ layers in a unit cell. Thus, this crystal structure is referred to as an O3 type crystal structure in some cases. Note that the $CoO_2$ layer has a structure in which octahedral geometry with oxygen hexacoordinated to cobalt continues on a plane in the edge-sharing state.

When the charge depth is 1, $LiCoO_2$ has the crystal structure of the space group P-3m1, and one $CoO_2$ layer exists in a unit cell. Thus, this crystal structure is referred to as an 01 type crystal structure in some cases.

Moreover, lithium cobalt oxide with a charge depth of approximately 0.8 has the crystal structure of the space group R-3m. This structure can also be regarded as a structure in which $CoO_2$ structures such as P-3m1 (O1) and $LiCoO_2$ structures such as R-3m (O3) are alternately stacked. Thus, this crystal structure is referred to as an H1-3 type crystal structure in some cases. Note that the number of cobalt atoms per unit cell in the actual H1-3 type crystal structure is twice as large as that of cobalt atoms per unit cell in other structures. However, in this specification including FIG. 9, the c-axis of the H1-3 type crystal structure is half that of the unit cell for easy comparison with the other structures.

For the H1-3 type crystal structure, the coordinates of cobalt and oxygen in the unit cell can be expressed as follows, for example: Co (0, 0, 0.42150±0.00016), O1 (0, 0, 0.27671±0.00045), and O2 (0, 0, 0.11535±0.00045). O1 and O2 are each an oxygen atom. In this manner, the H1-3 type crystal structure is represented by a unit cell including one cobalt and two oxygen. Meanwhile, the O3' type crystal structure of one embodiment of the present invention is preferably represented by a unit cell including one cobalt and one oxygen. This means that the symmetry of cobalt and oxygen differs between the O3' type crystal structure and the H1-3 type structure, and the amount of change from the O3 structure is smaller in the O3' type crystal structure than in the H1-3 type structure. A preferred unit cell for representing a crystal structure in a positive electrode active material is selected such that the value of GOF (good of fitness) is smaller in the Rietveld analysis of XRD, for example.

When charge with a high voltage of 4.6 V or higher based on the redox potential of a lithium metal or charge with a large charge depth of 0.8 or more and discharge are repeated, the crystal structure of lithium cobalt oxide changes (i.e., an unbalanced phase change occurs) repeatedly between the H1-3 type crystal structure and the R-3m (O3) structure in a discharged state.

However, there is a large deviation in the position of the $CoO_2$ layer between these two crystal structures. As indicated by dotted lines and an arrow in FIG. 9, the $CoO_2$ layer in the H1-3 type crystal structure greatly shifts from that in the R-3m (O3) structure. Such a dynamic structural change might adversely affect the stability of the crystal structure.

A difference in volume is also large. The H1-3 type crystal structure and the O3 type crystal structure in a discharged state that contain the same number of cobalt atoms have a difference in volume of 3.0% or more.

In addition, a structure in which $CoO_2$ layers are continuous, such as P-3m1 (O1), included in the H1-3 type crystal structure is highly likely to be unstable.

Thus, the repeated high-voltage charge and discharge break the crystal structure of lithium cobalt oxide. The break of the crystal structure degrades the cycle performance. This is probably because the break of the crystal structure reduces sites where lithium can stably exist and makes it difficult to insert and extract lithium.

This embodiment can be used in appropriate combination with the other embodiments.

Embodiment 3

In this embodiment, examples of a secondary battery of one embodiment of the present invention are described with reference to FIG. 9 to FIG. 12.

Structure Example 1 of Secondary Battery

Hereinafter, a secondary battery in which a positive electrode, a negative electrode, and an electrolyte solution are wrapped in an exterior body is described as an example.

[Positive Electrode]

The positive electrode includes a positive electrode active material layer and a positive electrode current collector. The positive electrode active material layer includes a positive electrode active material, and may include a conductive material and a binder. As the positive electrode active material, the positive electrode active material formed by the formation method described in the above embodiments is used.

The positive electrode active material described in the above embodiments and another positive electrode active material may be mixed to be used.

Other examples of the positive electrode active material include a composite oxide with an olivine crystal structure, a composite oxide with a layered rock-salt crystal structure, and a composite oxide with a spinel crystal structure. For example, compounds such as $LiFePO_4$, $LiFeO_2$, $LiNiO_2$, $LiMn_2O_4$, $V_2O_5$, $Cr_2O_5$, and $MnO_2$ are given.

As another positive electrode active material, it is preferable to add lithium nickel oxide ($LiNiO_2$ or $LiNi_{1-x}M_xO_2$ ($0<x<1$) (M=Co, Al, or the like)) to a lithium-containing material with a spinel crystal structure which contains manganese, such as $LiMn_2O_4$, because the characteristics of the secondary battery including such a material can be improved.

Another example of the positive electrode active material is a lithium-manganese composite oxide that can be represented by a composition formula $Li_aMn_bM_cO_d$. Here, the element M is preferably silicon, phosphorus, or a metal element other than lithium and manganese, further preferably nickel. In the case where the whole particles of a lithium-manganese composite oxide are measured, it is preferable to satisfy the following at the time of discharging: $0<a/(b+c)<2$; $c>0$; and $0.26\leq(b+c)/d<0.5$. Note that the proportions of metals, silicon, phosphorus, and other elements in the whole particles of a lithium-manganese composite oxide can be measured with, for example, an ICP-MS (inductively coupled plasma mass spectrometer). The proportion of oxygen in the whole particles of a lithium-manganese composite oxide can be measured by, for example, EDX (energy dispersive X-ray spectroscopy). Alternatively, the proportion of oxygen can be measured by ICPMS combined with fusion gas analysis and valence evaluation of XAFS (X-ray absorption fine structure) analysis. Note that the lithium-manganese composite oxide is an oxide containing at least lithium and manganese, and may contain at least one element selected from a group consisting of chromium, cobalt, aluminum, nickel, iron, magnesium, molybdenum, zinc, indium, gallium, copper, titanium, niobium, silicon, phosphorus, and the like.

A graphene compound may be used as the conductive material. A graphene compound in this specification and the like refers to graphene, multilayer graphene, multi graphene, graphene oxide, multilayer graphene oxide, multi graphene oxide, reduced graphene oxide, reduced multilayer graphene oxide, reduced multi graphene oxide, graphene quantum dots, and the like. A graphene compound contains carbon, has a plate-like shape, a sheet-like shape, or the like, and has a two-dimensional structure formed of a six-membered ring composed of carbon atoms. The two-dimensional structure formed of the six-membered ring composed of carbon atoms may be referred to as a carbon sheet. A graphene compound may include a functional group. The graphene compound is preferably bent. The graphene compound may be rounded like a carbon nanofiber.

In this specification and the like, graphene oxide contains carbon and oxygen, has a sheet-like shape, and includes a functional group, in particular, an epoxy group, a carboxy group, or a hydroxy group.

In this specification and the like, reduced graphene oxide contains carbon and oxygen, has a sheet-like shape, and has a two-dimensional structure formed of a six-membered ring composed of carbon atoms. The reduced graphene oxide may also be referred to as a carbon sheet. The reduced graphene oxide functions by itself and may have a stacked-layer structure. The reduced graphene oxide preferably includes a portion where the carbon concentration is higher than 80 atomic % and the oxygen concentration is higher than or equal to 2 atomic % and lower than or equal to 15 atomic %. With such a carbon concentration and such an oxygen concentration, the reduced graphene oxide can function as a conductive material with high conductivity even with a small amount. In addition, the intensity ratio G/D of a G band to a D band of the Raman spectrum of the reduced graphene oxide is preferably 1 or more. The reduced graphene oxide with such an intensity ratio can function as a conductive material with high conductivity even with a small amount.

In the longitudinal cross section of the active material layer, the sheet-like graphene compounds are preferably dispersed substantially uniformly in a region inside the active material layer. The plurality of graphene compounds are formed to partly coat the plurality of particles of the positive electrode active material or adhere to the surfaces thereof, so that the graphene compounds make surface contact with the particles of the positive electrode active material.

Here, the plurality of graphene compounds can be bonded to each other to form a net-like graphene compound sheet (hereinafter, referred to as a graphene compound net or a graphene net). A graphene net that covers the active material can function as a binder for bonding the active material particles. Accordingly, the amount of the binder can be reduced, or the binder does not have to be used. This can increase the proportion of the active material in the electrode volume and weight. That is to say, the charge and discharge capacity of the secondary battery can be increased.

Here, it is preferable to perform reduction after a layer to be the active material layer is formed in such a manner that graphene oxide is used as the graphene compound and mixed with an active material. That is, the formed active material layer preferably contains reduced graphene oxide. When graphene oxide with extremely high dispersibility in a polar solvent is used to form the graphene compounds, the graphene compounds can be substantially uniformly dispersed in a region inside the active material layer. The solvent is removed by volatilization from a dispersion medium containing the uniformly dispersed graphene oxide to reduce the graphene oxide; hence, the graphene compounds remaining in the active material layer partly overlap each other and are dispersed such that surface contact is made, thereby forming a three-dimensional conduction path. Note that graphene oxide can be reduced by heat treatment or with the use of a reducing agent, for example.

Unlike a conductive material in the form of particles, such as acetylene black, which makes point contact with an active material, the graphene compound is capable of making low-resistance surface contact; accordingly, the electrical conduction between the particles of the positive electrode active material and the graphene compound can be improved with a small amount of graphene compound compared with a normal conductive material. Thus, the proportion of the positive electrode active material in the active material layer can be increased, resulting in increased discharge capacity of the secondary battery.

It is possible to form, with a spray dry apparatus, a graphene compound serving as a conductive material as a coating film to cover the entire surface of the active material in advance and to form a conductive path between the active materials using the graphene compound.

A material used in formation of the graphene compound may be mixed with the graphene compound to be used for the active material layer. For example, particles used as a catalyst in formation of the graphene compound may be mixed with the graphene compound. As an example of the catalyst in formation of the graphene compound, particles containing any of silicon oxide ($SiO_2$ or $SiO_x$ ($x<2$)), aluminum oxide, iron, nickel, ruthenium, iridium, platinum, copper, germanium, and the like can be given. The D50 of the particles is preferably less than or equal to 1 μm, further preferably less than or equal to 100 nm.

[Negative Electrode]

The negative electrode includes a negative electrode active material layer and a negative electrode current collector. The negative electrode active material layer may include a conductive material and a binder.

[Negative Electrode Active Material]

As a negative electrode active material, for example, one or more selected from an alloy-based material and a carbon-based material can be used.

For the negative electrode active material, an element that enables charge and discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher charge and discharge capacity than carbon. In particular, silicon has a high theoretical capacity of 4200 mAh/g. For this reason, silicon is preferably used as the negative electrode active material. Alternatively, a compound containing any of the above elements may be used. Examples of the compound include SiO, Mg2Si, Mg2Ge, SnO, SnO2, Mg2Sn, SnS2, V2Sn3, FeSn2, CoSn2, Ni3Sn2, Cu6Sn5, Ag3Sn, Ag3Sb, Ni2MnSb, CeSb3, LaSn3, La3Co2Sn7, CoSb3, InSb, and SbSn. Here, an element that enables charge and discharge reactions by an alloying reaction and a dealloying reaction with lithium, a compound containing the element, and the like may be referred to as an alloy-based material.

In this specification and the like, SiO refers, for example, to silicon monoxide. Note that SiO can alternatively be expressed as SiOx. Here, x preferably has an approximate value of 1. For example, x is preferably greater than or equal to 0.2 and less than or equal to 1.5, further preferably greater than or equal to 0.3 and less than or equal to 1.2. Alternatively, x is preferably greater than or equal to 0.2 and less than or equal to 1.2. Still alternatively, x is preferably greater than or equal to 0.3 and less than or equal to 1.5.

As the carbon-based material, graphite, graphitizing carbon (soft carbon), non-graphitizing carbon (hard carbon), carbon nanotube, graphene, carbon black, or the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (greater than or equal to 0.05 V and less than or equal to 0.3 V vs. Li/Li+) when lithium ions are inserted into graphite (while a lithium-graphite intercalation compound is formed). For this reason, a lithium-ion secondary battery can have a high operating voltage. In addition, graphite is preferred because of its advantages such as a relatively high charge and discharge capacity per unit volume, relatively small volume expansion, low cost, and a higher level of safety than that of a lithium metal.

As the negative electrode active material, an oxide such as titanium dioxide (TiO2), lithium titanium oxide (Li4Ti5O12), a lithium-graphite intercalation compound (LixC6), niobium pentoxide (Nb2O5), tungsten oxide (WO2), or molybdenum oxide (MoO2) can be used.

Alternatively, as the negative electrode active material, Li3−xMxN (M is Co, Ni, or Cu) with a Li3N structure, which is a composite nitride containing lithium and a transition metal, can be used. For example, Li2.6Co0.4N3 is preferable because of high charge and discharge capacity (900 mAh/g and 1890 mAh/cm3).

A composite nitride containing lithium and a transition metal is preferably used, in which case lithium ions are contained in the negative electrode active material and thus the negative electrode active material can be used in combination with a material for a positive electrode active material that does not contain lithium ions, such as V2O5 or Cr3O8. Note that in the case of using a material containing lithium ions as a positive electrode active material, the composite nitride containing lithium and a transition metal can be used as the negative electrode active material by extracting the lithium ions contained in the positive electrode active material in advance.

Alternatively, a material that causes a conversion reaction can be used for the negative electrode active material; for example, a transition metal oxide that does not form an alloy with lithium, such as cobalt oxide (CoO), nickel oxide (NiO), or iron oxide (FeO), may be used as the negative electrode active material. Other examples of the material that causes a conversion reaction include oxides such as Fe2O3, CuO, Cu2O, RuO2, and Cr2O3, sulfides such as CoS0.89, NiS, and CuS, nitrides such as Zn3N2, Cu3N, and Ge3N4, phosphides such as NiP2, FeP2, and CoP3, and fluorides such as FeF3 and BiF3.

For the conductive material and the binder that can be included in the negative electrode active material layer, materials similar to those of the conductive material and the binder that can be included in the positive electrode active material layer can be used.

[Negative Electrode Current Collector]

For the negative electrode current collector, a material similar to that of the positive electrode current collector can be used. Note that a material that is not alloyed with carrier ions of lithium or the like is preferably used for the negative electrode current collector.

[Electrolyte Solution]

The electrolyte solution contains a solvent and an electrolyte. As the solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination at an appropriate ratio.

Alternatively, the use of one or more ionic liquids (room temperature molten salts) that are unlikely to burn and volatize as the solvent of the electrolyte solution can prevent a secondary battery from exploding or catching fire even when the secondary battery internally shorts out or the internal temperature increases owing to overcharging or the like. An ionic liquid contains a cation and an anion, specifically, an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As the electrolyte dissolved in the above-described solvent, one of lithium salts such as LiPF6, LiClO4, LiAsF6, LiBF4, LiAlCl4, LiSCN, LiBr, LiI, Li2SO4, Li2B10Cl10, Li2B12Cl12, LiCF3SO3, LiC4F9SO3, LiC(CF3SO2)3, LiC(C2F5SO2)3, LiN(CF3SO2)2, LiN(C4F9SO2)(CF3SO2), and LiN(C2F5SO2)2 can be used, or two or more of these lithium salts can be used in an appropriate combination at an appropriate ratio.

The electrolyte solution used for a secondary battery is preferably highly purified and contains a small number of dust particles or elements other than the constituent elements of the electrolyte solution (hereinafter, also simply referred to as "impurities"). Specifically, the weight ratio of impurities to the electrolyte solution is preferably less than or equal to 1%, further preferably less than or equal to 0.1%, still further preferably less than or equal to 0.01%.

Furthermore, an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolyte solution. The concentration of the material to be added in the whole solvent is, for example, higher than or equal to 0.1 wt % and lower than or equal to 5 wt %.

Alternatively, a polymer gel electrolyte obtained in such a manner that a polymer is swelled with an electrolyte solution may be used.

When a polymer gel electrolyte is used, safety against liquid leakage and the like is improved. Moreover, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

As the polymer, one or more selected from PVDF, polyacrylonitrile, a polymer having a polyalkylene oxide structure, such as polyethylene oxide (PEO), and a copolymer containing any of them can be used. For example, PVDF-HFP, which is a copolymer of PVDF and hexafluoropropylene (HFP), can be used. The formed polymer may be porous.

Instead of the electrolyte solution, one or more selected from a solid electrolyte including a sulfide-based inorganic material, a solid electrolyte including an oxide-based inorganic material, and a solid electrolyte including a high molecular material such as a PEO (polyethylene oxide)-based polymer material may alternatively be used. When the solid electrolyte is used, a separator and a spacer are not necessary. Furthermore, the battery can be entirely solidified; therefore, there is no possibility of liquid leakage and thus the safety of the battery is dramatically improved.

[Separator]

The secondary battery preferably includes a separator. The separator can be formed using, for example, paper, nonwoven fabric, glass fiber, ceramics, or synthetic fiber containing nylon (polyamide), vinylon (polyvinyl alcohol-based fiber), polyester, acrylic, polyolefin, or polyurethane. The separator is preferably formed to have an envelope-like shape to wrap one of the positive electrode and the negative electrode.

The separator may have a multilayer structure. For example, an organic material film of polypropylene, polyethylene, or the like can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

When the separator is coated with the ceramic-based material, the oxidation resistance is improved; hence, deterioration of the separator in charging and discharging at a high voltage can be suppressed and thus the reliability of the secondary battery can be improved. When the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of a polypropylene film that is in contact with the positive electrode may be coated with a mixed material of aluminum oxide and aramid, and a surface of the polypropylene film that is in contact with the negative electrode may be coated with the fluorine-based material.

With the use of a separator having a multilayer structure, the charge and discharge capacity per volume of the secondary battery can be increased because the safety of the secondary battery can be maintained even when the total thickness of the separator is small.

[Exterior Body]

For an exterior body included in the secondary battery, one or more selected from a metal material such as aluminum and a resin material can be used, for example. A film-like exterior body can also be used. As the film, for example, it is possible to use a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided, as the outer surface of the exterior body, over the metal thin film.

Structure Example 2 of Secondary Battery

A structure of a secondary battery including a solid electrolyte layer is described below as another structure example of a secondary battery.

Figure 10A:
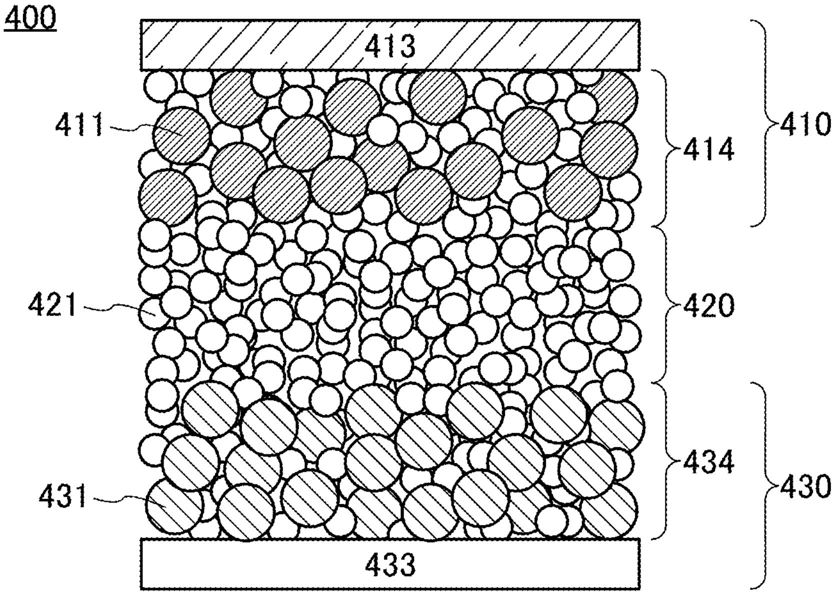
FIG. 10A and FIG. 10B are diagrams each illustrating an example of a secondary battery.

As illustrated in FIG. 10A, a secondary battery 400 of one embodiment of the present invention includes a positive electrode 410, a solid electrolyte layer 420, and a negative electrode 430.

The positive electrode 410 includes a positive electrode current collector 413 and a positive electrode active material layer 414. The positive electrode active material layer 414 includes a positive electrode active material 411 and a solid electrolyte 421. As the positive electrode active material 411, the positive electrode active material formed by the formation method described in the above embodiments is used. The positive electrode active material layer 414 may also include a conductive additive and a binder.

The solid electrolyte layer 420 includes the solid electrolyte 421. The solid electrolyte layer 420 is positioned between the positive electrode 410 and the negative electrode 430 and is a region that includes neither the positive electrode active material 411 nor a negative electrode active material 431.

Figure 10B:
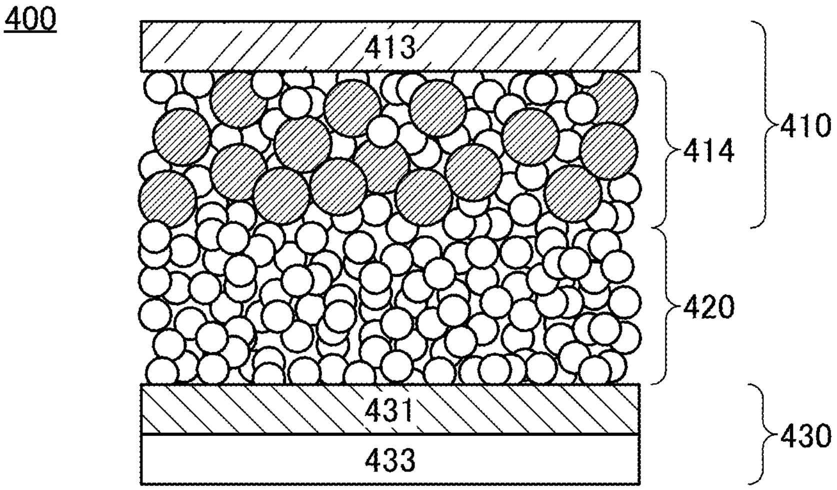

The negative electrode 430 includes a negative electrode current collector 433 and a negative electrode active material layer 434. The negative electrode active material layer 434 includes the negative electrode active material 431 and the solid electrolyte 421. The negative electrode active material layer 434 may also include a conductive additive and a binder. Note that when metal lithium is used for the negative electrode 430, it is possible that the negative electrode 430 does not include the solid electrolyte 421 as illustrated in FIG. 10B. The use of metal lithium for the negative electrode 430 is preferable because the energy density of the secondary battery 400 can be increased.

As the solid electrolyte 421 included in the solid electrolyte layer 420, a sulfide-based solid electrolyte, an oxide-based solid electrolyte, or a halide-based solid electrolyte can be used, for example.

Examples of the sulfide-based solid electrolyte include a thio-silicon-based material (e.g., Li10GeP2S12 and Li3.25Ge0.25P0.75S4), sulfide glass (e.g., 70Li2·S30P2S5, 30Li2S·26B2S3·44LiI, 63Li2S·38SiS2·1Li3PO4, 57Li2S·38SiS2·5Li4SiO4, and 50Li2S·50GeS2), and sulfide-based crystallized glass (e.g., Li7P3S11 and Li3.25P0.95S4). The sulfide-based solid electrolyte has advantages such as high conductivity of some materials, low-temperature synthesis, and ease of maintaining a path for electrical conduction after charging and discharging because of its relative softness.

Examples of the oxide-based solid electrolyte include a material with a perovskite crystal structure (e.g., La2/3−xLi3xTiO3), a material with a NASICON crystal structure (e.g., Li1−XAlXTi2−X(PO4)3), a material with a garnet crystal structure (e.g., Li7La3Zr2O12), a material with a LISICON crystal structure (e.g., Li14ZnGe4O16), LLZO (Li7La3Zr2O12), oxide glass (e.g., Li3PO4-Li4SiO4 and 50Li4SiO4·50Li3BO3), and oxide-based crystallized glass (e.g., Li1.07Al0.69Ti1.46(PO4)3 and Li1.5Al0.5Ge1.5 (PO4)3). The oxide-based solid electrolyte has an advantage of stability in the air.

Examples of the halide-based solid electrolyte include LiAlCl4, Li3InBr6, LiF, LiCl, LiBr, and LiI. Moreover, a composite material in which pores of porous aluminum oxide or porous silica are filled with such a halide-based solid electrolyte can be used as the solid electrolyte.

Alternatively, different solid electrolytes may be mixed and used.

In particular, LiI+xAlxTi2−x(PO4)3 (0<x<1) having a NASICON crystal structure (hereinafter, LATP) is preferable because LATP contains aluminum and titanium, each of which is the element the positive electrode active material used in the secondary battery 400 of one embodiment of the present invention is allowed to contain, and thus a synergistic effect of improving the cycle performance is expected. Moreover, higher productivity due to the reduction in the number of steps is expected. Note that in this specification and the like, a material having a NASICON crystal structure refers to a compound that is represented by M2(AO4)3 (M: transition metal; A: S, P, As, Mo, W, or the like) and has a structure in which MO6 octahedrons and AO4 tetrahedrons that share common corners are arranged three-dimensionally.

[Exterior Body and Shape of Secondary Battery]

An exterior body of the secondary battery 400 of one embodiment of the present invention can be formed using a variety of materials and have a variety of shapes, and preferably has a function of applying pressure to the positive electrode, the solid electrolyte layer, and the negative electrode.

FIG. 11 shows an example of a cell for evaluating materials of an all-solid-state battery.

Figure 11A:
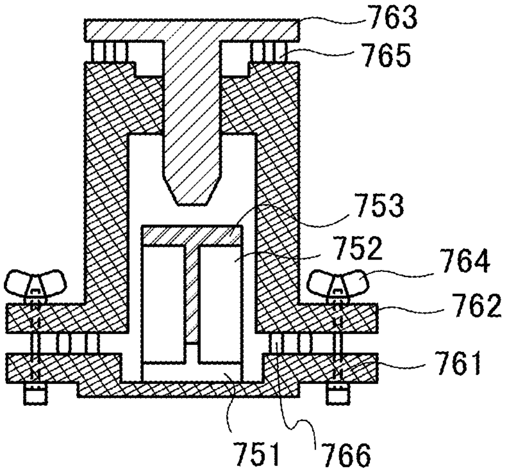
FIG. 11A, FIG. 11B, and FIG. 11C are diagrams illustrating an example of a secondary battery.

FIG. 11A is a schematic cross-sectional view of the evaluation cell. The evaluation cell includes one or more selected from a lower component 761, an upper component 762, and a fixation screw and a butterfly nut 764 for fixing these components. By rotating a pressure screw 763, an electrode plate 753 is pressed to fix an evaluation material. An insulator 766 is provided between the lower component 761 and the upper component 762 that are made of a stainless steel material. An O ring 765 for hermetic sealing is provided between the upper component 762 and the pressure screw 763.

Figure 11B:
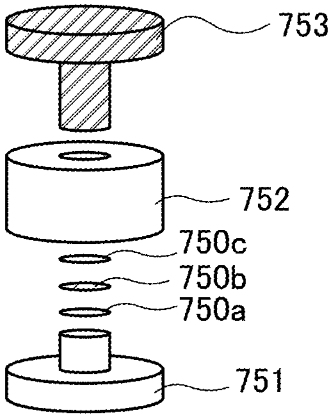

The evaluation material is placed on an electrode plate 751, surrounded by an insulating tube 752, and pressed from above by the electrode plate 753. FIG. 11B is an enlarged perspective view of the evaluation material and its vicinity.

Figure 11C:
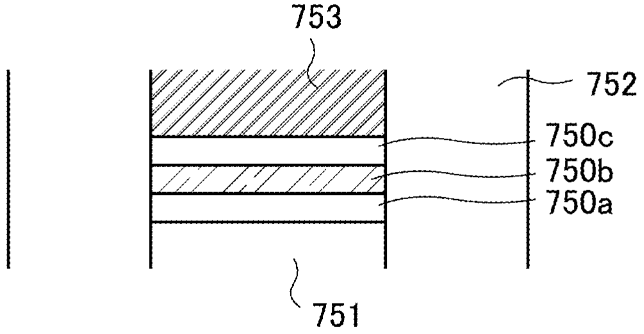

A stack of a positive electrode 750*a*, a solid electrolyte layer 750*b*, and a negative electrode 750*c* is shown here as an example of the evaluation material, and its cross section is shown in FIG. 11C. Note that the same portions in FIG. 11A, FIG. 11B, and FIG. 11C are denoted by the same reference numerals.

The electrode plate 751 and the lower component 761 that are electrically connected to the positive electrode 750*a* correspond to a positive electrode terminal. The electrode plate 753 and the upper component 762 that are electrically connected to the negative electrode 750*c* correspond to a negative electrode terminal. The electric resistance or the like can be measured while pressure is applied to the evaluation material through the electrode plate 751 and the electrode plate 753.

The exterior body of the secondary battery of one embodiment of the present invention is preferably a package having excellent airtightness. For example, a ceramic package or a resin package can be used. The exterior body is sealed preferably in a closed atmosphere where the outside air is blocked, for example, in a glove box.

Figure 12A:
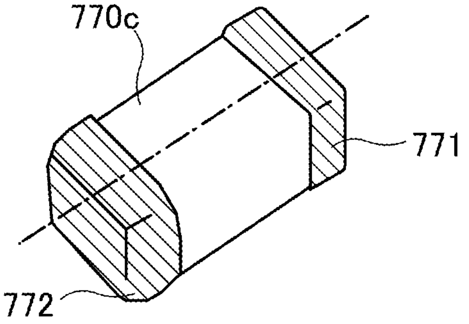
FIG. 12A and FIG. 12B are diagrams illustrating an example of a secondary battery.

FIG. 12A is a perspective view of a secondary battery of one embodiment of the present invention that has an exterior body and a shape different from those in FIG. 11. The secondary battery in FIG. 12A includes external electrodes 771 and 772 and is sealed with an exterior body including a plurality of package components.

Figure 12B:
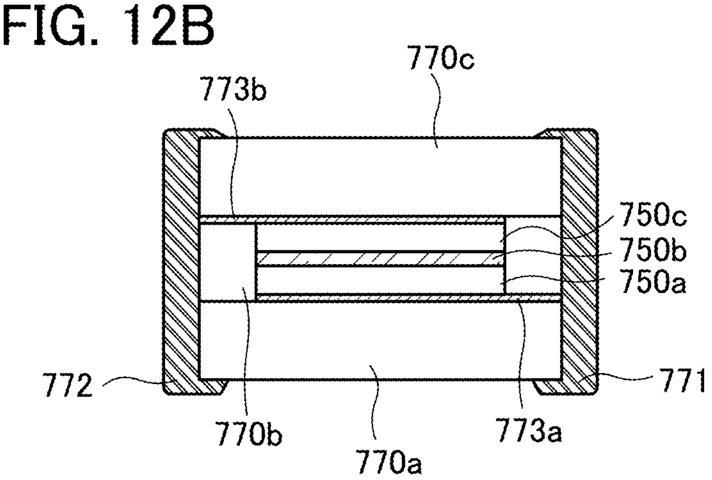

FIG. 12B illustrates an example of a cross section along the dashed-dotted line in FIG. 12A. A stack including the positive electrode 750*a*, the solid electrolyte layer 750*b*, and the negative electrode 750*c* is surrounded and sealed by a package component 770*a* including an electrode layer 773*a* on a flat plate, a frame-like package component 770*b*, and a package component 770*c* including an electrode layer 773*b* on a flat plate. For the package components 770*a*, 770*b*, and 770*c*, an insulating material, e.g., a resin material or ceramic, can be used.

The external electrode 771 is electrically connected to the positive electrode 750*a* through the electrode layer 773*a* and functions as a positive electrode terminal. The external electrode 772 is electrically connected to the negative electrode 750*c* through the electrode layer 773*b* and functions as a negative electrode terminal.

This embodiment can be used in appropriate combination with the other embodiments.

Embodiment 4

In this embodiment, examples of a shape of a secondary battery containing the positive electrode described in the above embodiment are described. For the materials used for the secondary battery described in this embodiment, the description of the above embodiment can be referred to.

<Coin-Type Secondary Battery>

Figure 13A:
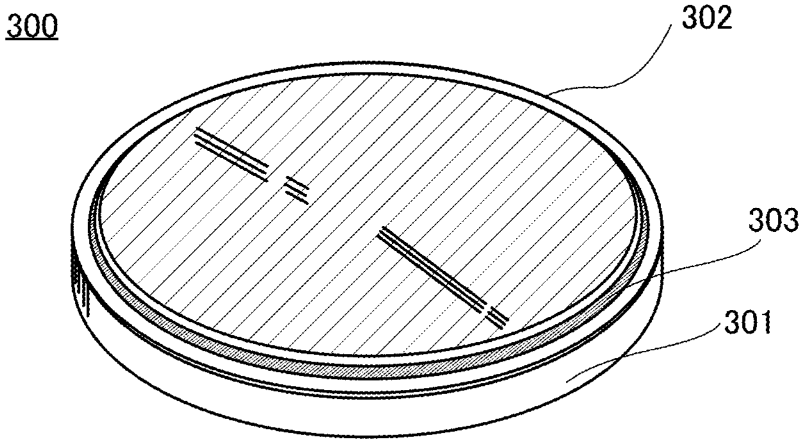
FIG. 13A, FIG. 13B, and FIG. 13C are diagrams illustrating a coin-type secondary battery.
Figure 13B:
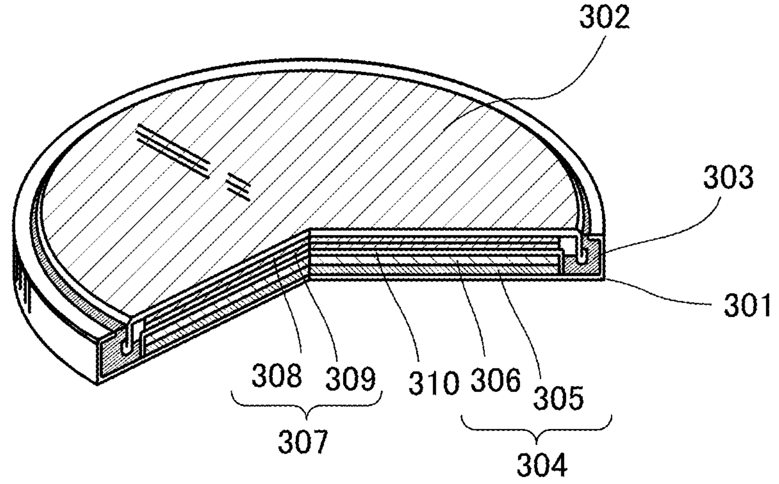

First, an example of a coin-type secondary battery is described. FIG. 13A is an external view of a coin-type (single-layer flat type) secondary battery, and FIG. 13B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having corrosion resistance to an electrolyte solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with one or more selected from nickel, aluminum, and the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and a separator 310 are soaked in the electrolyte. Then, as illustrated in FIG. 13B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween. In such a manner, the coin-type secondary battery 300 is manufactured.

When the positive electrode active material described in the above embodiment is used in the positive electrode 304, the coin-type secondary battery 300 with high charge and discharge capacity and excellent cycle performance can be obtained.

Here, a current flow in charging a secondary battery is described with reference to FIG. 13C. When a secondary battery using lithium is regarded as a closed circuit, movement of lithium ions and the current flow are in the same direction. Note that in the secondary battery using lithium, the anode and the cathode interchange in charge and discharge, and the oxidation reaction and the reduction reaction interchange; hence, an electrode with a high reaction potential is called a positive electrode and an electrode with a low reaction potential is called a negative electrode. For this reason, in this specification, the positive electrode is referred to as a "positive electrode" or a "plus electrode" and the negative electrode is referred to as a "negative electrode" or a "minus electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode interchange in charge and discharge. Thus, the terms "anode" and "cathode" are not used in this specification. If the term "anode" or "cathode" is used, it should be mentioned that the anode or the cathode is which of the one at the time of charge or the one at the time of discharge and corresponds to which of a positive (plus) electrode or a negative (minus) electrode.

Figure 13C:
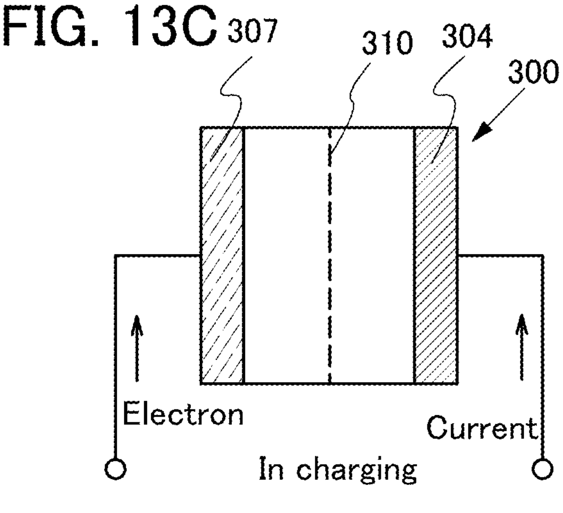

Two terminals illustrated in FIG. 13C are connected to a charger, and the secondary battery 300 is charged. As the charge of the secondary battery 300 proceeds, a potential difference between electrodes increases.

<Cylindrical Secondary Battery>

Figure 14A:
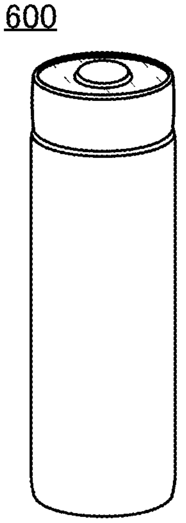
FIG. 14A, FIG. 14B, FIG. 14C, and FIG. 14D are diagrams illustrating cylindrical secondary batteries.
Figure 14B:
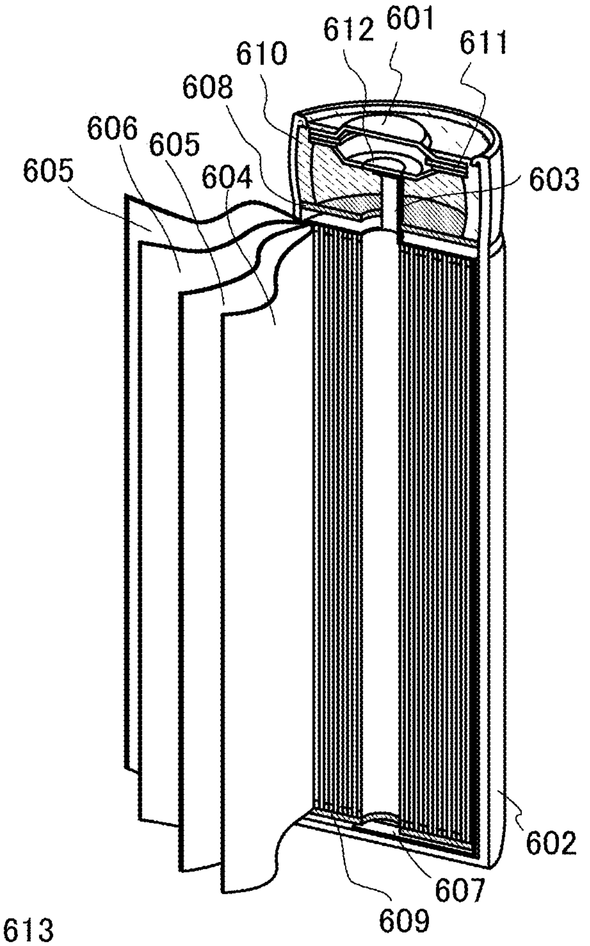

Next, an example of a cylindrical secondary battery is described with reference to FIG. 14. FIG. 14A shows an external view of a cylindrical secondary battery 600. FIG. 14B is a schematic cross-sectional view of the cylindrical secondary battery 600. The cylindrical secondary battery 600 includes, as illustrated in FIG. 14B, a positive electrode cap (battery lid) 601 on the top surface and a battery can (outer can) 602 on a side surface and a bottom surface. The positive electrode cap and the battery can (outer can) 602 are insulated from each other by a gasket (insulating gasket) 610.

Inside the battery can 602 having a hollow cylindrical shape, a battery element in which a strip-like positive electrode 604 and a strip-like negative electrode 606 are wound with a separator 605 located therebetween is provided. Although not illustrated, the battery element is wound around a center pin. One end of the battery can 602 is close and the other end thereof is open. For the battery can 602, a metal having corrosion resistance to an electrolyte solution, such as nickel, aluminum, or titanium, an alloy of such a metal, or an alloy of such a metal and another metal (e.g., stainless steel) can be used. Alternatively, the battery can 602 is preferably covered with one or more selected from nickel, aluminum, and the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected in a region inside the battery can 602 provided with the battery element. As the nonaqueous electrolyte solution, a nonaqueous electrolyte solution that is similar to that of the coin-type secondary battery can be used.

Since a positive electrode and a negative electrode that are used for a cylindrical storage battery are wound, active materials are preferably formed on both surfaces of a current collector. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a PTC element (Positive Temperature Coefficient) 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Barium titanate (BaTiO3)-based semiconductor ceramics or the like can be used for the PTC element.

Figure 14C:
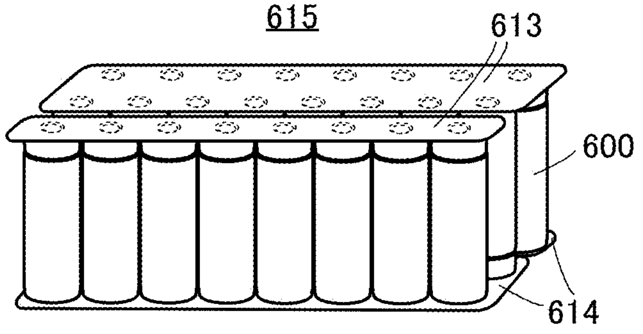

As illustrated in FIG. 14C, a plurality of secondary batteries 600 may be provided between a conductive plate 613 and a conductive plate 614 to form a module 615. The plurality of secondary batteries 600 may be connected in parallel, connected in series, or connected in series after being connected in parallel. With the module 615 including the plurality of secondary batteries 600, large electric power can be extracted.

Figure 14D:
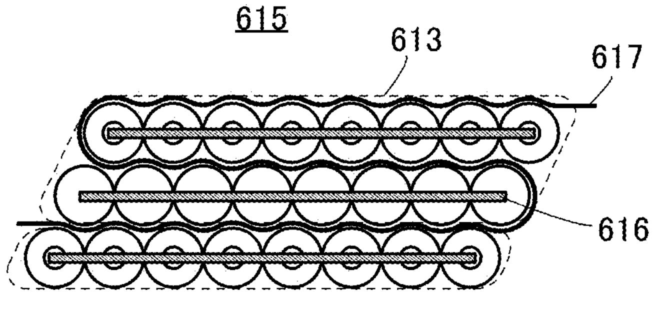

FIG. 14D is a top view of the module 615. The conductive plate 613 is shown by a dotted line for clarity of the diagram. As illustrated in FIG. 14D, the module 615 may include a wiring 616 electrically connecting the plurality of secondary batteries 600 with each other. It is possible to provide the conductive plate over the wiring 616 to overlap with each other. In addition, a temperature control device 617 may be provided between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is unlikely to be affected by the outside temperature. A heating medium included in the temperature control device 617 preferably has an insulating property and incombustibility.

When the positive electrode active material described in the above embodiment is used in the positive electrode 604, the cylindrical secondary battery 600 with high charge and discharge capacity and excellent cycle performance can be obtained.

<Structure Examples of Secondary Batteries>

Other structure examples of secondary batteries are described with reference to FIG. 15 to FIG. 18.

Figure 15A:
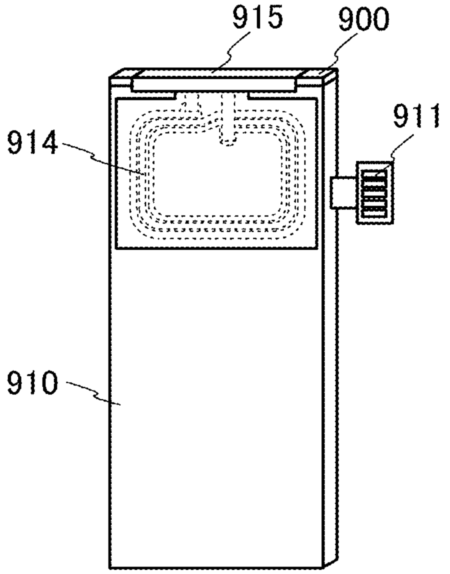
FIG. 15A and FIG. 15B are diagrams illustrating an example of a secondary battery.
Figure 15B:
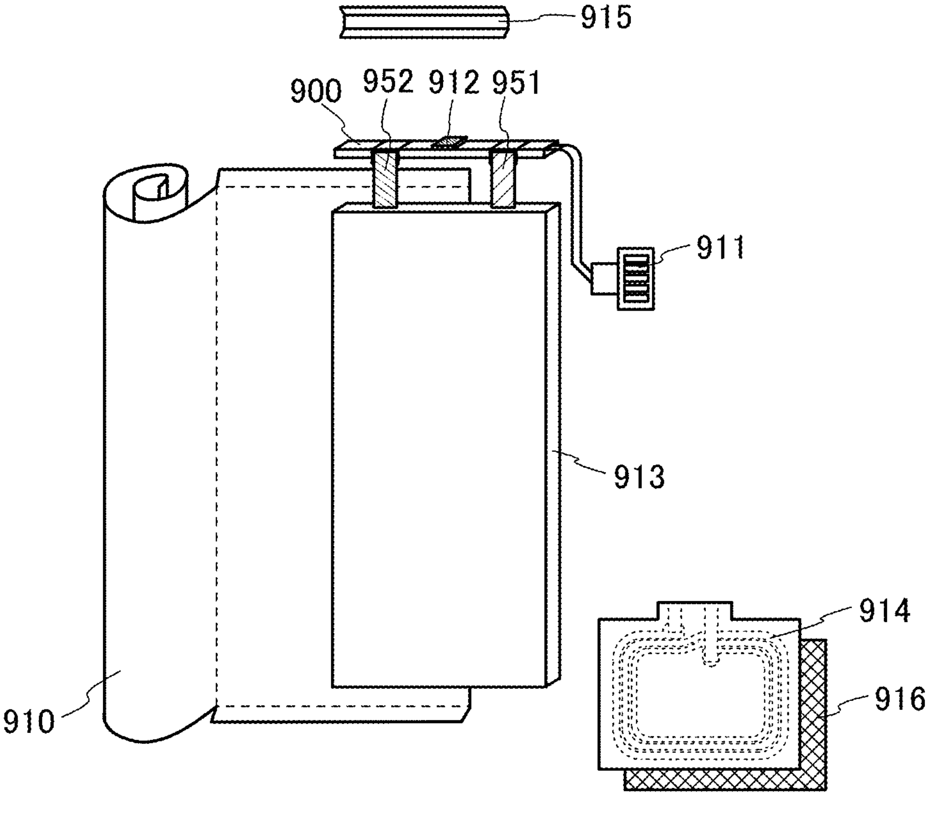

FIG. 15A and FIG. 15B are external views of a battery pack. The battery pack includes a secondary battery 913 and a circuit board 900. The secondary battery 913 is connected to an antenna 914 through the circuit board 900. A label 910 is attached to the secondary battery 913. In addition, as illustrated in FIG. 15B, the secondary battery 913 is connected to a terminal 951 and a terminal 952. The circuit board 900 is fixed with a seal 915.

The circuit board 900 includes a terminal 911 and a circuit 912. The terminal 911 is connected to the terminal 951, the terminal 952, the antenna 914, and the circuit 912. Note that a plurality of terminals 911 may be provided to serve as a control signal input terminal, a power supply terminal, and the like.

The circuit 912 may be provided on the rear surface of the circuit board 900. Note that the shape of the antenna 914 is not limited to coil shapes, and may be a linear shape or a plate shape, for example. An antenna such as a planar antenna, an aperture antenna, a traveling-wave antenna, an EH antenna, a magnetic-field antenna, or a dielectric antenna may be used. Alternatively, the antenna 914 may be a flat-plate conductor. The flat-plate conductor can serve as one of conductors for electric field coupling. That is, the antenna 914 may serve as one of two conductors of a capacitor. Thus, electric power can be transmitted and received not only by an electromagnetic field or a magnetic field but also by an electric field.

The battery pack includes a layer 916 between the antenna 914 and the secondary battery 913. The layer 916 has a function of blocking an electromagnetic field by the secondary battery 913, for example. As the layer 916, for example, a magnetic body can be used.

Note that the structure of the battery pack is not limited to that in FIG. 15.

Figure 16A:
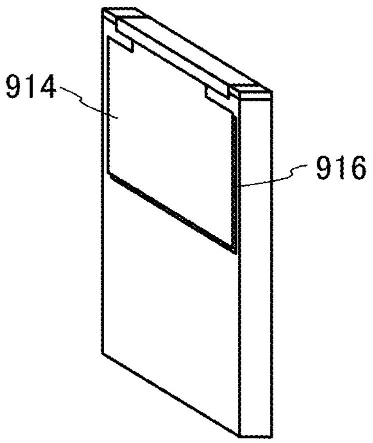
FIG. 16A, FIG. 16B, FIG. 16C, and FIG. 16D are diagrams illustrating examples of secondary batteries.
Figure 16B:
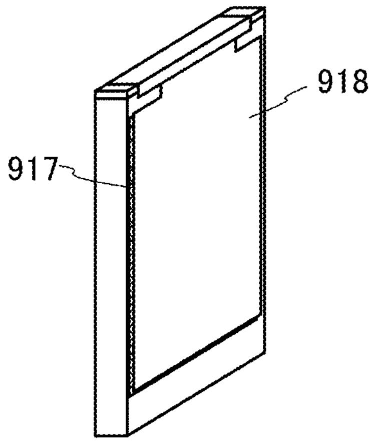

For example, as illustrated in FIG. 16A and FIG. 16B, two opposite surfaces of the secondary battery 913 illustrated in FIG. 15A and FIG. 15B may be provided with respective antennas. FIG. 16A is an external view seen from one side of the opposite surfaces, and FIG. 16B is an external view seen from the other side of the opposite surfaces. Note that for portions which are the same as those of the secondary battery illustrated in FIG. 15A and FIG. 15B, the description of the secondary battery illustrated in FIG. 15A and FIG. 15B can be appropriately referred to.

As illustrated in FIG. 16A, the antenna 914 is provided on one of the opposite surfaces of the secondary battery 913 with the layer 916 located therebetween, and as illustrated in FIG. 16B, an antenna 918 is provided on the other of the opposite surfaces of the secondary battery 913 with a layer 917 located therebetween. The layer 917 has a function of blocking an electromagnetic field by the secondary battery 913, for example. As the layer 917, for example, a magnetic body can be used.

With the above structure, both of the antenna 914 and the antenna 918 can be increased in size. The antenna 918 has a function of communicating data with an external device, for example. An antenna with a shape that can be used for the antenna 914, for example, can be used as the antenna 918. As a system for communication using the antenna 918 between the secondary battery and another device, a response method that can be used between the secondary battery and another device, such as NFC (near field communication), can be employed.

Figure 16C:
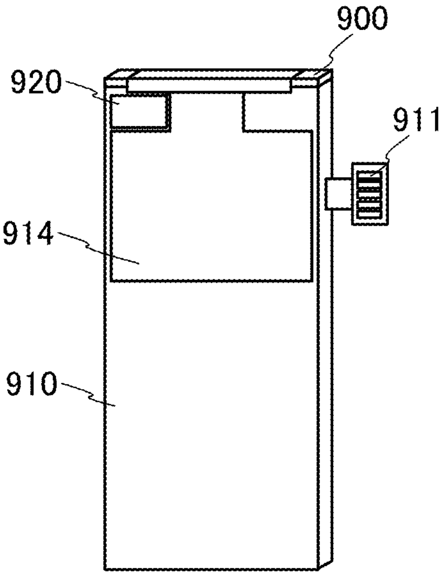

Alternatively, as illustrated in FIG. 16C, the secondary battery 913 illustrated in FIG. 15A and FIG. 15B may be provided with a display device 920. The display device 920 is electrically connected to the terminal 911. Note that the label 910 is not necessarily provided in a portion where the display device 920 is provided. Note that for portions similar to those of the secondary battery illustrated in FIG. 15A and FIG. 15B, the description of the secondary battery illustrated in FIG. 15A and FIG. 15B can be appropriately referred to.

The display device 920 may display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 16D:
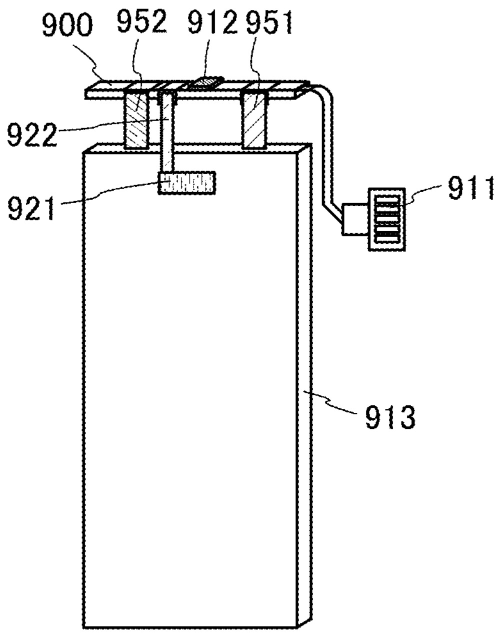

Alternatively, as illustrated in FIG. 16D, the secondary battery 913 illustrated in FIG. 15A and FIG. 15B may be provided with a sensor 921. The sensor 921 is electrically connected to the terminal 911 via a terminal 922. Note that for portions similar to those of the secondary battery illustrated in FIG. 15A and FIG. 15B, the description of the secondary battery illustrated in FIG. 15A and FIG. 15B can be appropriately referred to.

The sensor 921 has a function of measuring, for example, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays. With the sensor 921, for example, data on an environment (e.g., temperature) where the secondary battery is placed can be sensed and stored in a memory inside the circuit 912.

Furthermore, structure examples of the secondary battery 913 are described with reference to FIG. 17 and FIG. 18.

Figure 17A:
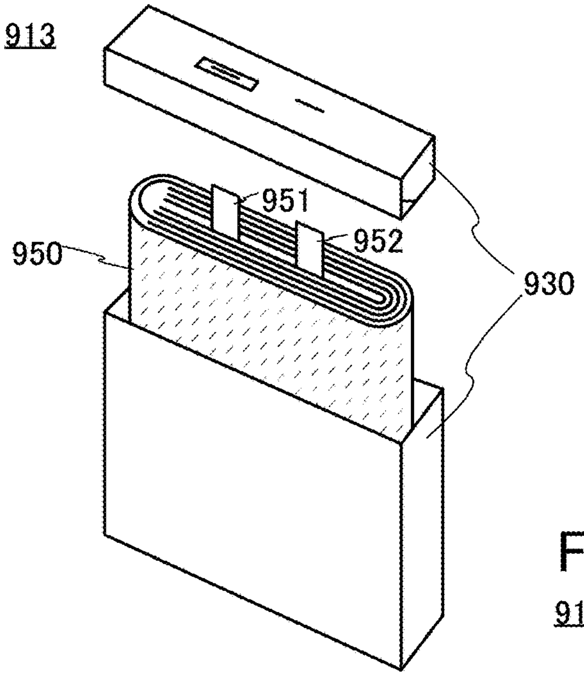
FIG. 17A, FIG. 17B, and FIG. 17C are diagrams illustrating examples of secondary batteries.

The secondary battery 913 illustrated in FIG. 17A includes a wound body 950 provided with the terminal 951 and the terminal 952 in a region inside a housing 930. The wound body 950 is soaked in an electrolyte solution in a region inside the housing 930. The terminal 952 is in contact with the housing 930. The use of an insulator or the like prevents contact between the terminal 951 and the housing 930. Note that in FIG. 17A, the housing 930 divided into pieces is illustrated for convenience; however, in the actual structure, the wound body 950 is covered with the housing 930 and the terminal 951 and the terminal 952 extend to the outside of the housing 930. For the housing 930, a metal material (e.g., aluminum) or a resin material can be used.

Figure 17B:
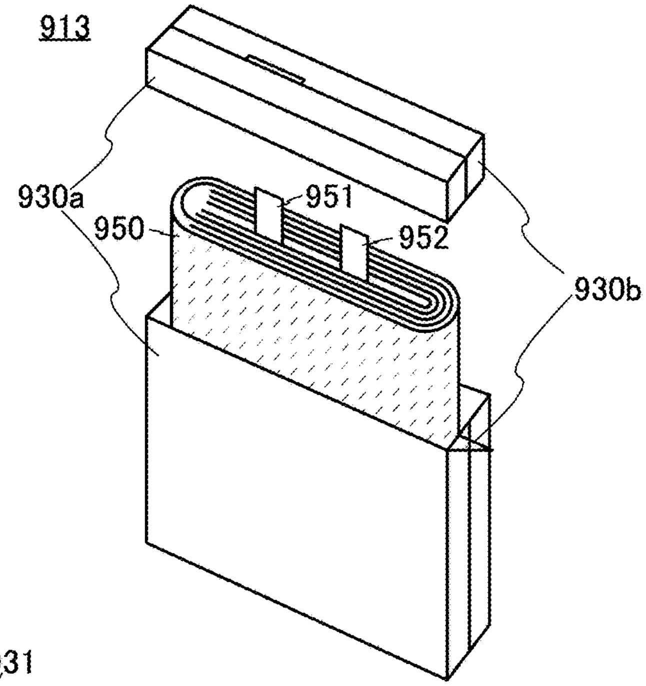

Note that as illustrated in FIG. 17B, the housing 930 illustrated in FIG. 17A may be formed using a plurality of materials. For example, in the secondary battery 913 illustrated in FIG. 17B, a housing 930*a* and a housing 930*b* are bonded to each other, and the wound body 950 is provided in a region surrounded by the housing 930*a* and the housing 930*b*.

For the housing 930*a*, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930*a*, an antenna such as the antenna 914 may be provided in a region inside the housing 930*a*. For the housing 930*b*, a metal material can be used, for example.

Figure 17C:
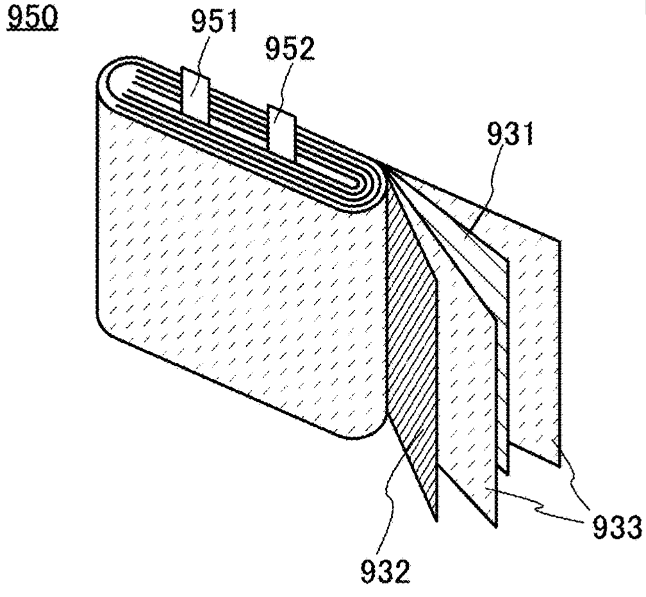

FIG. 17C illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks each including the negative electrode 931, the positive electrode 932, and the separator 933 may be further stacked.

The negative electrode 931 is connected to the terminal 911 illustrated in FIG. 15 via one of the terminal 951 and the terminal 952. The positive electrode 932 is connected to the terminal 911 illustrated in FIG. 15 via the other of the terminal 951 and the terminal 952.

Figure 18A:
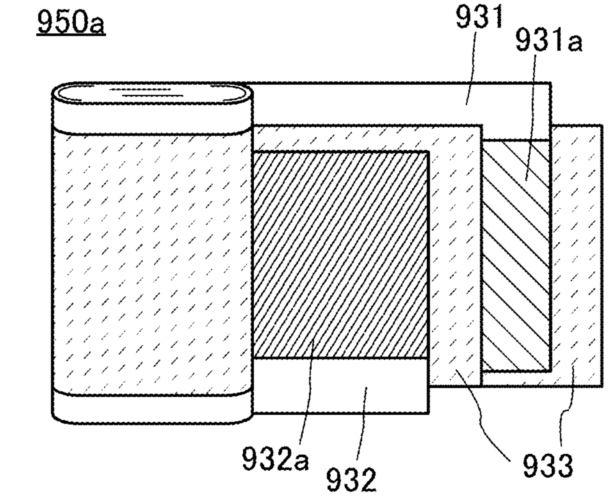
FIG. 18A, FIG. 18B, and FIG. 18C are diagrams illustrating an example of a secondary battery.
Figure 18B:
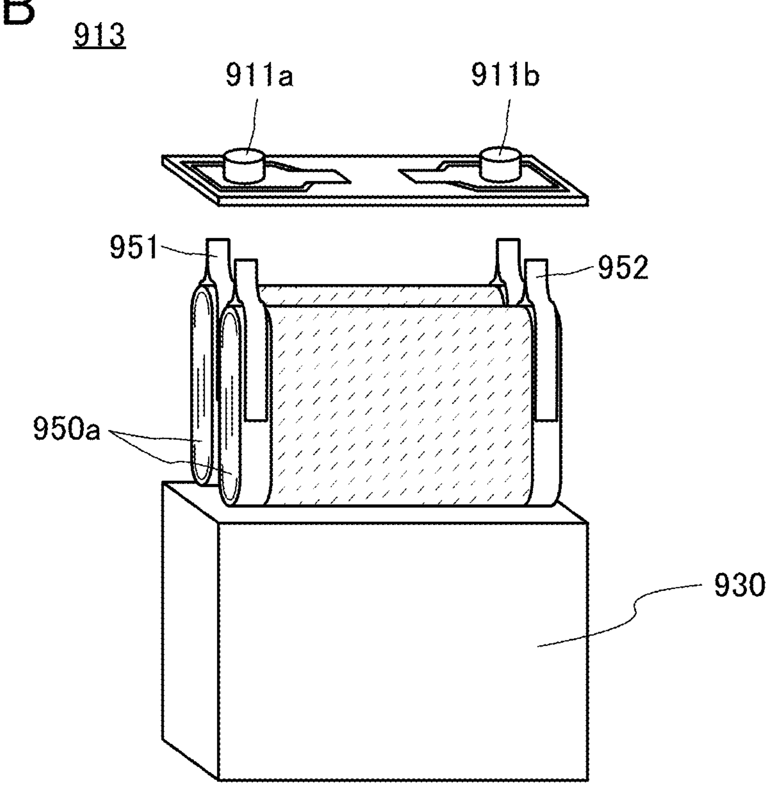
Figure 18C:
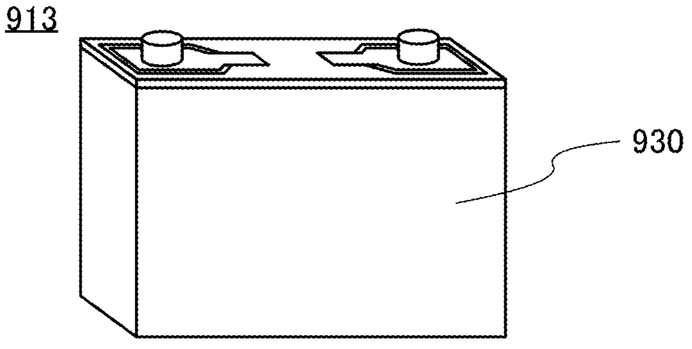

As illustrated in FIGS. 18A to 18C, the secondary battery 913 may include a wound body 950*a*. The wound body 950*a* illustrated in FIG. 18A includes a negative electrode 931, a positive electrode 932, and separators 933. The negative electrode 931 includes a negative electrode active material layer 931*a*. The positive electrode 932 includes a positive electrode active material layer 932*a*. The separator 933 has a larger width than the negative electrode active material layer 931*a* and the positive electrode active material layer 932*a*, and is wound to overlap the negative electrode active material layer 931*a* and the positive electrode active material layer 932*a*. In terms of safety, the width of the negative electrode active material layer 931*a* is preferably larger than that of the positive electrode active material layer 932*a*. The wound body 950*a* having such a shape is preferable because of its high degree of safety and high productivity.

As illustrated in FIG. 18B, the negative electrode 931 is electrically connected to the terminal 951. The terminal 951 is electrically connected to a terminal 911*a*. The positive electrode 932 is electrically connected to the terminal 952. The terminal 952 is electrically connected to a terminal 911*b*.

As illustrated in FIG. 18C, the wound body 950*a* and an electrolyte solution are covered with the housing 930, whereby the secondary battery 913 is obtained. The housing 930 is preferably provided with a safety valve, an overcurrent protection element, and the like.

As illustrated in FIG. 18B, the secondary battery 913 may include a plurality of wound bodies 950*a*. The use of the plurality of wound bodies 950*a* enables the secondary battery 913 to have higher charge and discharge capacity. The description of the secondary battery 913 in FIG. 17A to FIG. 17C can be referred to for the other components of the secondary battery 913 in FIG. 18A and FIG. 18B.

When the positive electrode active material described in the above embodiment is used in the positive electrode 932, the secondary battery 913 with high charge and discharge capacity and excellent cycle performance can be obtained.

<Laminated Secondary Battery>

Next, an example of a laminated secondary battery is described with reference to FIG. 19 to FIG. 31. When the laminated secondary battery has flexibility and is used in an electronic device at least part of which is flexible, the secondary battery can be bent as the electronic device is bent.

Figure 19A:
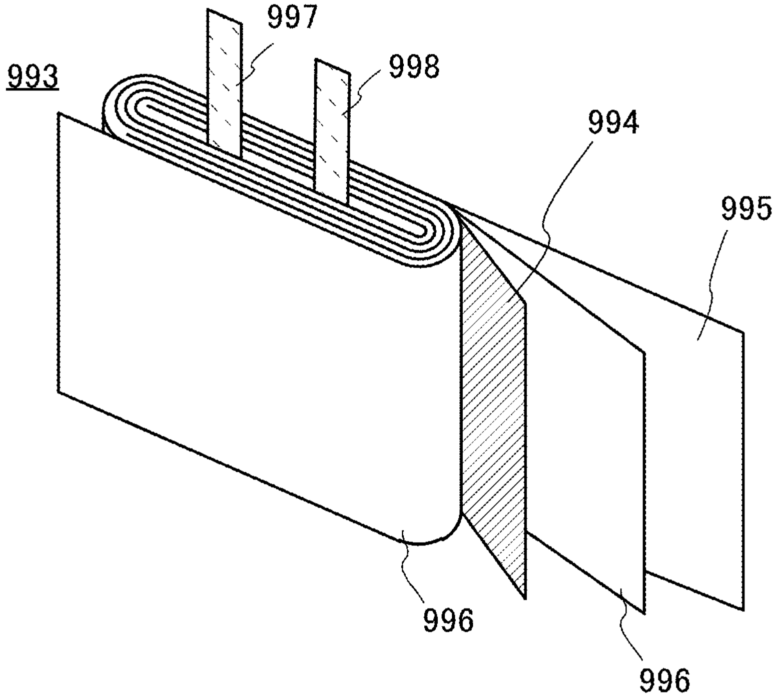
FIG. 19A, FIG. 19B, and FIG. 19C are diagrams illustrating a laminated secondary battery.

A laminated secondary battery 980 is described with reference to FIG. 19. The laminated secondary battery 980 includes a wound body 993 illustrated in FIG. 19A. The wound body 993 includes a negative electrode 994, a positive electrode 995, and separators 996. The wound body 993 is, like the wound body 950 illustrated in FIG. 18, obtained by winding a sheet of a stack in which the negative electrode 994 overlaps with the positive electrode 995 with the separator 996 provided therebetween.

Note that the number of stacks each including the negative electrode 994, the positive electrode 995, and the separator 996 may be designed as appropriate depending on required charge and discharge capacity and element volume. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 19B:
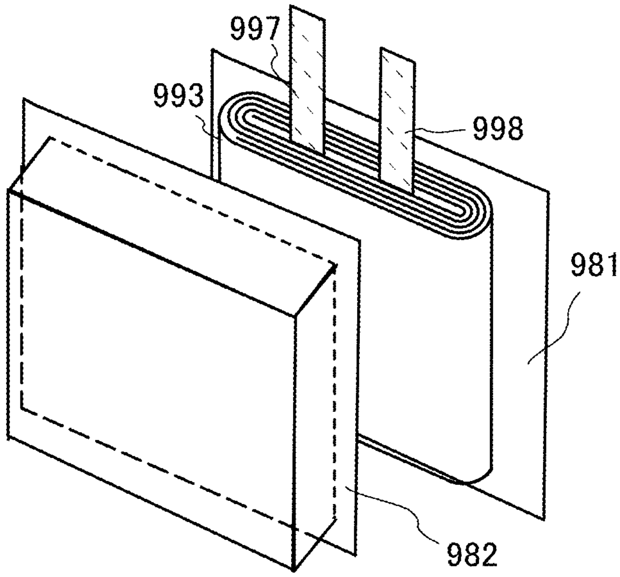
Figure 19C:
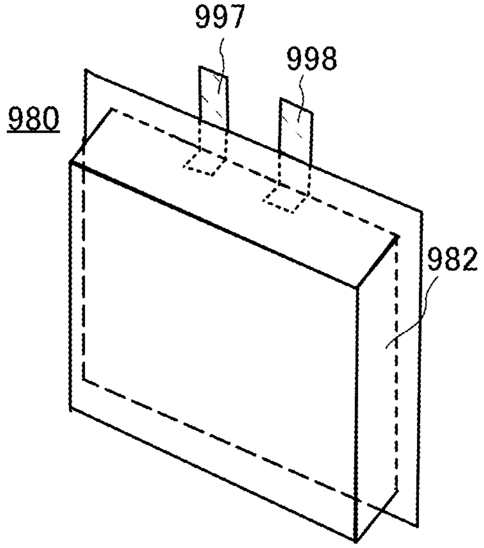

As illustrated in FIG. 19B, the above-described wound body 993 is packed in a space formed by bonding a film 981 and a film 982 having a depressed portion that serve as exterior bodies by thermocompression bonding or the like, whereby the secondary battery 980 can be formed as illustrated in FIG. 19C. The wound body 993 includes the lead electrode 997 and the lead electrode 998, and is soaked in an electrolyte solution inside the film 981 and the film 982 having a depressed portion.

For the film 981 and the film 982 having a depressed portion, one or more selected from a metal material such as aluminum and a resin material can be used, for example. With the use of a resin material for the film 981 and the film 982 having a depressed portion, the film 981 and the film 982 having a depressed portion can be changed in their forms when external force is applied; thus, a flexible storage battery can be formed.

Although FIG. 19B and FIG. 19C show an example of using two films, the wound body 993 may be placed in a space formed by bending one film.

When the positive electrode active material described in the above embodiment is used in the positive electrode 995, the secondary battery 980 with high charge and discharge capacity and excellent cycle performance can be obtained.

In FIG. 19, an example in which the secondary battery 980 includes a wound body in a space formed by films serving as exterior bodies is described; however, as illustrated in FIG. 20, a secondary battery may include a plurality of strip-shaped positive electrodes, a plurality of strip-shaped separators, and a plurality of strip-shaped negative electrodes in a space formed by films serving as exterior bodies, for example.

Figure 20A:
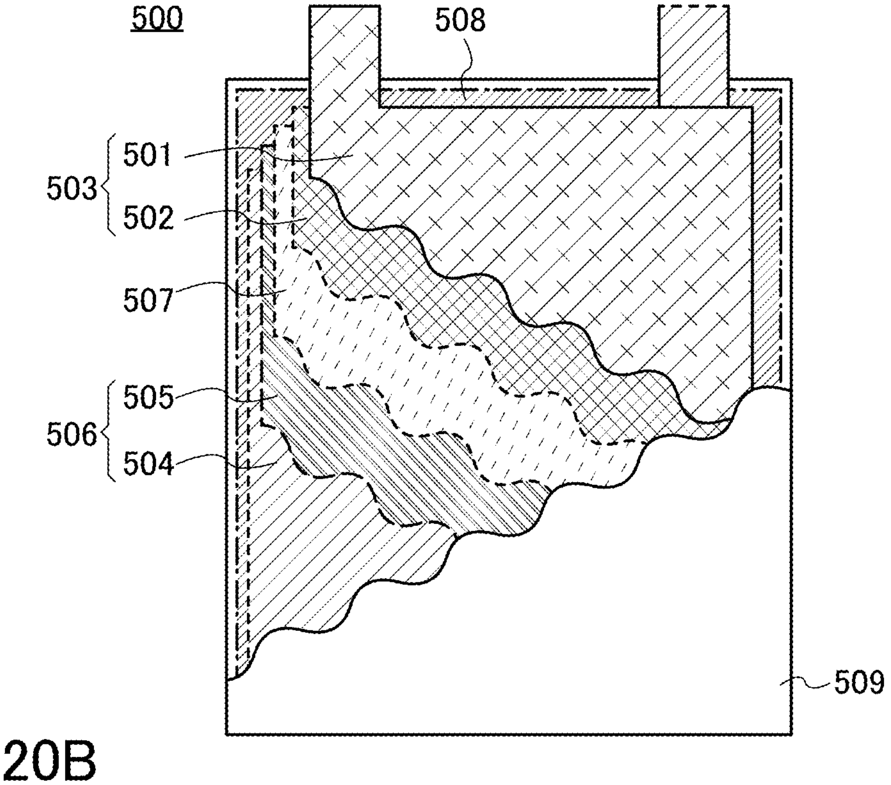
FIG. 20A and FIG. 20B are diagrams illustrating a laminated secondary battery.

A laminated secondary battery 500 illustrated in FIG. 20A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The exterior body 509 is filled with the electrolyte solution 508. The electrolyte solution described in Embodiment 3 can be used as the electrolyte solution 508.

In the laminated secondary battery 500 illustrated in FIG. 20A, the positive electrode current collector 501 and the negative electrode current collector 504 also serve as terminals for electrical contact with the outside. For this reason, the positive electrode current collector 501 and the negative electrode current collector 504 may be arranged so that part of the positive electrode current collector 501 and part of the negative electrode current collector 504 are exposed to the outside of the exterior body 509. Alternatively, without exposing the positive electrode current collector 501 and the negative electrode current collector 504 from the exterior body 509 to the outside, a lead electrode may be used, and the lead electrode and the positive electrode current collector 501 or the negative electrode current collector 504 may be bonded by ultrasonic welding so that the lead electrode is exposed to the outside.

As the exterior body 509 of the laminated secondary battery 500, for example, a laminate film having a three-layer structure can be employed in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film.

Figure 20B:
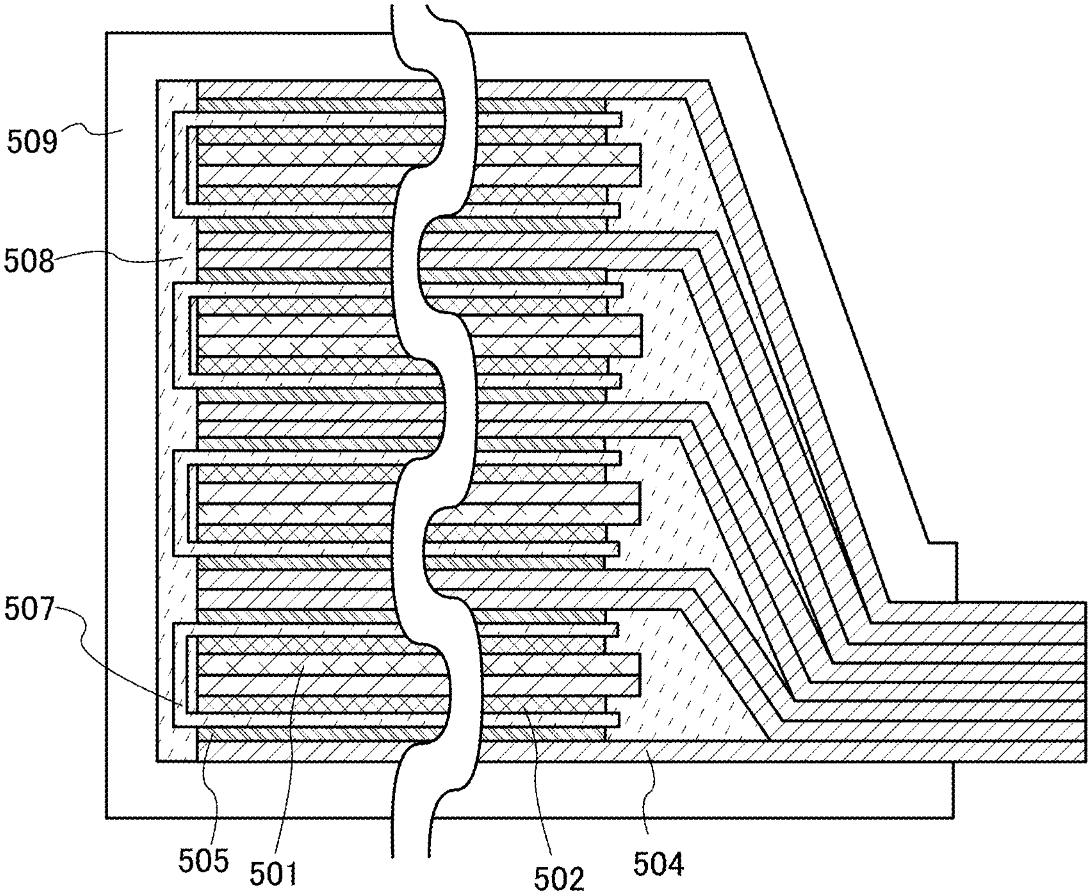

FIG. 20B shows an example of a cross-sectional structure of the laminated secondary battery 500. FIG. 20A shows an example in which only two current collectors are included for simplicity, but actually, a plurality of electrode layers are included as illustrated in FIG. 20B.

In FIG. 20B, the number of electrode layers is 16, for example. Note that the secondary battery 500 has flexibility even though the number of electrode layers is set to 16. FIG. 20B illustrates a structure including 8 layers of negative electrode current collectors 504 and 8 layers of positive electrode current collectors 501, i.e., 16 layers in total. Note that FIG. 20B illustrates a cross section of the lead portion of the negative electrode, and the 8 layers of the negative electrode current collectors 504 are bonded to each other by ultrasonic welding. It is needless to say that the number of electrode layers is not limited to 16, and may be more than 16 or less than 16. With a large number of electrode layers, the secondary battery can have high charge and discharge capacity. In contrast, with a small number of electrode layers, the secondary battery can have a small thickness and high flexibility.

Figure 21:
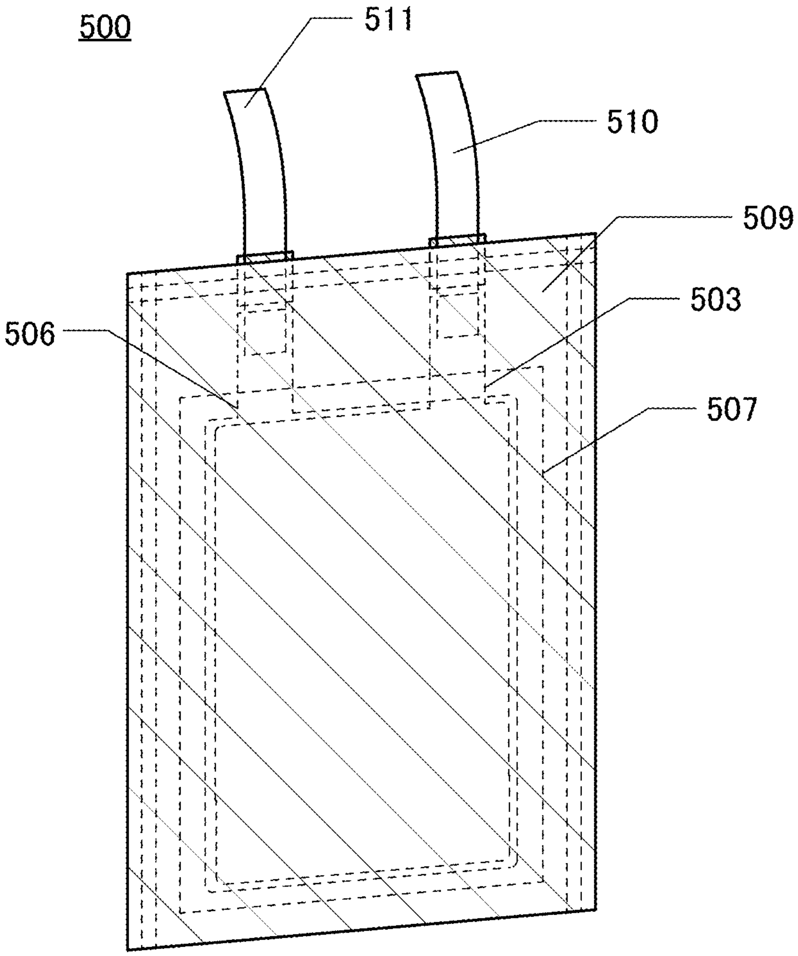
FIG. 21 is an external view of a secondary battery.
Figure 22:
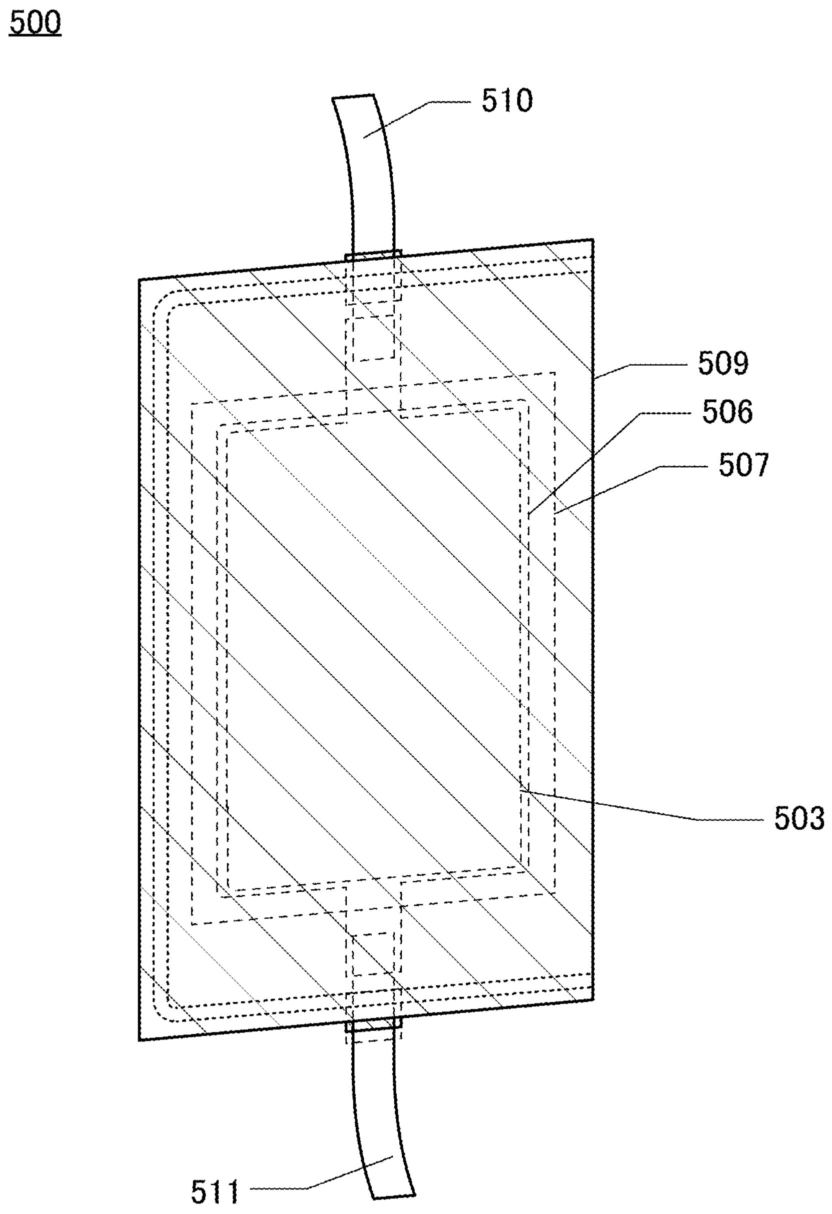
FIG. 22 is an external view of a secondary battery.

FIG. 21 and FIG. 22 each show an example of the external view of the laminated secondary battery 500. In FIG. 21 and FIG. 22, the positive electrode 503, the negative electrode 506, the separator 507, the exterior body 509, a positive electrode lead electrode 510, and a negative electrode lead electrode 511 are included.

Figure 23A:
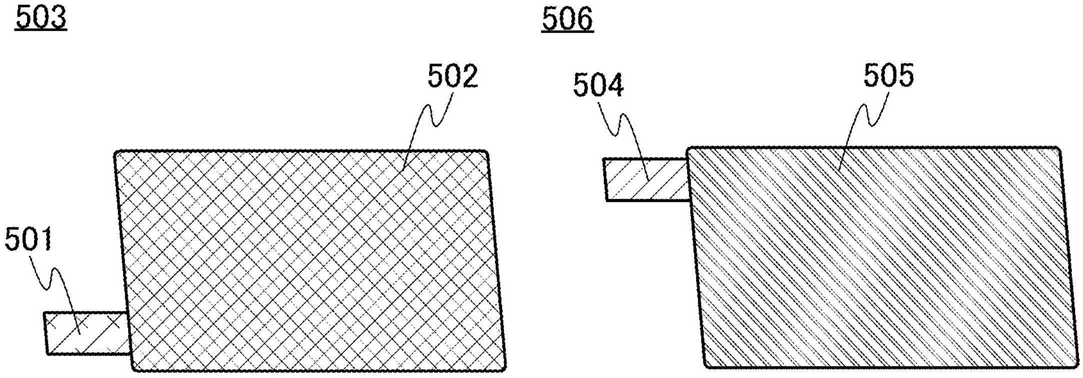
FIG. 23A, FIG. 23B, and FIG. 23C are diagrams illustrating a method for manufacturing a secondary battery.

FIG. 23A shows external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter, referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in FIG. 23A.

<Method for Manufacturing Laminated Secondary Battery>

Figure 23B:
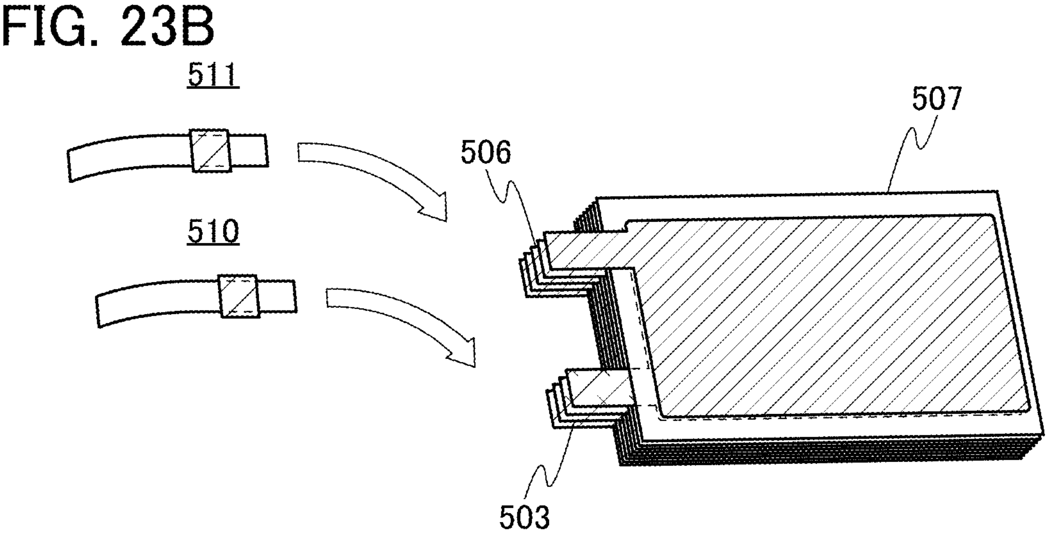

Here, an example of a method for manufacturing the laminated secondary battery whose external view is shown in FIG. 21 is described with reference to FIG. 23B and FIG. 23C.

First, the negative electrode 506, the separator 507, and the positive electrode 503 are stacked. FIG. 23B illustrates a stack including the negative electrode 506, the separator 507, and the positive electrode 503. Here, an example in which 5 negative electrodes and 4 positive electrodes are used is shown. Next, the tab regions of the positive electrodes 503 are bonded to each other, and the tab region of the positive electrode on the outermost surface and the positive electrode lead electrode 510 are bonded to each other. The bonding can be performed by ultrasonic welding, for example. In a similar manner, the tab regions of the negative electrodes 506 are bonded to each other, and the tab region of the negative electrode on the outermost surface and the negative electrode lead electrode 511 are bonded to each other.

After that, the negative electrode 506, the separator 507, and the positive electrode 503 are placed over the exterior body 509.

Figure 23C:
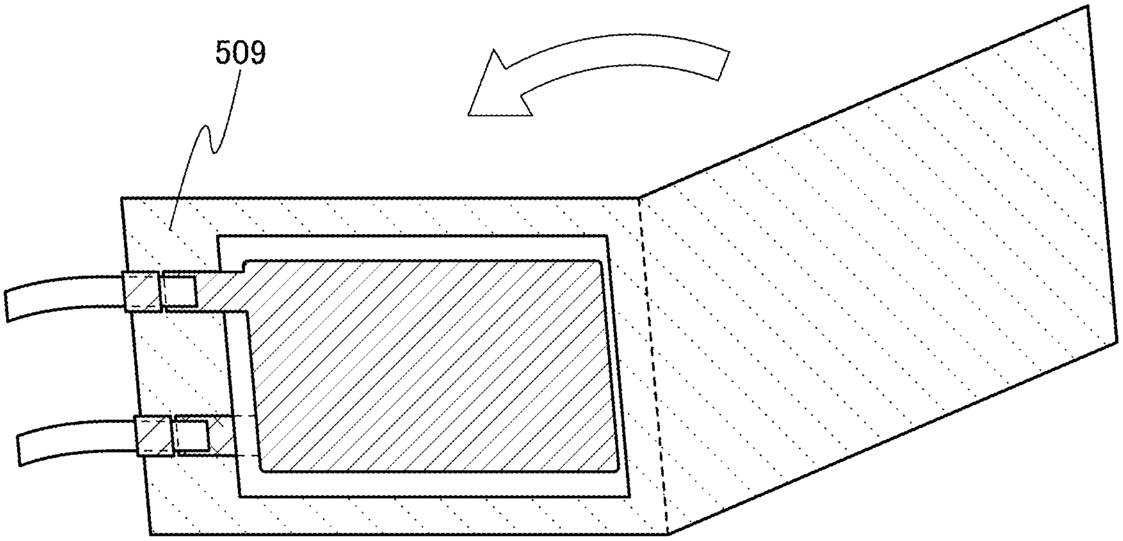

Subsequently, the exterior body 509 is folded along a portion shown by a dashed line as illustrated in FIG. 23C. Then, the outer edges of the exterior body 509 are bonded to each other. The bonding can be performed by thermocompression bonding, for example. At this time, an unbonded region (hereinafter referred to as an inlet) is provided for part (or one side) of the exterior body 509 so that the electrolyte solution 508 can be introduced later.

Next, the electrolyte solution 508 (not illustrated) is introduced into the exterior body 509 from the inlet of the exterior body 509. The electrolyte solution 508 is preferably introduced in a reduced pressure atmosphere or in an inert gas atmosphere. Lastly, the inlet is bonded. In the above manner, the laminated secondary battery 500 can be manufactured.

When the positive electrode active material described in the above embodiment is used in the positive electrode 503, the secondary battery 500 with high charge and discharge capacity and excellent cycle performance can be obtained.

<Bendable Secondary Battery>

Next, an example of a bendable secondary battery is described with reference to FIG. 24 and FIG. 25.

Figure 24A:
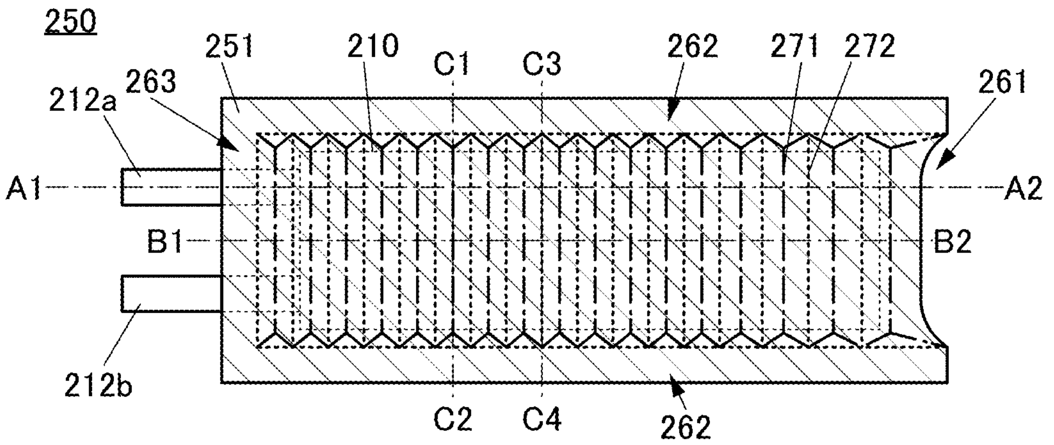
FIG. 24A, FIG. 24B, FIG. 24C, FIG. 24D, and FIG. 24E are diagrams illustrating a bendable secondary battery.
Figure 24B:
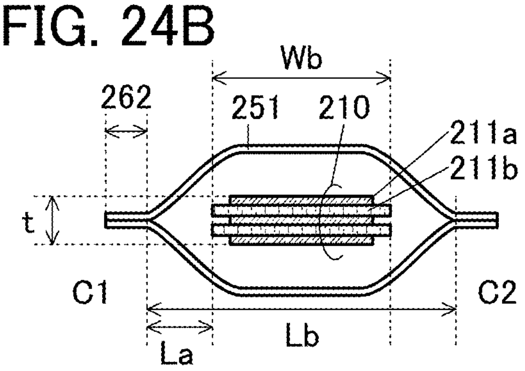
Figure 24C:
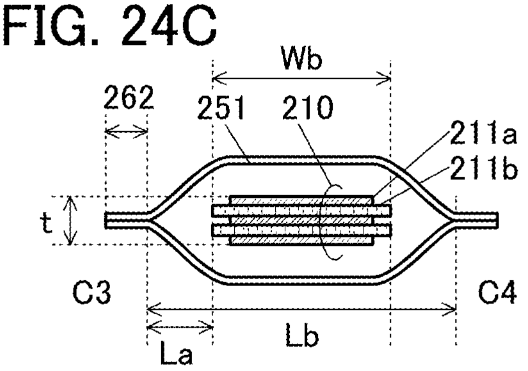
Figure 24D:
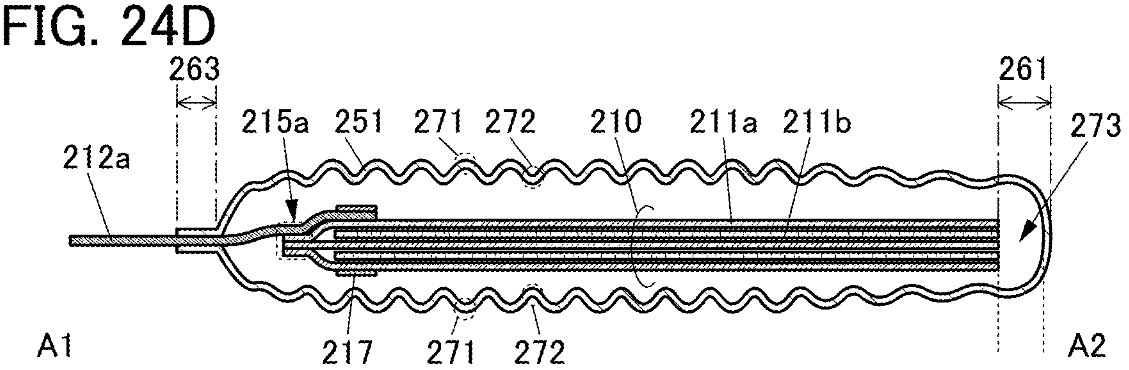

FIG. 24A is a schematic top view of a bendable secondary battery 250. FIG. 24B, FIG. 24C, and FIG. 24D are schematic cross-sectional views taken along the cutting line C1-C2, the cutting line C3-C4, and the cutting line A1-A2, respectively, in FIG. 24A. The secondary battery 250 includes an exterior body 251 and an electrode stack 210 held in the exterior body 251. The electrode stack 210 includes at least a positive electrode 211*a* and a negative electrode 211*b*. The positive electrode 211*a* and the negative electrode 211*b* are collectively referred to as the electrode stack 210. A lead 212*a* electrically connected to the positive electrode 211*a* and a lead 212*b* electrically connected to the negative electrode 211*b* are extended to the outside of the exterior body 251. In addition to the positive electrode 211*a* and the negative electrode 211*b*, an electrolyte solution (not illustrated) is enclosed in a region surrounded by the exterior body 251.

Figure 25A:
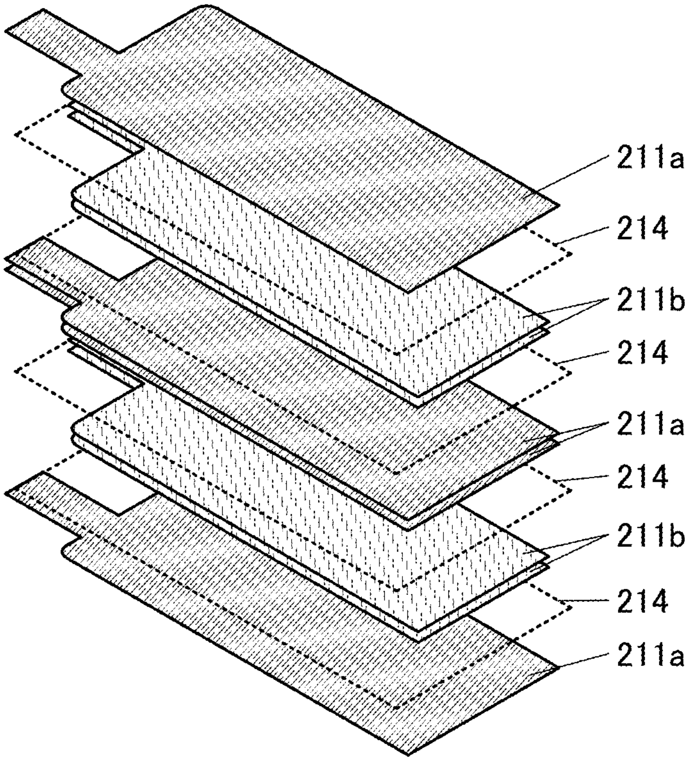
FIG. 25A and FIG. 25B are diagrams illustrating a bendable secondary battery.
Figure 25B:
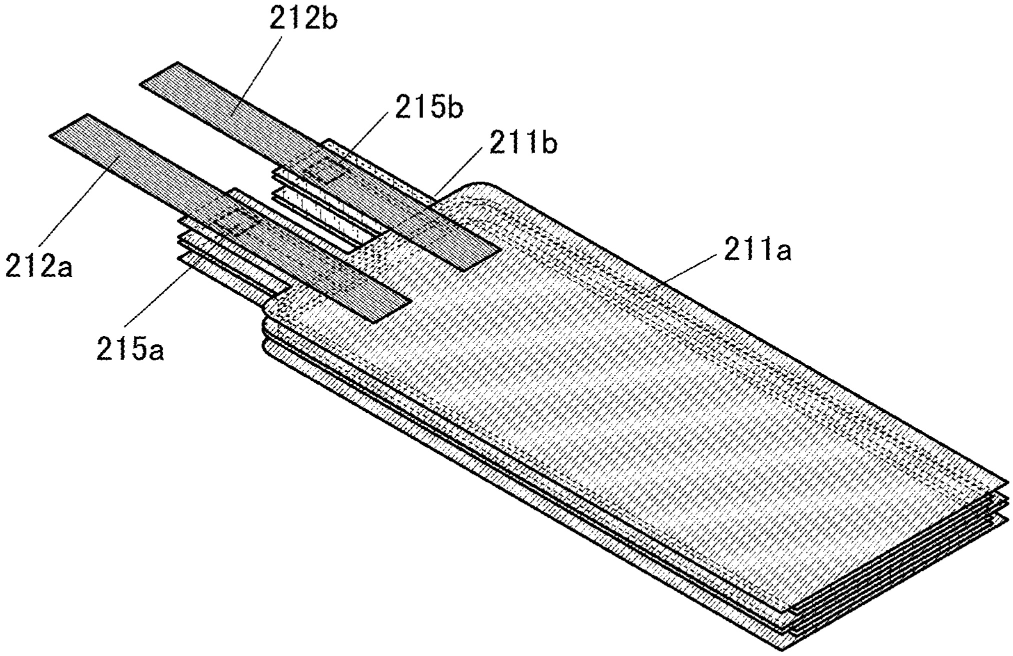

The positive electrode 211*a* and the negative electrode 211*b* included in the secondary battery 250 are described with reference to FIG. 25. FIG. 25A is a perspective view illustrating the stacking order of the positive electrode 211*a*, the negative electrode 211*b*, and a separator 214. FIG. 25B is a perspective view illustrating the lead 212*a* and the lead 212*b* in addition to the positive electrode 211*a* and the negative electrode 211*b*.

As illustrated in FIG. 25A, the secondary battery 250 includes a plurality of strip-shaped positive electrodes 211*a*, a plurality of strip-shaped negative electrodes 211*b*, and a plurality of separators 214. The positive electrode 211*a* and the negative electrode 211*b* each include a projected tab portion and a portion other than the tab. A positive electrode active material layer is formed on one surface of the positive electrode 211*a* other than the tab, and a negative electrode active material layer is formed on one surface of the negative electrode 211*b* other than the tab.

The positive electrodes 211*a* and the negative electrodes 211*b* are stacked so that surfaces of the positive electrodes 211*a* on each of which the positive electrode active material layer is not formed are in contact with each other and that surfaces of the negative electrodes 211*b* on each of which the negative electrode active material is not formed are in contact with each other.

The separator 214 is provided between the surface of the positive electrode 211*a* on which the positive electrode active material is formed and the surface of the negative electrode 211*b* on which the negative electrode active material is formed. In FIG. 25A and FIG. 25B, the separator 214 is shown by a dotted line for easy viewing.

As illustrated in FIG. 25B, the plurality of positive electrodes 211*a* are electrically connected to the lead 212*a* in a bonding portion 215*a*. The plurality of negative electrodes 211*b* are electrically connected to the lead 212*b* in a bonding portion 215*b*.

Next, the exterior body 251 is described with reference to FIG. 24B, FIG. 24C, FIG. 24D, and FIG. 24E.

The exterior body 251 has a film-like shape and is folded in half so as to sandwich the positive electrodes 211*a* and the negative electrodes 211*b*. The exterior body 251 includes a folded portion 261, a pair of seal portions 262, and a seal portion 263. The pair of seal portions 262 is provided with the positive electrodes 211*a* and the negative electrodes 211*b* positioned therebetween and thus can also be referred to as side seals. The seal portion 263 includes portions overlapping with the lead 212*a* and the lead 212*b* and can also be referred to as a top seal.

Part of the exterior body 251 that overlaps with the positive electrodes 211*a* and the negative electrodes 211*b* preferably has a wave shape in which crest lines 271 and trough lines 272 are alternately arranged. The seal portions 262 and the seal portion 263 of the exterior body 251 are preferably flat.

FIG. 24B shows a cross section along the part overlapping with the crest line 271. FIG. 24C shows a cross section along the part overlapping with the trough line 272. FIG. 24B and FIG. 24C correspond to cross sections of the secondary battery 250, the positive electrodes 211*a*, and the negative electrodes 211*b* in the width direction.

Here, the distance between end portions of the positive electrode 211*a* and the negative electrode 211*b* in the width direction and the seal portion 262, that is, the distance between the end portions of the positive electrode 211*a* and the negative electrode 211*b* and the seal portion 262 is referred to as a distance La. When the secondary battery 250 changes in shape, for example, is bent, the positive electrode 211*a* and the negative electrode 211*b* change in shape such that the positions thereof are shifted from each other in the length direction as described later. At the time, if the distance La is too short, the exterior body 251 and the positive electrode 211*a* and the negative electrode 211*b* are rubbed hard against each other, so that the exterior body 251 is damaged in some cases. In particular, when a metal film of the exterior body 251 is exposed, the metal film might be corroded by the electrolyte solution. Therefore, the distance La is preferably set as long as possible. However, if the distance La is too long, the volume of the secondary battery 250 is increased.

The distance La between the positive electrode 211*a* and the negative electrode 211*b*, and the seal portion 262 is preferably increased as the total thickness of the positive electrode 211*a* and the negative electrode 211*b* that are stacked is increased.

Specifically, when the total thickness of the stacked positive electrodes 211*a*, negative electrodes 211*b*, and separators 214, which are not illustrated, is indicated by t, the distance La is 0.8 times or more and 3.0 times or less, preferably 0.9 times or more and 2.5 times or less, further preferably 1.0 times or more and 2.0 times or less as large as the thickness t. The distance La is preferably 0.8 times or more and 2.5 times or less, 0.8 times or more and 2.0 times or less, 0.9 times or more and 3.0 times or less, 0.9 times or more and 2.0 times or less, 1.0 times or more and 3.0 times or less, or 1.0 times or more and 2.5 times or less as large as the thickness t. When the distance La is in this range, a compact battery that is highly reliable for bending can be fabricated.

Furthermore, when the distance between the pair of seal portions 262 is indicated by a distance Lb, it is preferable that the distance Lb be sufficiently larger than the widths of the positive electrode 211*a* and the negative electrode 211*b* (here, a width Wb of the negative electrode 211*b*). Thus, even if the positive electrode 211*a* and the negative electrode 211*b* come into contact with the exterior body 251 when deformation such as repeated bending of the secondary battery 250 is conducted, parts of the positive electrode 211*a* and the negative electrode 211*b* can be shifted in the width direction; hence, the positive electrode 211*a* and the negative electrode 211*b* can be effectively prevented from rubbing against the exterior body 251.

For example, the difference between the distance Lb between the pair of seal portions 262 and the width Wb of the negative electrode 211*b* is preferably 1.6 times or more and 6.0 times or less, further preferably 1.8 times or more and 5.0 times or less, still further preferably 2.0 times or more and 4.0 times or less as large as the thickness t of the positive electrode 211*a* and the negative electrode 211*b*. The difference is preferably 1.6 times or more and 5.0 times or less, 1.6 times or more and 4.0 times or less, 1.8 times or more and 6.0 times or less, 1.8 times or more and 4.0 times or less, 2.0 times or more and 6.0 times or less, or 2.0 times or more and 5.0 times or less as large as the thickness t of the positive electrodes 211*a* and the negative electrodes 211*b*.

Here, a is 0.8 or more and 3.0 or less, preferably 0.9 or more and 2.5 or less, and further preferably 1.0 or more and 2.0 or less. Alternatively, a is 0.8 or more and 2.5 or less, 0.8 or more and 2.0 or less, 0.9 or more and 3.0 or less, 0.9 or more and 2.0 or less, 1.0 or more and 3.0 or less, or 1.0 or more and 2.5 or less.

FIG. 24D illustrates a cross-sectional view including the lead 212*a* and corresponds to a cross section of the secondary battery 250, the positive electrode 211*a*, and the negative electrode 211*b* in the length direction. As illustrated in FIG. 24D, a space 273 is preferably provided between the end portions of the positive electrode 211*a* and the negative electrode 211*b* in the length direction and the exterior body 251 in the folded portion 261.

Figure 24E:
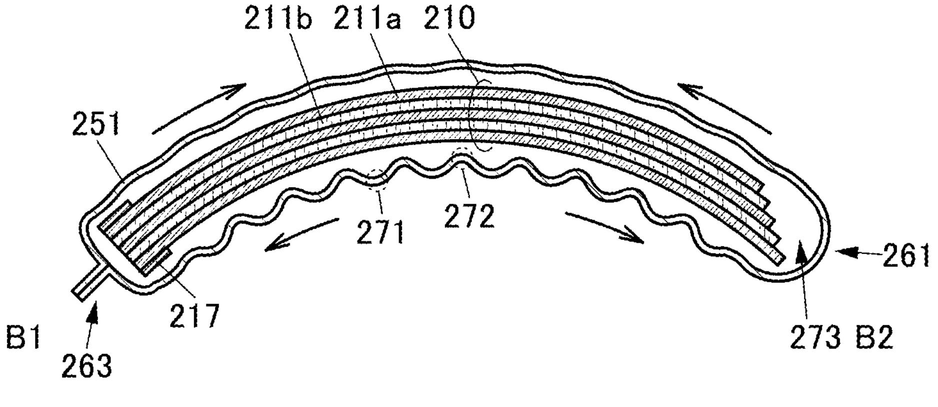

FIG. 24E is a schematic cross-sectional view of the secondary battery 250 in a state of being bent. FIG. 24E corresponds to a cross section along the cutting line B1-B2 in FIG. 24A.

When the secondary battery 250 is bent, a part of the exterior body 251 positioned on the outer side in bending is unbent and the other part positioned on the inner side changes its shape as it shrinks. More specifically, the part of the exterior body 251 positioned on the outer side changes its shape such that the wave amplitude becomes smaller and the length of the wave period becomes larger. In contrast, the part of the exterior body 251 positioned on the inner side changes its shape such that the wave amplitude becomes larger and the length of the wave period becomes smaller. When the exterior body 251 changes its shape in this manner, stress applied to the exterior body 251 due to bending is relieved, so that a material itself of the exterior body 251 does not need to expand or contract. Thus, the secondary battery 250 can be bent with weak force without damage to the exterior body 251.

As illustrated in FIG. 24E, when the secondary battery 250 is bent, the positive electrode 211*a* and the negative electrode 211*b* are shifted relatively. At this time, ends of the stacked positive electrodes 211*a* and negative electrodes 211*b* on the seal portion 263 side are fixed by a fixing member 217. Thus, the positive electrodes 211*a* and the negative electrodes 211*b* are shifted so that the shift amount becomes larger at a position closer to the bent portion 261. Therefore, stress applied to the positive electrode 211*a* and the negative electrode 211*b* is relieved, and the positive electrode 211*a* and the negative electrode 211*b* themselves do not need to expand or contract. Consequently, the secondary battery 250 can be bent without damage to the positive electrode 211*a* and the negative electrode 211*b*.

The space 273 is included between the positive electrode 211*a* and the negative electrode 211*b*, and the exterior body 251, whereby the positive electrode 211*a* and the negative electrode 211*b* can be shifted relatively while the positive electrode 211*a* and the negative electrode 211*b* located on an inner side in bending do not come into contact with the exterior body 251.

In the secondary battery 250 illustrated in FIG. 24 and FIG. 25, the exterior body, the positive electrode 211*a*, and the negative electrode 211*b* are less likely to be damaged and the battery characteristics are less likely to deteriorate even when the secondary battery 250 is repeatedly bent and unbent. When the positive electrode active material described in the above embodiment is used in the positive electrode 211*a* included in the secondary battery 250, a battery with better cycle performance can be obtained.

In an all-solid-state battery, the contact state of the inside interfaces can be kept favorable by applying a predetermined pressure in the direction of stacking positive electrodes and negative electrodes. By applying a predetermined pressure in the direction of stacking positive electrodes and negative electrodes, expansion in the stacking direction due to charge and discharge of the all-solid-state battery can be suppressed, and the reliability of the all-solid-state battery can be improved.

This embodiment can be used in appropriate combination with the other embodiments.

Embodiment 5

In this embodiment, examples of electronic devices each including the secondary battery of one embodiment of the present invention are described.

First, FIG. 26A to FIG. 26G show examples of electronic devices including the bendable secondary battery described in the above embodiment. Examples of electronic devices each including a bendable secondary battery include television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines.

Furthermore, a flexible secondary battery can be incorporated along a curved inside/outside wall surface of a house or a building or a curved interior/exterior surface of an automobile.

Figure 26A:
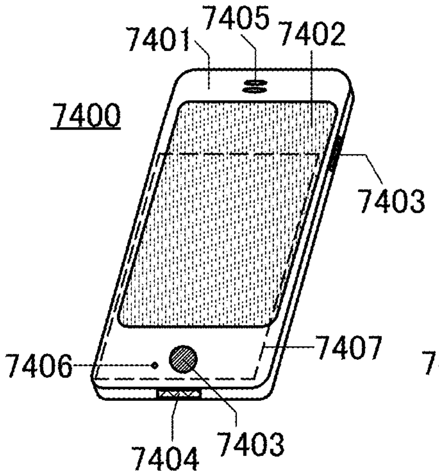
FIG. 26A, FIG. 26B, FIG. 26C, FIG. 26D, FIG. 26E, FIG. 26F, FIG. 26G, and FIG. 26H are diagrams illustrating examples of electronic devices.

FIG. 26A shows an example of a mobile phone. A mobile phone 7400 is provided with a display portion 7402 incorporated in a housing 7401, operation buttons 7403, an external connection port 7404, a speaker 7405, a microphone 7406, and the like. Note that the mobile phone 7400 includes a secondary battery 7407. When the secondary battery of one embodiment of the present invention is used as the secondary battery 7407, a lightweight mobile phone with a long lifetime can be provided.

Figure 26B:
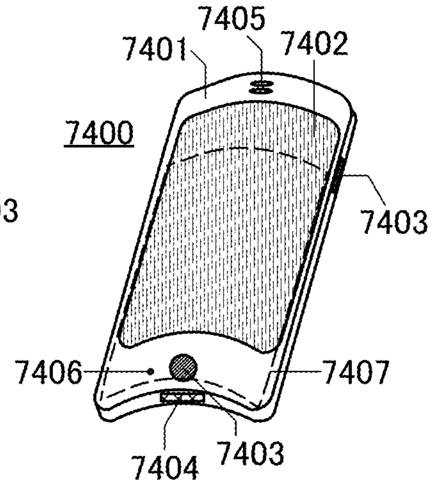
Figure 26C:
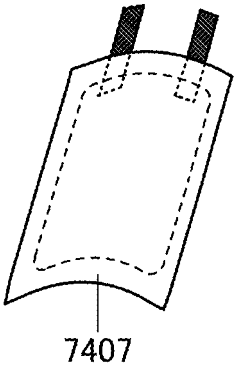

FIG. 26B illustrates the mobile phone 7400 that is curved. When the whole mobile phone 7400 is curved by external force, the secondary battery 7407 provided in a region inside the mobile phone 7400 is also curved. FIG. 26C illustrates the bent secondary battery 7407. The secondary battery 7407 is a thin storage battery. The secondary battery 7407 is fixed in a state of being bent. Note that the secondary battery 7407 includes a lead electrode electrically connected to a current collector. The current collector is, for example, copper foil, and partly alloyed with gallium; thus, adhesion between the current collector and an active material layer in contact with the current collector is improved and the secondary battery 7407 can have high reliability even in a state of being bent.

Figure 26D:
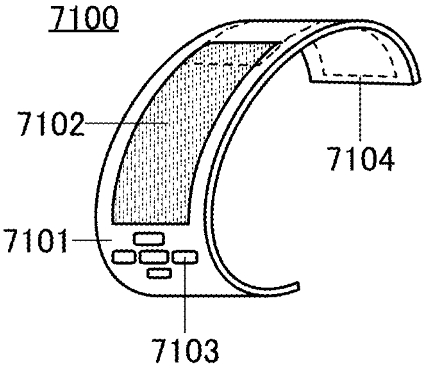
Figure 26E:
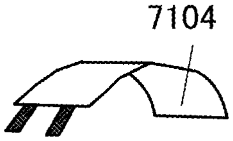

FIG. 26D shows an example of a bangle display device. A portable display device 7100 includes a housing 7101, a display portion 7102, operation buttons 7103, and a secondary battery 7104. FIG. 26E illustrates the bent secondary battery 7104. When the display device is worn on a user's arm while the secondary battery 7104 is bent, the housing changes its shape and the curvature of part or the whole of the secondary battery 7104 is changed. Note that the bending condition of a curve at a given point that is represented by a value of the radius of a corresponding circle is referred to as the radius of curvature, and the reciprocal of the radius of curvature is referred to as curvature. Specifically, part or the whole of the housing or the main surface of the secondary battery 7104 is changed in the range of radius of curvature from 40 mm or more to 150 mm or less. When the radius of curvature at the main surface of the secondary battery 7104 is in the range from 40 mm or more to 150 mm or less, the reliability can be kept high. When the secondary battery of one embodiment of the present invention is used as the secondary battery 7104, a lightweight portable display device with a long lifetime can be provided.

Figure 26F:
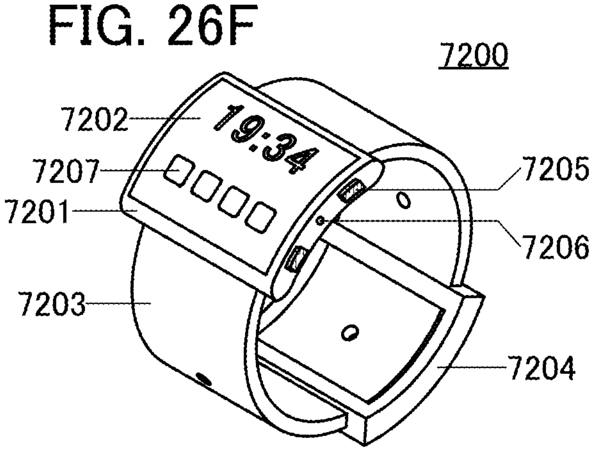

FIG. 26F shows an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operating system incorporated in the portable information terminal 7200.

The portable information terminal 7200 can perform near field communication that is standardized communication. For example, mutual communication between the portable information terminal 7200 and a headset capable of wireless communication enables hands-free calling. The portable information terminal 7200 may include an antenna. The antenna may be used for wireless communication.

The portable information terminal 7200 includes the input/output terminal 7206, and data can be directly transmitted to and received from another information terminal via a connector. In addition, charge via the input/output terminal 7206 is possible. Note that the charge operation may be performed by wireless power feeding without using the input/output terminal 7206.

The display portion 7202 of the portable information terminal 7200 includes the secondary battery of one embodiment of the present invention. When the secondary battery of one embodiment of the present invention is used, a lightweight portable information terminal with a long lifetime can be provided. For example, the secondary battery 7104 illustrated in FIG. 26E that is in the state of being curved can be provided in a region inside the housing 7201. Alternatively, the secondary battery 7104 illustrated in FIG. 26E can be provided in a region inside the band 7203 such that it can be curved.

The portable information terminal 7200 preferably includes a sensor. As the sensor, for example, one or more selected from human body sensors such as a fingerprint sensor, a pulse sensor, and a temperature sensor, a touch sensor, a pressure sensitive sensor, and an acceleration sensor are preferably mounted.

Figure 26G:
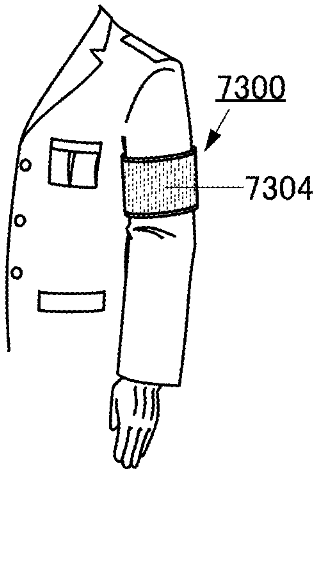

FIG. 26G shows an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication that is standardized communication.

The display device 7300 includes an input/output terminal, and data can be directly transmitted to and received from another information terminal via a connector. In addition, charge via the input/output terminal is possible. Note that the charge operation may be performed by wireless power feeding without using the input/output terminal.

When the secondary battery of one embodiment of the present invention is used as the secondary battery included in the display device 7300, a lightweight display device with a long lifetime can be provided.

Examples of electronic devices each including the secondary battery described in the above embodiment are described with reference to FIG. 26H, FIG. 27, and FIG. 28.

When the secondary battery of one embodiment of the present invention is used as a secondary battery of a daily electronic device, a lightweight product with a long lifetime can be provided. Examples of the daily electronic device include an electric toothbrush, an electric shaver, and electric beauty equipment. As secondary batteries of these products, small and lightweight stick type secondary batteries with high charge and discharge capacity are desired in consideration of handling ease for users.

Figure 26H:
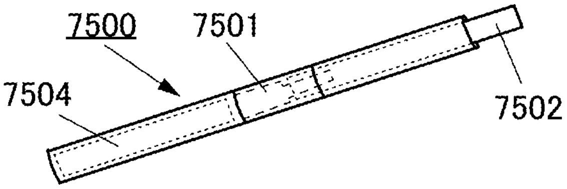

FIG. 26H is a perspective view of a device called a cigarette smoking device (electronic cigarette). In FIG. 26H, an electronic cigarette 7500 includes an atomizer 7501 including a heating element, a secondary battery 7504 that supplies power to the atomizer, and a cartridge 7502 including one or more selected from a liquid supply bottle, a sensor, and the like. To improve safety, a protection circuit that prevents one or both of overcharge and overdischarge of the secondary battery 7504 may be electrically connected to the secondary battery 7504. The secondary battery 7504 illustrated in FIG. 26H includes an external terminal for connection to a charger. When the electronic cigarette 7500 is held, the secondary battery 7504 is a tip portion; thus, it is preferred that the secondary battery 7504 have a short total length and be lightweight. With the secondary battery of one embodiment of the present invention, which has high charge and discharge capacity and excellent cycle performance, the small and lightweight electronic cigarette 7500 that can be used for a long time over a long period can be provided.

Figure 27A:
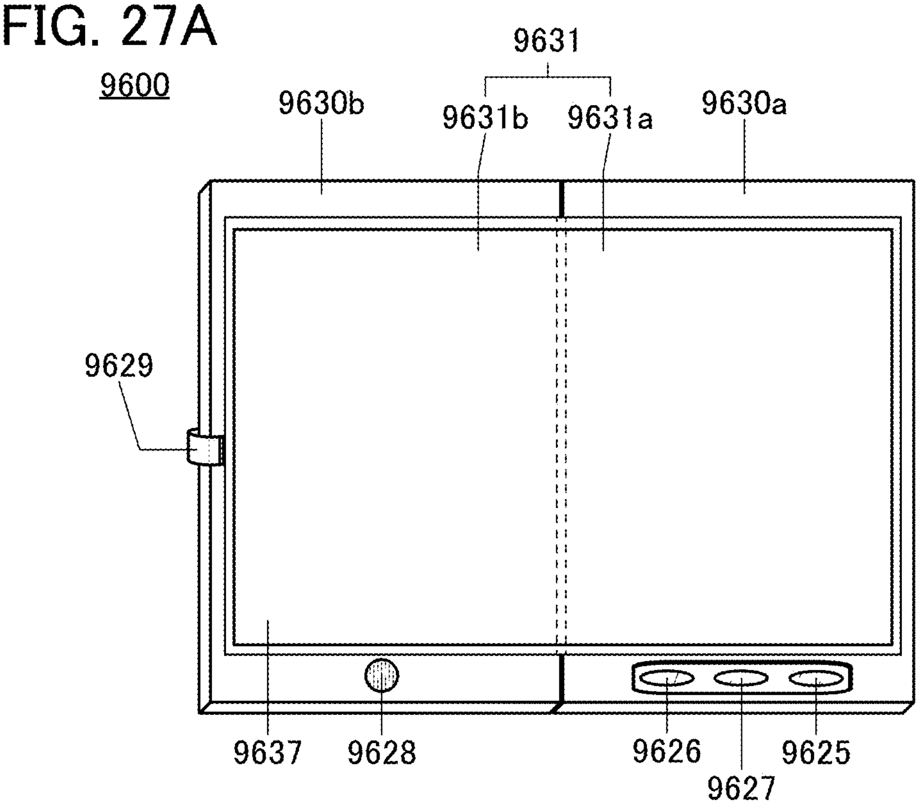
FIG. 27A, FIG. 27B, and FIG. 27C are diagrams illustrating examples of electronic devices.
Figure 27B:
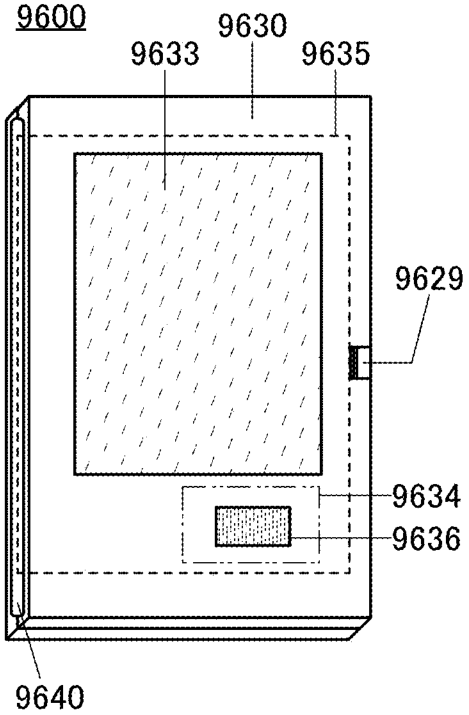

Next, FIG. 27A and FIG. 27B show an example of a tablet terminal that can be folded in half. A tablet terminal 9600 illustrated in FIG. 27A and FIG. 27B includes a housing 9630*a*, a housing 9630*b*, a movable portion 9640 connecting the housing 9630*a* and the housing 9630*b* to each other, a display portion 9631 including a display portion 9631*a* and a display portion 9631*b*, a switch 9625, a switch 9626, a switch 9627, a fastener 9629, and an operation switch 9628. A flexible panel is used for the display portion 9631, whereby a tablet terminal with a larger display portion can be provided. FIG. 27A illustrates the tablet terminal 9600 that is opened, and FIG. 27B illustrates the tablet terminal 9600 that is closed.

The tablet terminal 9600 includes a power storage unit 9635 in regions inside the housing 9630*a* and the housing 9630*b*. The power storage unit 9635 is provided across the housing 9630*a* and the housing 9630*b*, passing through the movable portion 9640.

The entire region or part of the region of the display portion 9631 can be a touch panel region, and data can be input by touching text, an input form, an image including an icon, and the like displayed on the region. For example, it is possible that keyboard buttons are displayed on the entire display portion 9631*a* on the housing 9630*a* side, and data such as text or an image is displayed on the display portion 9631*b* on the housing 9630*b* side.

It is possible that a keyboard is displayed on the display portion 9631*b* on the housing 9630*b* side, and data such as text or an image is displayed on the display portion 9631*a* on the housing 9630*a* side. Furthermore, it is possible that a switching button for showing/hiding a keyboard on a touch panel is displayed on the display portion 9631 and the button is touched with a finger, a stylus, or the like to display a keyboard on the display portion 9631.

Touch input can be performed concurrently in a touch panel region in the display portion 9631*a* on the housing 9630*a* side and a touch panel region in the display portion 9631*b* on the housing 9630*b* side.

The switch 9625 to the switch 9627 may function not only as an interface for operating the tablet terminal 9600 but also as an interface that can switch various functions. For example, at least one of the switch 9625 to the switch 9627 may function as a switch for switching power on/off of the tablet terminal 9600. For another example, at least one of the switch 9625 to the switch 9627 may have a function of switching the display orientation between a portrait mode and a landscape mode and a function of switching display between monochrome display and color display. For another example, at least one of the switch 9625 to the switch 9627 may have a function of adjusting the luminance of the display portion 9631. The luminance of the display portion 9631 can be optimized in accordance with the amount of external light in use of the tablet terminal 9600 detected by an optical sensor incorporated in the tablet terminal 9600. Note that another sensing device including a sensor for measuring inclination, such as a gyroscope sensor or an acceleration sensor, may be incorporated in the tablet terminal, in addition to the optical sensor.

FIG. 27A shows an example in which the display portion 9631*a* on the housing 9630*a* side and the display portion 9631*b* on the housing 9630*b* side have substantially the same display area; however, there is no particular limitation on the display areas of the display portion 9631*a* and the display portion 9631*b*, and the display portions may have different sizes or different display quality. For example, one may be a display panel that can display higher-definition images than the other.

The tablet terminal 9600 is folded in half in FIG. 27B. The tablet terminal 9600 includes a housing 9630, a solar cell 9633, and a charge and discharge control circuit 9634 including a DCDC converter 9636. The power storage unit of one embodiment of the present invention is used as the power storage unit 9635.

Note that as described above, the tablet terminal 9600 can be folded in half, and thus can be folded when not in use such that the housing 9630*a* and the housing 9630*b* overlap with each other. By the folding, the display portion 9631 can be protected, which increases the durability of the tablet terminal 9600. With the power storage unit 9635 including the secondary battery of one embodiment of the present invention, which has high charge and discharge capacity and excellent cycle performance, the tablet terminal 9600 that can be used for a long time over a long period can be provided.

The tablet terminal 9600 illustrated in FIG. 27A and FIG. 27B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal 9600, can supply electric power to a touch panel, a display portion, a video signal processing portion, and the like. Note that the solar cell 9633 can be provided on one surface or both surfaces of the housing 9630 and the power storage unit 9635 can be charged efficiently. The use of a lithium-ion battery as the power storage unit 9635 brings an advantage such as a reduction in size.

Figure 27C:
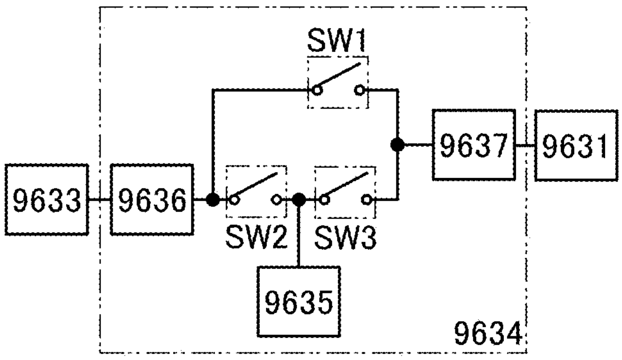

The structure and operation of the charge and discharge control circuit 9634 illustrated in FIG. 27B are described with reference to a block diagram in FIG. 27C. The solar cell 9633, the power storage unit 9635, the DCDC converter 9636, a converter 9637, switches SW1 to SW3, and the display portion 9631 are illustrated in FIG. 27C, and the power storage unit 9635, the DCDC converter 9636, the converter 9637, and the switches SW1 to SW3 correspond to the charge and discharge control circuit 9634 illustrated in FIG. 27B.

First, an operation example in which electric power is generated by the solar cell 9633 using external light is described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage is raised or lowered by the converter 9637 to a voltage needed for the display portion 9631. When display on the display portion 9631 is not performed, SW1 is turned off and SW2 is turned on, so that the power storage unit 9635 is charged.

Note that the solar cell 9633 is described as an example of a power generation unit; however, one embodiment of the present invention is not limited to this example. The power storage unit 9635 may be charged using another power generation unit such as a piezoelectric element or a thermoelectric conversion element (Peltier element). For example, a structure including a non-contact power transmission module that performs charge by transmitting and receiving power wirelessly (without contact) or a structure in which power generated by a solar cell is combined with any other charge unit may be employed.

Figure 28:
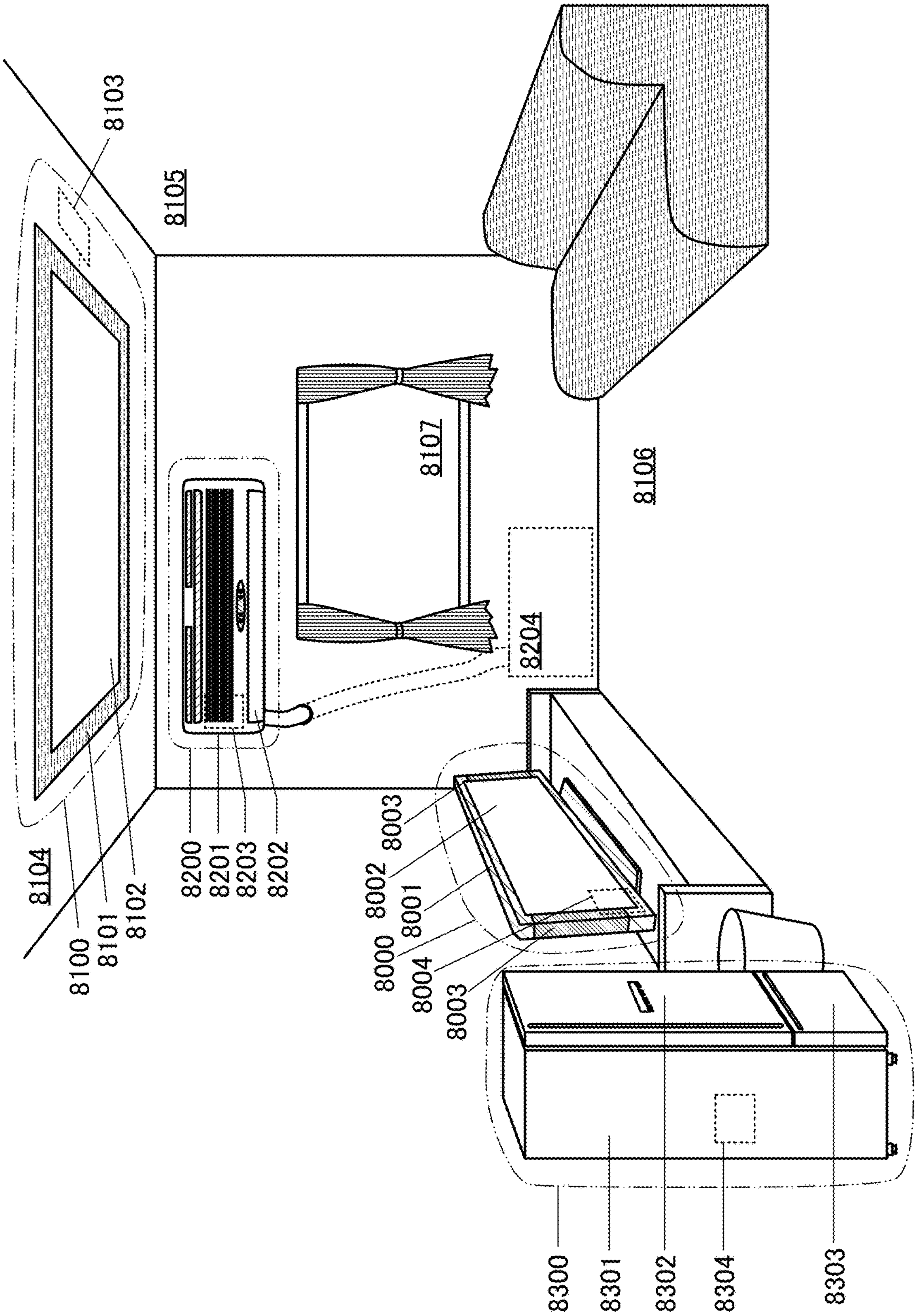
FIG. 28 is a diagram illustrating examples of electronic devices.

FIG. 28 illustrates other examples of electronic devices. In FIG. 28, a display device 8000 is an example of an electronic device including a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in a region inside the housing 8001. The display device 8000 can be supplied with electric power from a commercial power supply and can use electric power stored in the secondary battery 8004. Thus, the display device 8000 can be operated with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a DMD (Digital Micromirror Device), a PDP (Plasma Display Panel), or an FED (Field Emission Display) can be used for the display portion 8002.

Note that the display device includes, in its category, all of information display devices for personal computers, advertisement displays, and the like besides information display devices for TV broadcast reception.

In FIG. 28, an installation lighting device 8100 is an example of an electronic device including a secondary battery 8103 of one embodiment of the present invention. Specifically, the lighting device 8100 includes a housing 8101, a light source 8102, the secondary battery 8103, and the like. Although FIG. 28 illustrates the case where the secondary battery 8103 is provided in a region inside a ceiling 8104 on which the housing 8101 and the light source 8102 are installed, the secondary battery 8103 may be provided in a region inside the housing 8101. The lighting device 8100 can be supplied with electric power from a commercial power supply and can use electric power stored in the secondary battery 8103. Thus, the lighting device 8100 can be operated with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 28 as an example, the secondary battery of one embodiment of the present invention can be used in an installation lighting device provided in, for example, a side wall 8105, a floor 8106, or a window 8107, other than the ceiling 8104, and can be used in a tabletop lighting device or the like.

As the light source 8102, an artificial light source that emits light artificially by using electric power can be used. Specifically, an incandescent lamp, a discharge lamp such as a fluorescent lamp, and light-emitting elements such as an LED and an organic EL element are given as examples of the artificial light source.

In FIG. 28, an air conditioner including an indoor unit 8200 and an outdoor unit 8204 is an example of an electronic device including a secondary battery 8203 of one embodiment of the present invention. Specifically, the indoor unit 8200 includes a housing 8201, an air outlet 8202, the secondary battery 8203, and the like. Although FIG. 28 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can be supplied with electric power from a commercial power supply and can use electric power stored in the secondary battery 8203. Particularly in the case where the secondary batteries 8203 are provided in both the indoor unit 8200 and the outdoor unit 8204, the air conditioner can be operated with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 28 as an example, the secondary battery of one embodiment of the present invention can be used in an air conditioner in which the function of an indoor unit and the function of an outdoor unit are integrated in one housing.

In FIG. 28, an electric refrigerator-freezer 8300 is an example of an electronic device including a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided in a region inside the housing 8301 in FIG. 28. The electric refrigerator-freezer 8300 can be supplied with electric power from a commercial power supply and can use electric power stored in the secondary battery 8304. Thus, the electric refrigerator-freezer 8300 can be operated with the use of the secondary battery 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. Therefore, the tripping of a breaker of a commercial power supply in use of the electronic device can be prevented by using the secondary battery of one embodiment of the present invention as an auxiliary power supply for supplying electric power which cannot be supplied enough by a commercial power supply.

In a time period when electronic devices are not used, particularly when the proportion of the amount of electric power which is actually used to the total amount of electric power which can be supplied from a commercial power supply source (such a proportion is referred to as a usage rate of electric power) is low, electric power is stored in the secondary battery, whereby an increase in the usage rate of electric power can be inhibited in a time period other than the above time period. For example, in the case of the electric refrigerator-freezer 8300, electric power is stored in the secondary battery 8304 in night time when the temperature is low and the refrigerator door 8302 and the freezer door 8303 are not opened or closed. Moreover, in daytime when the temperature is high and the refrigerator door 8302 and the freezer door 8303 are opened and closed, the usage rate of electric power in daytime can be kept low by using the secondary battery 8304 as an auxiliary power supply.

According to one embodiment of the present invention, the secondary battery can have excellent cycle performance and improved reliability. Furthermore, according to one embodiment of the present invention, a secondary battery with high charge and discharge capacity can be obtained; thus, the secondary battery itself can be made more compact and lightweight as a result of improved characteristics of the secondary battery. Thus, the secondary battery of one embodiment of the present invention is used in the electronic device described in this embodiment, whereby a more lightweight electronic device with a longer lifetime can be obtained.

This embodiment can be implemented in appropriate combination with the other embodiments.

Embodiment 6

In this embodiment, examples of electronic devices each including the secondary battery described in the above embodiment are described with reference to FIG. 29 and FIG. 30.

Figure 29A:
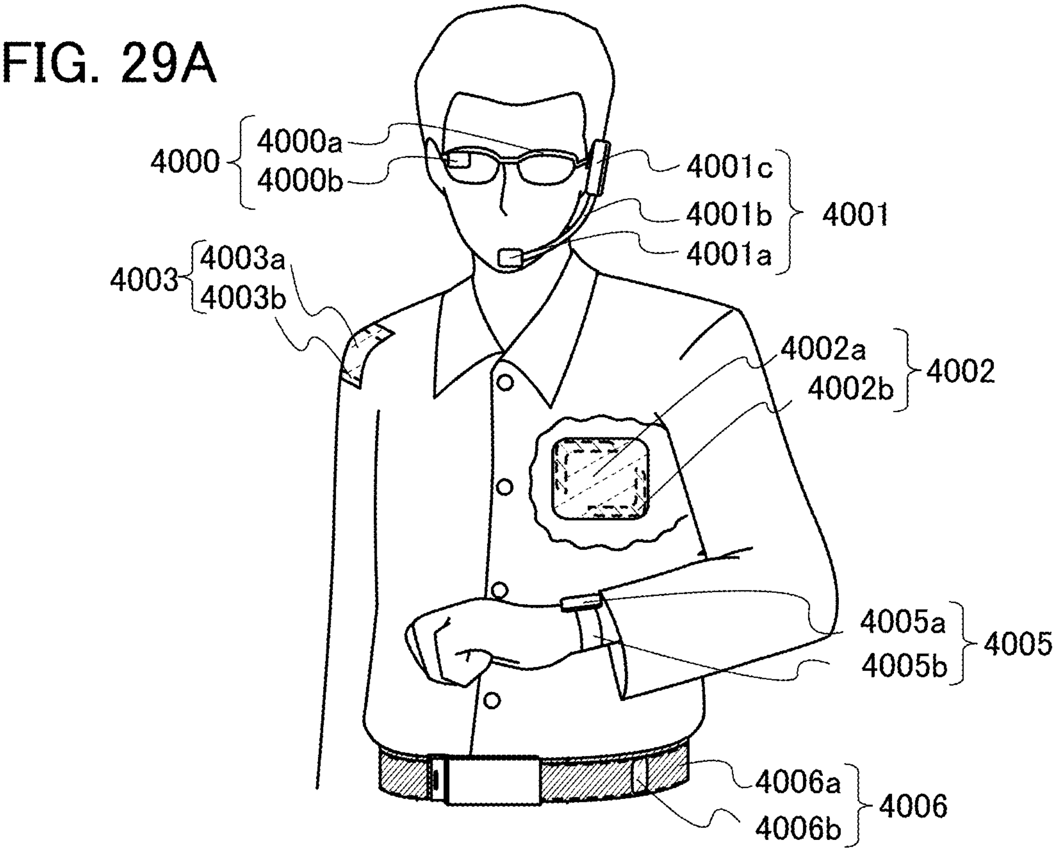
FIG. 29A, FIG. 29B, and FIG. 29C are diagrams illustrating examples of electronic devices.

FIG. 29A illustrates examples of wearable devices. A secondary battery is used as a power source of a wearable device. To have improved splash resistance, water resistance, or dust resistance in daily use or outdoor use by a user, a wearable device is desirably capable of being charged with and without a wire whose connector portion for connection is exposed.

For example, the secondary battery of one embodiment of the present invention can be provided in a glasses-type device 4000 illustrated in FIG. 29A. The glasses-type device 4000 includes a frame 4000*a* and a display portion 4000*b*. The secondary battery is provided in a temple of the frame 4000*a* having a curved shape, whereby the glasses-type device 4000 can be lightweight, can have a well-balanced weight, and can be used continuously for a long time. With the use of the secondary battery of one embodiment of the present invention, space saving required with downsizing of a housing can be achieved.

The secondary battery of one embodiment of the present invention can be provided in a headset-type device 4001. The headset-type device 4001 includes at least a microphone portion 4001*a*, a flexible pipe 4001*b*, and an earphone portion 4001*c*. The secondary battery can be provided in one or more of the flexible pipe 4001*b* and the earphone portion 4001*c*. With the use of the secondary battery of one embodiment of the present invention, space saving required with downsizing of a housing can be achieved.

The secondary battery of one embodiment of the present invention can be provided in a device 4002 that can be attached directly to a body. A secondary battery 4002*b* can be provided in a thin housing 4002*a* of the device 4002. With the use of the secondary battery of one embodiment of the present invention, space saving required with downsizing of a housing can be achieved.

The secondary battery of one embodiment of the present invention can be provided in a device 4003 that can be attached to clothes. A secondary battery 4003*b* can be provided in a thin housing 4003*a* of the device 4003. With the use of the secondary battery of one embodiment of the present invention, space saving required with downsizing of a housing can be achieved.

The secondary battery of one embodiment of the present invention can be provided in a belt-type device 4006. The belt-type device 4006 includes a belt portion 4006*a* and a wireless power feeding and receiving portion 4006*b*, and the secondary battery can be provided in a region inside the belt portion 4006*a*. With the use of the secondary battery of one embodiment of the present invention, space saving required with downsizing of a housing can be achieved.

The secondary battery of one embodiment of the present invention can be provided in a watch-type device 4005. The watch-type device 4005 includes a display portion 4005*a* and a belt portion 4005*b*, and the secondary battery can be provided in the display portion 4005*a* or the belt portion 4005*b*. With the use of the secondary battery of one embodiment of the present invention, space saving required with downsizing of a housing can be achieved.

The display portion 4005*a* can display various kinds of information such as time and reception information of an e-mail or an incoming call.

In addition, the watch-type device 4005 is a wearable device that is wound around an arm directly; thus, a sensor that measures the pulse, the blood pressure, or the like of the user may be incorporated therein. Data on the exercise quantity and health of the user can be stored to be used for health maintenance.

Figure 29B:
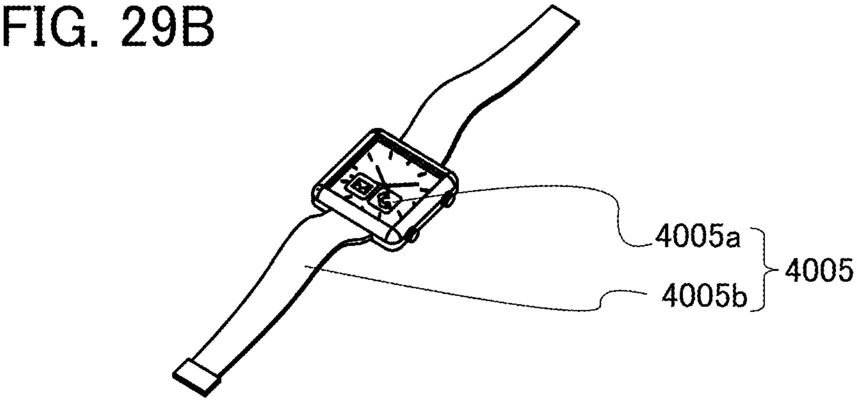

FIG. 29B is a perspective view of the watch-type device 4005 that is detached from an arm.

Figure 29C:
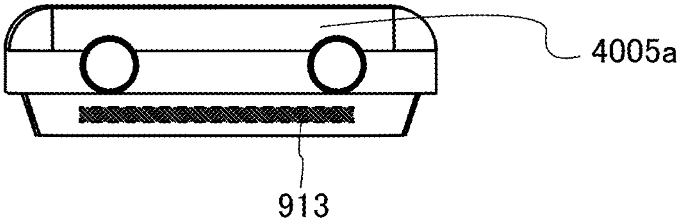

FIG. 29C is a side view. FIG. 29C illustrates a state where the secondary battery 913 is incorporated in a region inside the watch-type device 4005. The secondary battery 913 is the secondary battery described in Embodiment 4. The secondary battery 913, which is small and lightweight, overlaps with the display portion 4005*a*.

Figure 30A:
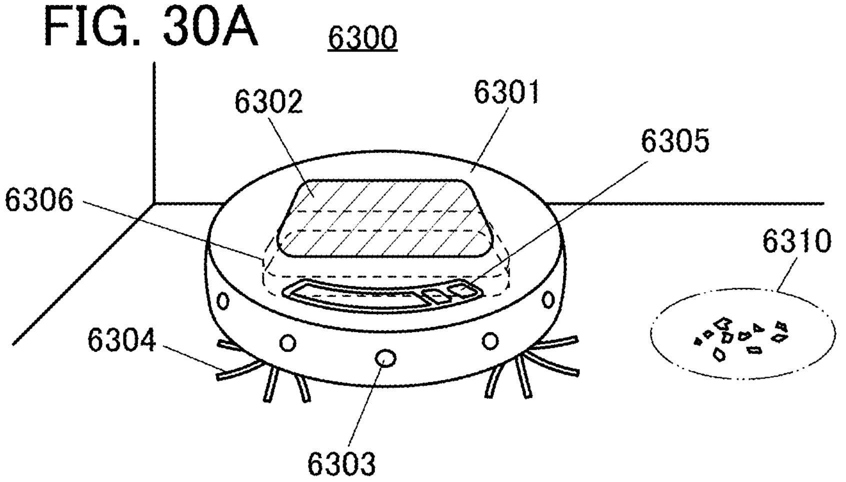
FIG. 30A, FIG. 30B, and FIG. 30C are diagrams illustrating examples of electronic devices.

FIG. 30A illustrates an example of a cleaning robot. A cleaning robot 6300 includes a display portion 6302 placed on the top surface of a housing 6301, a plurality of cameras 6303 placed on the side surface of the housing 6301, a brush 6304, operation buttons 6305, a secondary battery 6306, a variety of sensors, and the like. Although not illustrated, the cleaning robot 6300 is provided with a tire, an inlet, and the like. The cleaning robot 6300 is self-propelled, detects dust 6310, and sucks up the dust through the inlet provided on the bottom surface.

For example, the cleaning robot 6300 can determine whether there is an obstacle such as a wall, furniture, or a step by analyzing images shot by the cameras 6303. In the case where the cleaning robot 6300 detects an object, such as a wire, that is likely to be caught in the brush 6304 by image analysis, the rotation of the brush 6304 can be stopped. The cleaning robot 6300 further includes a secondary battery 6306 of one embodiment of the present invention and a semiconductor device or an electronic component in its interior region. The cleaning robot 6300 including the secondary battery 6306 of one embodiment of the present invention can be a highly reliable electronic device that can operate for a long time.

Figure 30B:
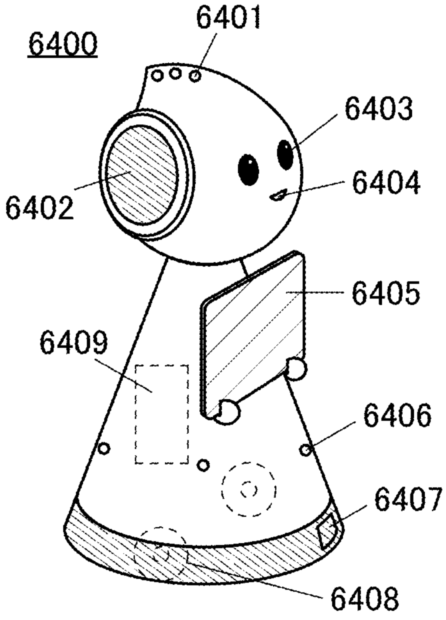

FIG. 30B illustrates an example of a robot. A robot 6400 illustrated in FIG. 30B includes a secondary battery 6409, an illuminance sensor 6401, a microphone 6402, an upper camera 6403, a speaker 6404, a display portion 6405, a lower camera 6406, an obstacle sensor 6407, a moving mechanism 6408, an arithmetic device, and the like.

The microphone 6402 has a function of detecting a speaking voice of a user, an environmental sound, and the like. The speaker 6404 has a function of outputting sound. The robot 6400 can communicate with a user using the microphone 6402 and the speaker 6404.

The display portion 6405 has a function of displaying various kinds of information. The robot 6400 can display information desired by a user on the display portion 6405. The display portion 6405 may be provided with a touch panel. Moreover, the display portion 6405 may be a detachable information terminal, in which case charge and data communication can be performed when the display portion 6405 is set at the home position of the robot 6400.

The upper camera 6403 and the lower camera 6406 each have a function of shooting an image of the surroundings of the robot 6400. The obstacle sensor 6407 can detect an obstacle in the direction where the robot 6400 advances with the moving mechanism 6408. The robot 6400 can move safely by recognizing the surroundings with the upper camera 6403, the lower camera 6406, and the obstacle sensor 6407.

The robot 6400 further includes the secondary battery 6409 secondary battery of one embodiment of the present invention and a semiconductor device or an electronic component in its interior region. The robot 6400 including the secondary battery of one embodiment of the present invention can be a highly reliable electronic device that can operate for a long time.

Figure 30C:
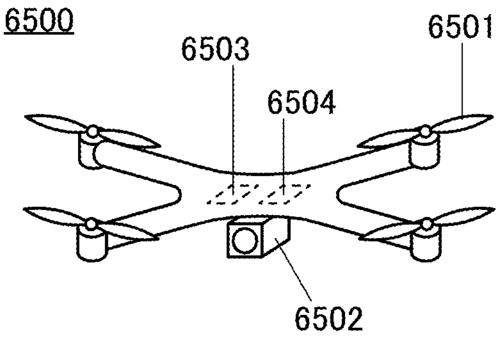

FIG. 30C illustrates an example of a flying object. A flying object 6500 illustrated in FIG. 30C includes propellers 6501, a camera 6502, a secondary battery 6503, and the like and has a function of flying autonomously.

For example, image data shot by the camera 6502 is stored in an electronic component 6504. The electronic component 6504 can analyze the image data to detect whether there is an obstacle in the way of the movement. Moreover, the electronic component 6504 can estimate the remaining battery level from a change in the power storage capacity of the secondary battery 6503. The flying object 6500 further includes the secondary battery 6503 of one embodiment of the present invention in its interior region. The flying object 6500 including the secondary battery of one embodiment of the present invention can be a highly reliable electronic device that can operate for a long time.

This embodiment can be implemented in appropriate combination with the other embodiments.

Embodiment 7

In this embodiment, examples of vehicles each including the secondary battery of one embodiment of the present invention are described.

The use of secondary batteries in vehicles enables production of next-generation clean energy vehicles such as hybrid electric vehicles (HVs), electric vehicles (EVs), and plug-in hybrid electric vehicles (PHVs).

Figure 31A:
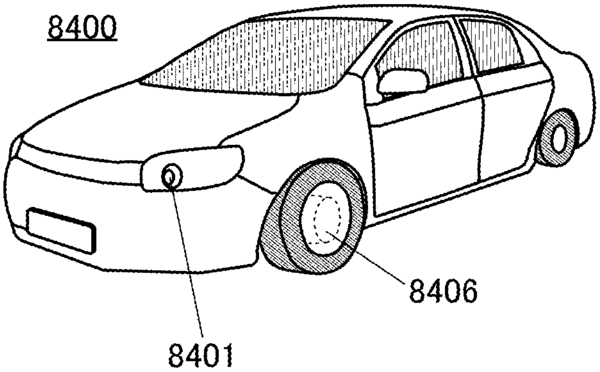
FIG. 31A, FIG. 31B, and FIG. 31C are diagrams illustrating examples of vehicles.

FIG. 31 illustrates examples of a vehicle including the secondary battery of one embodiment of the present invention. An automobile 8400 illustrated in FIG. 31A is an electric vehicle that runs on the power of an electric motor. Alternatively, the automobile 8400 is a hybrid electric vehicle capable of driving using either an electric motor or an engine as appropriate. The use of one embodiment of the present invention achieves a high-mileage vehicle. The automobile 8400 includes the secondary battery. As the secondary battery, the modules of the secondary batteries illustrated in FIG. 14C and FIG. 14D may be arranged to be used in a floor portion in the automobile. Alternatively, a battery pack in which a plurality of secondary batteries illustrated in FIG. 17 are combined may be placed in the floor portion in the automobile. The secondary battery can be used not only for driving an electric motor 8406, but also for supplying electric power to a light-emitting device such as a headlight 8401 or a room light (not shown). The vehicle of one embodiment of the present invention preferably includes the secondary battery of one embodiment of the present invention, an electric motor, and a control device. The control device preferably has a function of supplying electric power from the secondary battery to the electric motor.

The secondary battery can also supply electric power to a display device included in the automobile 8400, such as a speedometer or a tachometer. Furthermore, the secondary battery can supply electric power to a semiconductor device included in the automobile 8400, such as a navigation system.

Figure 31B:
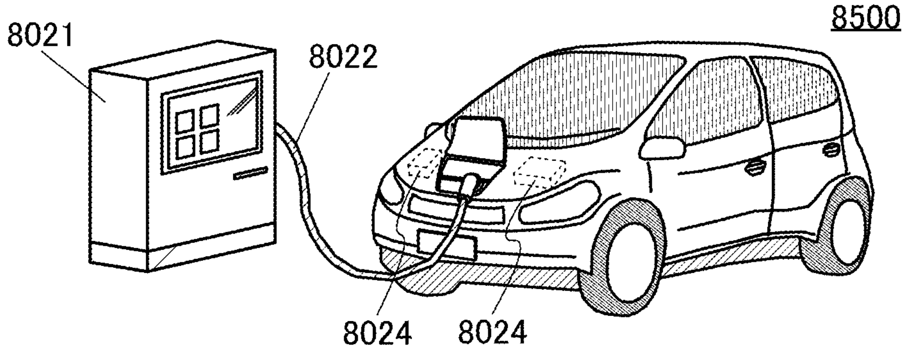

An automobile 8500 illustrated in FIG. 31B can be charged when the secondary battery included in the automobile 8500 is supplied with electric power through external charge equipment by one or more selected from a plug-in system, a contactless power feeding system, and the like. FIG. 31B illustrates a state where a secondary battery 8024 included in the automobile 8500 is charged with the use of a ground-based charging apparatus 8021 through a cable 8022. Charging can be performed as appropriate by a given method such as CHAdeMO (registered trademark) or Combined Charging System as a charging method, the standard of a connector, and the like. The charging apparatus 8021 may be a charge station provided in a commerce facility or a power supply in a house. For example, with the use of a plug-in technique, the secondary battery 8024 included in the automobile 8500 can be charged by being supplied with electric power from outside. The charging can be performed by converting AC electric power into DC electric power through a converter such as an ACDC converter.

Although not shown, the vehicle may include a power receiving device so that it can be charged by being supplied with electric power from an above-ground power transmitting device in a contactless manner. In the case of the contactless power feeding system, by fitting a power transmitting device in one or both of a road and an exterior wall, charging can be performed not only when the vehicle is stopped but also when driven. In addition, the contactless power feeding system may be utilized to perform transmission and reception of electric power between vehicles. Furthermore, a solar cell may be provided in the exterior of the vehicle to charge the secondary battery when the vehicle stops or moves. To supply electric power in such a contactless manner, one or more of an electromagnetic induction method and a magnetic resonance method can be used.

Figure 31C:
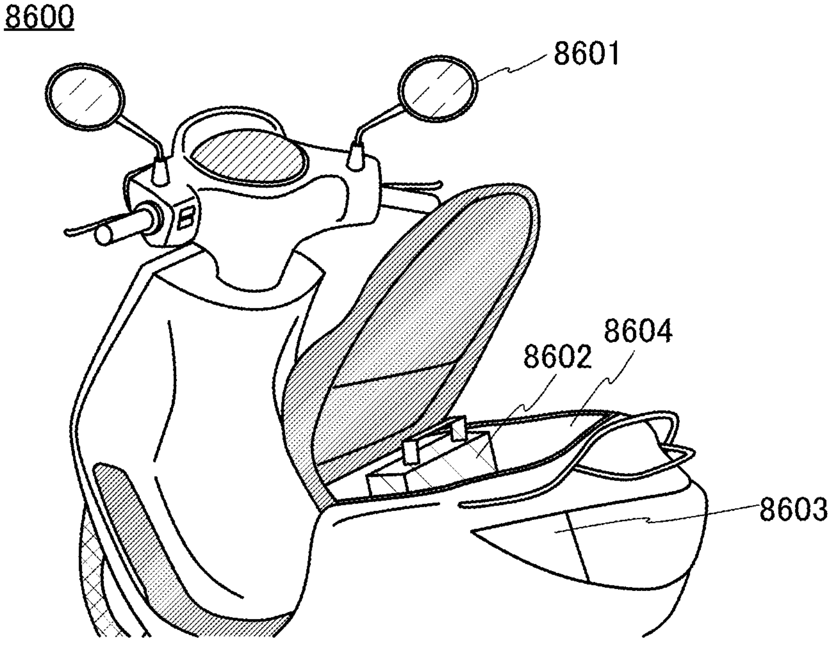

FIG. 31C illustrates an example of a motorcycle including the secondary battery of one embodiment of the present invention. A motor scooter 8600 illustrated in FIG. 31C includes a secondary battery 8602, side mirrors 8601, and direction indicators 8603. The secondary battery 8602 can supply electric power to the direction indicators 8603.

In the motor scooter 8600 shown in FIG. 31C, the secondary battery 8602 can be held in an under-seat storage 8604. The secondary battery 8602 can be held in the under-seat storage 8604 even when the under-seat storage 8604 is small. The secondary battery 8602 is detachable; thus, the secondary battery 8602 is carried indoors when charged, and is stored before the motor scooter is driven.

According to one embodiment of the present invention, the secondary battery can have improved cycle performance and the charge and discharge capacity of the secondary battery can be increased. Thus, the secondary battery itself can be made more compact and lightweight. The compact and lightweight secondary battery contributes to a reduction in the weight of a vehicle, and thus increases the mileage. Furthermore, the secondary battery included in the vehicle can be used as a power source for supplying electric power to products other than the vehicle. In such a case, the use of a commercial power supply can be avoided at peak time of electric power demand, for example. Avoiding the use of a commercial power supply at peak time of electric power demand can contribute to energy saving and a reduction in carbon dioxide emissions. Moreover, the secondary battery with excellent cycle performance can be used over a long period; thus, the use amount of rare metals typified by cobalt can be reduced.

This embodiment can be implemented in appropriate combination with the other embodiments.

Example 1

In this example, the positive electrode active material of one embodiment of the present invention was formed and its characteristics were evaluated.

<Formation of Cobalt-Containing Material>

Figure 5:
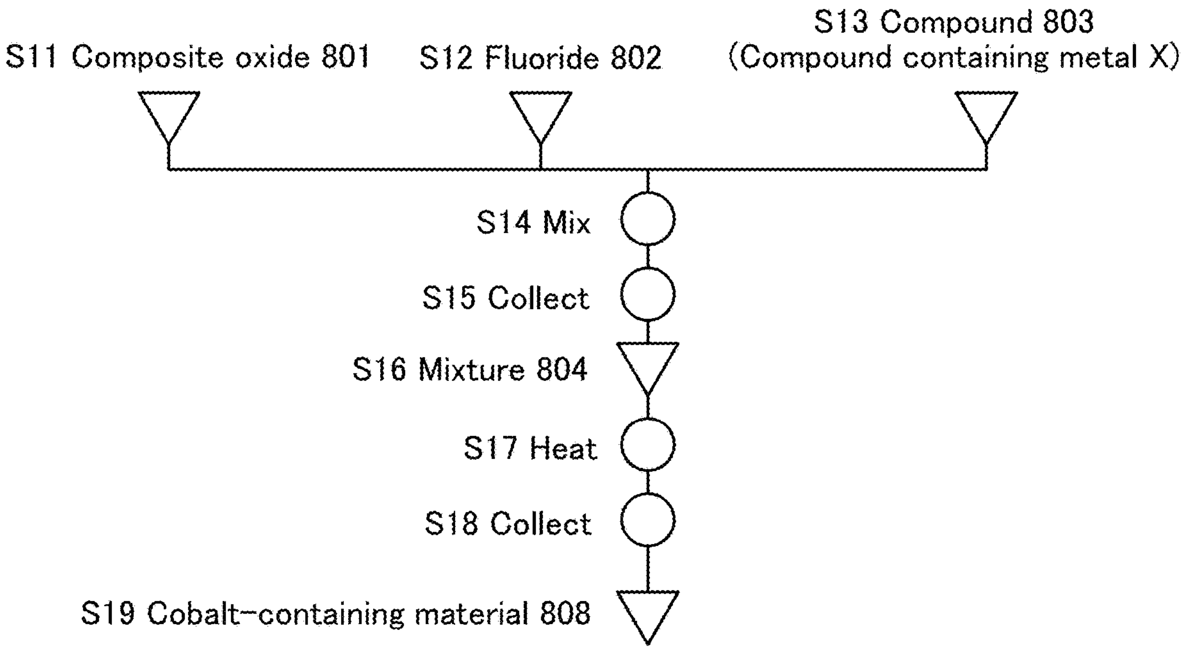
FIG. 5 is a diagram showing a method for manufacturing a material.

First, the cobalt-containing material prepared in Step S26 in FIG. 3 was formed according to the flowchart shown in FIG. 5.

As the composite oxide 801 in Step S11, lithium cobalt oxide (C-10N produced by NIPPON CHEMICAL INDUSTRIAL CO., LTD.) was prepared. As the fluoride 802 in Step S12, magnesium fluoride was prepared. Lithium fluoride was prepared as the compound 803. Although not shown in FIG. 5, aluminum hydroxide was prepared as an aluminum source and nickel hydroxide was prepared as a nickel source. Assuming that the number of cobalt atoms contained in the composite oxide 801 was 100, the materials were prepared such that the number of molecules of lithium fluoride was 0.33, the number of molecules of magnesium fluoride was 1, the number of molecules of aluminum hydroxide was 0.5, and the number of molecules of nickel hydroxide was 0.5.

In Step S14, first, magnesium fluoride, lithium fluoride, aluminum hydroxide, and nickel hydroxide were mixed to form a mixture. Lithium cobalt oxide and the formed mixture were mixed and then collected (Step S15), whereby the mixture 804 was obtained (Step S16).

Next, in Step S17, the mixture 804 was put in a container made of alumina, and the container was covered with a lid and put in a muffle furnace. Then, the mixture 804 was heated and collected (Step S18), so that the cobalt-containing material 808 was obtained (Step S19). Specifically, heating at 900° C. in an oxygen atmosphere for 10 hours was repeated three times. Every time after the heating, disintegration was performed in a mortar.

<Formation 1 of Positive Electrode Active Material>

Next, a positive electrode active material was formed according to the flowchart shown in FIG. 3.

Titanium oxide (TiO2) was prepared as the titanium compound 806 in Step S21, and lithium oxide (Li2O) was prepared as the lithium compound 807 in Step S22. The materials were prepared such that the number of molecules of titanium oxide was 0.5 and the number of molecules of lithium oxide was 1.7 when the sum of the number of cobalt atoms, nickel atoms, and aluminum atoms contained in the cobalt-containing material 808 prepared in Step S26 described later was 100.

Next, in Step S23, titanium oxide and lithium oxide were mixed. The mixing was performed by a wet method using a ball mill at a rotation speed of 400 rpm for 12 hours. As a solvent, acetone was used. Zirconia balls with a diameter of 1 mm were used.

Then, the mixture was collected in Step S24, and the solvent was volatilized to obtain the mixture 809 (Step S25).

In Step S26, the cobalt-containing material 808 was prepared.

In Step S27, the mixture 809 was mixed with the cobalt-containing material 808. The mixing was performed by a dry method using a ball mill at a rotation speed of 150 rpm for 0.5 hours. Zirconia balls with a diameter of 1 mm were used.

Then, the mixture was collected in Step S28 to obtain the mixture 810 (Step S29).

In Step S51, the mixture 810 was heated. The heating was performed under different conditions. After the heating, the mixture was collected (Step S52); thus, Sample Sa1 and Sample Sa2 were obtained as two positive electrode active materials with different heating conditions.

Sample Sa1 is a positive electrode active material obtained by performing the heating at 850° C. in an oxygen atmosphere for 2 hours in Step S51.

Sample Sa2 is a positive electrode active material obtained by performing the heating at 1050° C. in an oxygen atmosphere for 2 hours in Step S51.

<Formation 2 of Positive Electrode Active Material>

Next, a positive electrode active material was formed without using the lithium compound 807.

432

First, the titanium compound 806 and the cobalt-containing material 808 were mixed to form a mixture. The formed mixture was heated. The heating was performed under different conditions. After the heating, the mixture was collected; thus, Sample Sa3 and Sample Sa4 were obtained as two positive electrode active materials with different heating conditions.

Sample Sa3 is a positive electrode active material formed without using the lithium compound 807 and obtained by performing the heating at 850° C. in an oxygen atmosphere for 2 hours.

Sample Sa4 is a positive electrode active material formed without using the lithium compound 807 and obtained by performing the heating at 1050° C. in an oxygen atmosphere for 2 hours.

<SEM Images>

Observation of scanning electron microscope (SEM) images and EDX analysis of the formed samples were performed using SU8030 produced by Hitachi High-Technologies Corporation.

The SEM images of formed Samples Sa1, Sa2, Sa3, and Sa4 were observed. The accelerating voltage was 5 keV. FIG. 32A, FIG. 32B, FIG. 33A, and FIG. 33B show the SEM images of Sample Sa1, Sample Sa2, Sample Sa3, and Sample Sa4, respectively.

Figure 32A:
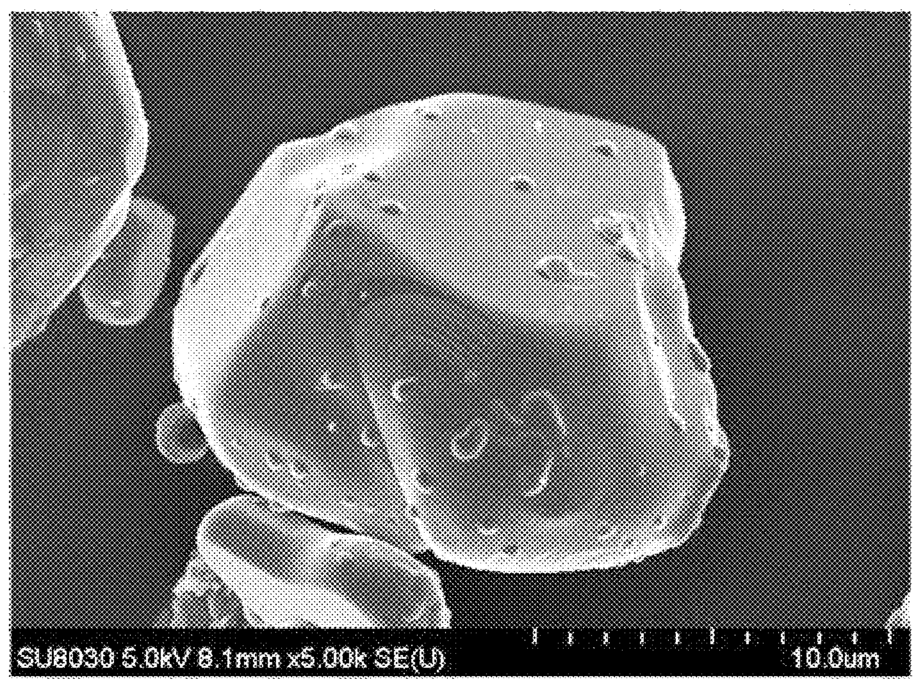
FIG. 32A and FIG. 32B are SEM images.
Figure 32B:
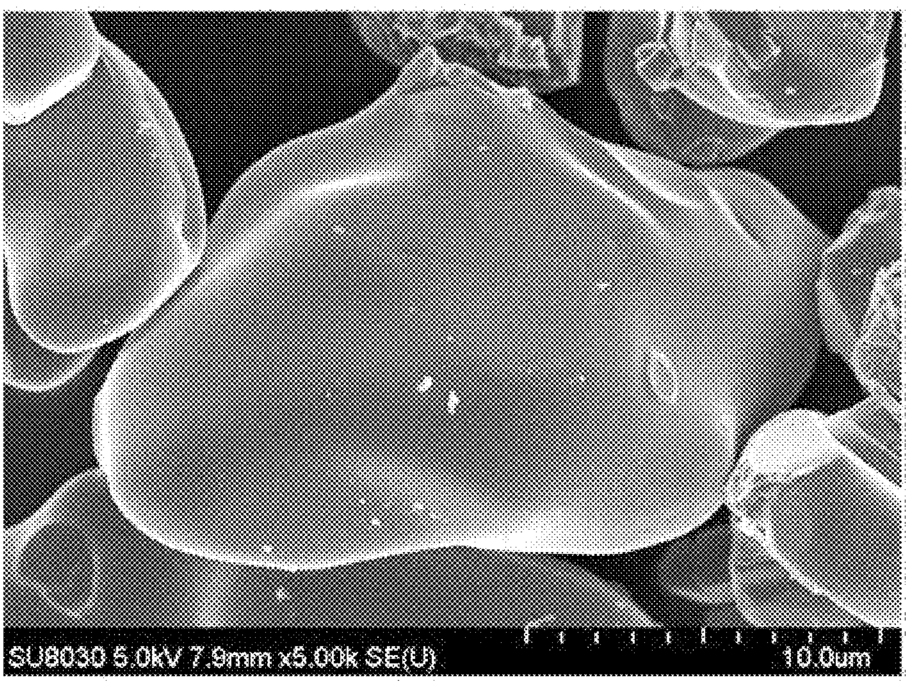
Figure 33A:
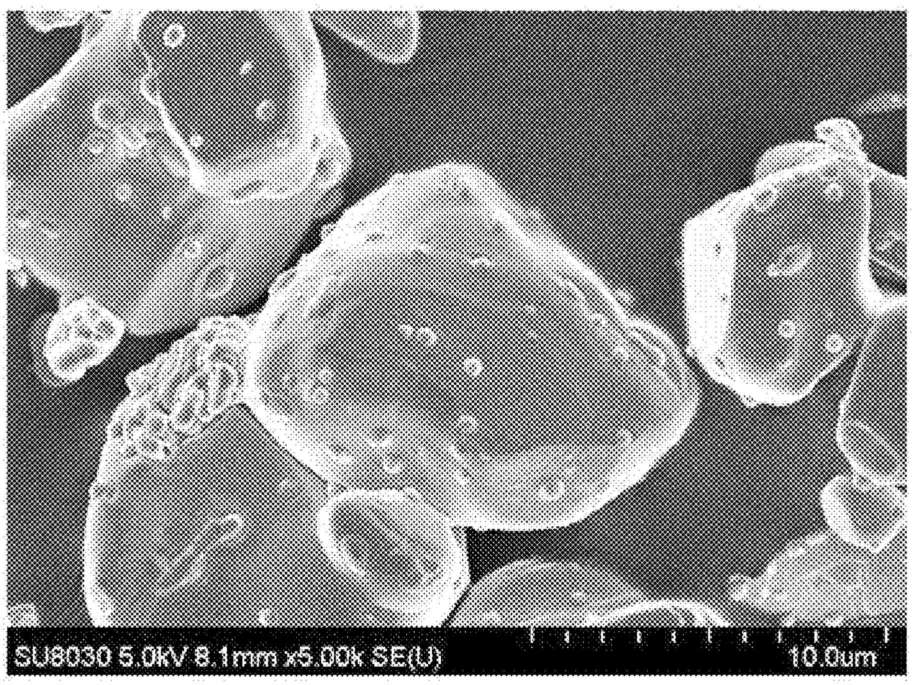
FIG. 33A and FIG. 33B are SEM images.
Figure 33B:
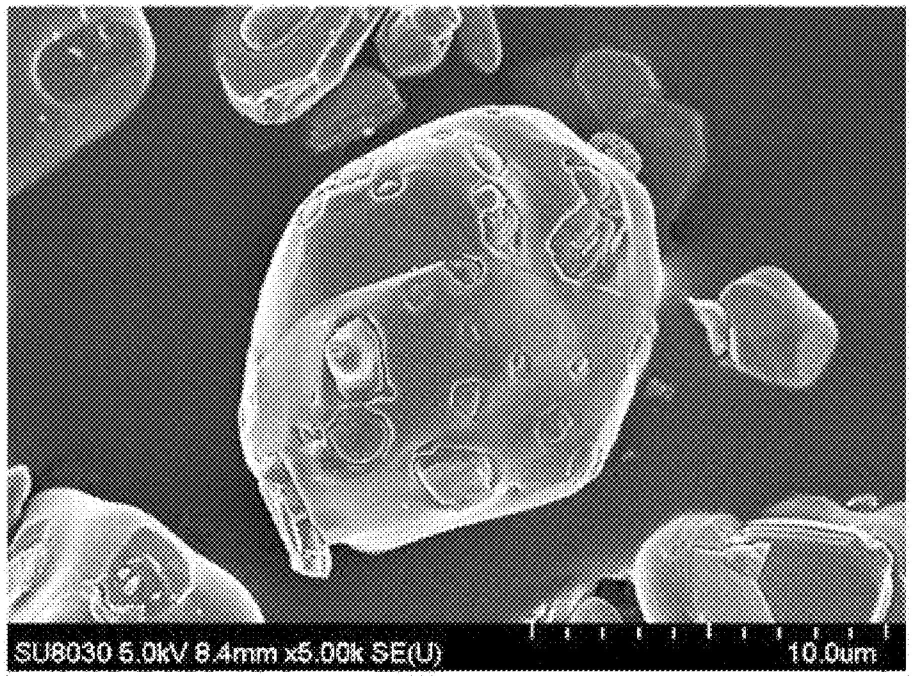

For Sample Sa2, the positive electrode active material in the form of particles had a smooth surface. Sample Sa1 with a low heating temperature had more unevenness on its surface than Sample Sa2, and a plurality of projections were observed in Sample Sa1 as shown in FIG. 32A. Sample Sa3 and Sample Sa4, which are positive electrode active materials formed without using the lithium compound 807, had notably uneven surfaces, and a plurality of projections were observed in Sample Sa3 with a low heating temperature as shown in FIG. 33A.

<EDX>

Figure 34A:
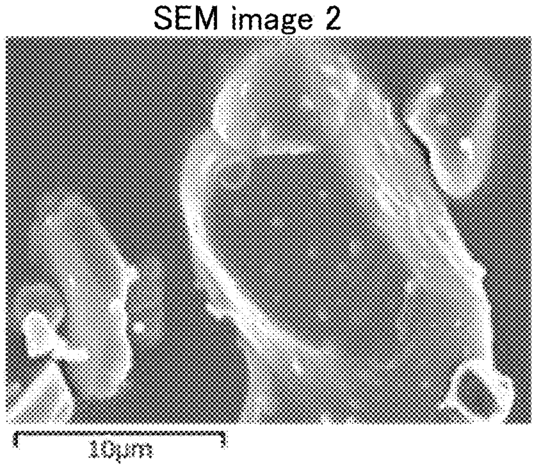
FIG. 34A, FIG. 34B, FIG. 34C, FIG. 34D, FIG. 34E, and FIG. 34F show results of SEM-EDX.
Figure 34B:
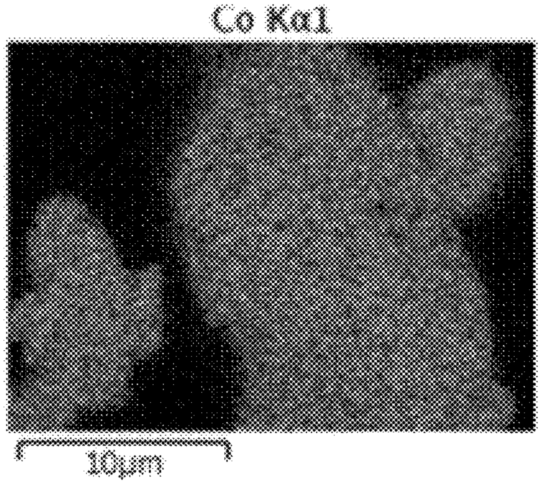
Figure 34C:
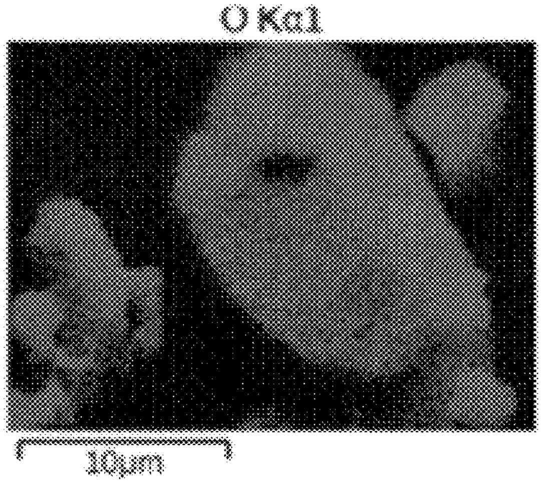
Figure 34D:
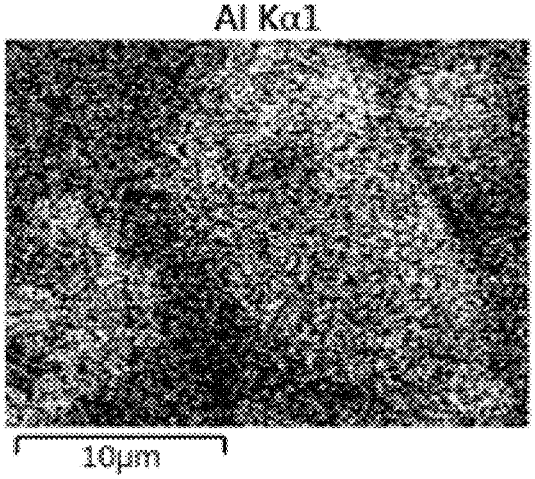
Figure 34E:
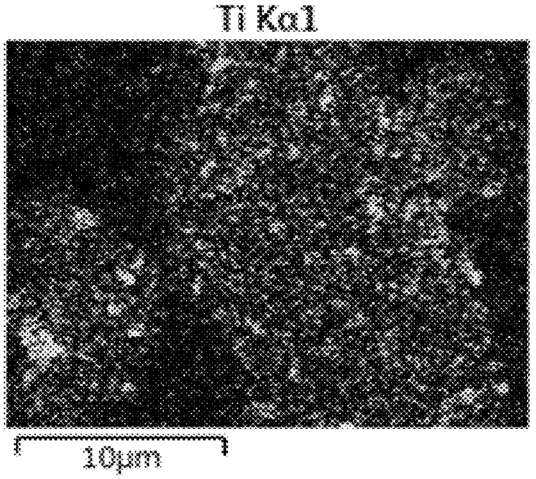
Figure 34F:
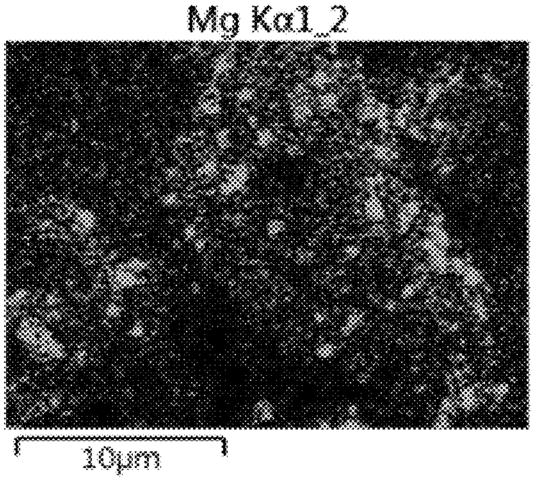

Sample Sa3 with its notably uneven surface, in which the plurality of projections had been observed, was subjected to EDX analysis. The accelerating voltage was 15 keV. FIG. 34A shows a SEM image. FIG. 34B, FIG. 34C, FIG. 34D, FIG. 34E, and FIG. 34F show EDX area analysis results of cobalt, oxygen, aluminum, titanium, and magnesium, respectively. The analysis results indicate that the plurality of projections observed on the particle surface contained a large amount of titanium and magnesium. This suggests that a reaction or interaction between titanium and magnesium, or the like in the heating in Step S51 was caused.

<Fabrication of Secondary Batteries>

Secondary batteries were fabricated using the formed positive electrode active materials.

First, positive electrodes were fabricated using Samples Sa1, Sa2, and Sa4 as positive electrode active materials. A slurry was formed by mixing the positive electrode active material, AB, and PVDF at the positive electrode active material:AB:PVDF=95:3:2 (weight ratio), and the slurry was applied onto a current collector of aluminum. As a solvent of the slurry, NMP was used.

After the slurry was applied onto the current collector, the solvent was volatilized. After that, pressure was applied at 210 kN/m, and then, pressure was applied at 1467 kN/m. Through the above process, the positive electrodes were obtained. The load of each of the fabricated positive electrodes was approximately 7 mg/cm2. The density of each positive electrode active material layer was higher than 3.8 g/cc.

Next, using the fabricated positive electrodes, CR2032 type coin battery cells (with a diameter of 20 mm and a height of 3.2 mm) were fabricated.

A lithium metal was used for a counter electrode.

As an electrolyte contained in an electrolyte solution, 1 mol/L lithium hexafluorophosphate (LiPF6) was used. As the electrolyte solution, a solution which is obtained by adding vinylene carbonate (VC) at 2 wt % to a mixture of ethylene carbonate (EC) and diethyl carbonate (DEC) at EC:DEC=3:7 (volume ratio) was used.

As a separator, 25-μm-thick polypropylene was used.

A positive electrode can and a negative electrode can that were formed using stainless steel (SUS) were used.

<Cycle Performance>

Next, the cycle performance of the fabricated secondary batteries was evaluated. Charging was performed in such a manner that constant current charging was performed at a rate of 0.5 C until the voltage reached an upper voltage limit of 4.6 V and then constant voltage charging was performed at 4.6 V until the rate became 0.05 C. For discharging, constant current discharging was performed at a rate of 0.5 C until the voltage reached a lower voltage limit of 2.5 V. Note that 200 mA/g was converted into the rate of 1 C. The measurement was performed at 45° C.

Figure 35:
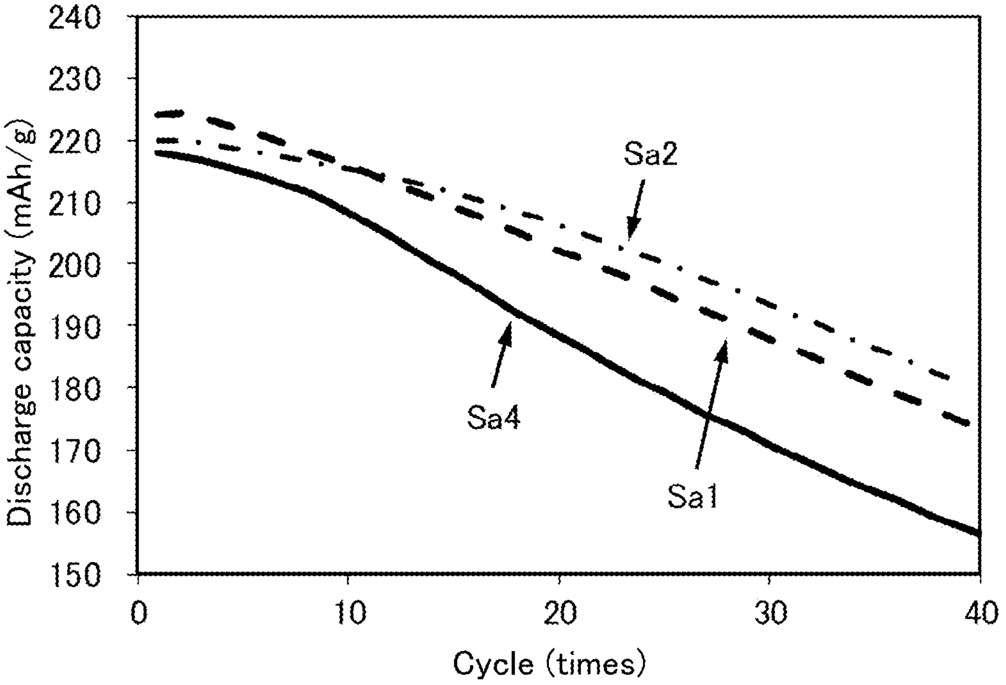
FIG. 35 is a graph showing cycle performance.

FIG. 35 shows the cycle performance. The secondary battery using Sample Sa2 as a positive electrode active material had the most excellent characteristics.

The cycle performance shown in FIG. 35 and the results of the SEM images suggest that in the process where the cobalt-containing material 808 and the mixture 809 obtained by mixing the titanium compound 806 and the lithium compound 807 were mixed and heated to form the positive electrode active material, generation of an eutectic mixture of the titanium compound 806 and the lithium compound 807 at the time of heating allowed uniform distribution of the eutectic mixture on the surface of the cobalt-containing material 808 and inhibited a reaction or the like with magnesium, leading to formation of the favorable positive electrode active material.

REFERENCE NUMERALS

102: space in heating furnace, 104: hot plate, 106: heater unit, 108: heat insulator, 116: container, 118: lid, 119: space, 120: heating furnace, 210: electrode stack, 211*a*: positive electrode, 211*b*: negative electrode, 212*a*: lead, 212*b*: lead, 214: separator, 215*a*: bonding portion, 215*b*: bonding portion, 217: fixing member, 250: secondary battery, 251: exterior body, 261: bent portion, 262: seal portion, 263: seal portion, 271: crest line, 272: trough line, 273: space, 300: secondary battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 400: secondary battery, 410: positive electrode, 411: positive electrode active material, 413: positive electrode current collector, 414: positive electrode active material layer, 420: solid electrolyte layer, 421: solid electrolyte, 430: negative electrode, 431: negative electrode active material, 433: negative electrode current collector, 434: negative electrode active material layer, 500: secondary battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 510: positive electrode lead electrode, 511: negative electrode lead electrode, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 613: conductive plate, 614: conductive plate, 615: module, 616: conductive wire, 617: temperature control device, 750*a*: positive electrode, 750*b*: solid electrolyte layer, 750*c*: negative electrode, 751: electrode plate, 752: insulating tube, 753: electrode plate, 761: lower component, 762: upper component, 764: butterfly nut, 765: O ring, 766: insulator, 770*a*: package component, 770*b*: package component, 770*c*: package component, 771: external electrode, 772: external electrode, 773*a*: electrode layer, 773*b*: electrode layer, 801: composite oxide, 802: fluoride, 803: compound, 804: mixture, 806: titanium compound, 807: lithium compound, 808: cobalt-containing material, 809: mixture, 810: mixture, 811: positive electrode active material, 900: circuit board, 910: label, 911: terminal, 911*a*: terminal, 911*b*: terminal, 912: circuit, 913: secondary battery, 914: antenna, 915: seal, 916: layer, 917: layer, 918: antenna, 920: display device, 921: sensor, 922: terminal, 930: housing, 930*a*: housing, 930*b*: housing, 931: negative electrode, 931*a*: negative electrode active material layer, 932: positive electrode, 932*a*: positive electrode active material layer, 933: separator, 950: wound body, 950*a*: wound body, 951: terminal, 952: terminal, 980: secondary battery, 981: film, 982: film, 993: wound body, 994: negative electrode, 995: positive electrode, 996: separator, 997: lead electrode, 998: lead electrode, 4000: glasses-type device, 4000*a*: frame, 4000*b*: display portion, 4001: headset-type device, 4001*a*: microphone portion, 4001*b*: flexible pipe, 4001*c*: earphone portion, 4002: device, 4002*a*: housing, 4002*b*: secondary battery, 4003: device, 4003*a*: housing, 4003*b*: secondary battery, 4005: watch-type device, 4005*a*: display portion, 4005*b*: belt portion, 4006: belt-type device, 4006*a*: belt portion, 4006*b*: wireless power feeding and receiving portion, 6300: cleaning robot, 6301: housing, 6302: display portion, 6303: camera, 6304: brush, 6305: operation button, 6306: secondary battery, 6310: dust, 6400: robot, 6401: illuminance sensor, 6402: microphone, 6403: upper camera, 6404: speaker, 6405: display portion, 6406: lower camera, 6407: obstacle sensor, 6408: moving mechanism, 6409: secondary battery, 6500: flying object, 6501: propellers, 6502: camera, 6503: secondary battery, 6504: electronic component, 7100: portable display device, 7101: housing, 7102: display portion, 7103: operation button, 7104: secondary battery, 7200: portable information terminal, 7201: housing, 7202: display portion, 7203: band, 7204: buckle, 7205: operation button, 7206: input-output terminal, 7207: icon, 7300: display device, 7304: display portion,

7400: mobile phone, 7401: housing, 7402: display portion, 7403: operation button, 7404: external connection port, 7405: speaker, 7406: microphone, 7407: secondary battery, 7500: electronic cigarette, 7501: atomizer, 7502: cartridge, 7504: secondary battery, 8000: display device, 8001: housing, 8002: display portion, 8003: speaker portion, 8004: secondary battery, 8021: charging apparatus, 8022: cable, 8024: secondary battery, 8030: SU, 8100: lighting device, 8101: housing, 8102: light source, 8103: secondary battery, 8104: ceiling, 8105: sidewall, 8106: floor, 8107: window, 8200: indoor unit, 8201: housing, 8202: air outlet, 8203: secondary battery, 8204: outdoor unit, 8300: electric refrigerator-freezer, 8301: housing, 8302: refrigerator door, 8303: freezer door, 8304: secondary battery, 8400: automobile, 8401: headlight, 8406: electric motor, 8500: automobile, 8600: motor scooter, 8601: side mirror, 8602: secondary battery, 8603: direction indicator, 8604: under-seat storage, 9600: tablet terminal, 9625: switch, 9626: switch, 9627: switch, 9628: operation switch, 9629: fastener, 9630: housing, 9630*a*: housing, 9630*b*: housing, 9631: display portion, 9631*a*: display portion, 9631*b*: display portion, 9633: solar cell, 9634: charge and discharge control circuit, 9635: power storage unit, 9636: DC-DC converter, 9637: converter, 9640: movable portion

The invention claimed is:

1. A method for manufacturing a positive electrode active material, comprising:

a first step of mixing titanium oxide, lithium oxide, and a composite oxide comprising lithium, cobalt, and magnesium to form a first mixture; and a second step of heating the first mixture, and wherein a heating temperature in the second step is higher than or equal to 1030° C. and lower than or equal to 1150° C.

2. The method for manufacturing a positive electrode active material, according to claim 1, wherein the composite oxide further comprises fluorine.

* * * * *